United States Patent [19]
Yamanaka

[11] Patent Number: 5,751,383
[45] Date of Patent: May 12, 1998

[54] IMAGE DISPLAY DEVICE HAVING A PIXEL MULTIPLYING MEANS

[75] Inventor: Atsushi Yamanaka, Chiba, Japan

[73] Assignee: Sharp Kabushiki Kaisha, Osaka, Japan

[21] Appl. No.: 252,659

[22] Filed: Jun. 1, 1994

[30] Foreign Application Priority Data

| Jun. 1, 1993 | [JP] | Japan | 5-130565 |
| Jun. 1, 1993 | [JP] | Japan | 5-130566 |
| Jun. 4, 1993 | [JP] | Japan | 5-134597 |
| Dec. 7, 1993 | [JP] | Japan | 5-306754 |
| Feb. 10, 1994 | [JP] | Japan | 6-015633 |

[51] Int. Cl.$^6$ .................................. G02F 1/1335
[52] U.S. Cl. .................................. 349/13; 349/95
[58] Field of Search .................................. 359/40, 41, 62; 349/13, 112, 57, 95

[56] References Cited

U.S. PATENT DOCUMENTS

| 4,587,553 | 5/1986 | Watanabe et al. | 358/64 |
| 4,957,351 | 9/1990 | Shioji | 359/94 |
| 5,005,968 | 4/1991 | Tejima et al. | 353/122 |
| 5,012,274 | 4/1991 | Dolgoff | 340/702 |
| 5,046,827 | 9/1991 | Frost et al. | 359/54 |
| 5,075,993 | 12/1991 | Weinreich | 40/427 |
| 5,392,140 | 2/1995 | Ezra et al. | 359/41 |
| 5,465,175 | 11/1995 | Woodgate et al. | 359/41 |
| 5,499,138 | 3/1996 | Iba | 359/48 |
| 5,602,658 | 2/1997 | Ezra et al. | 349/106 |

FOREIGN PATENT DOCUMENTS

| 0 133 440 A1 | 7/1984 | European Pat. Off. |
| 0 492 661 A3 | 7/1992 | European Pat. Off. |
| 0 509 630 A2 | 10/1992 | European Pat. Off. |
| 2 611 389 | 9/1988 | France |
| 59-36282 | 2/1984 | Japan |
| 4-107420 | 4/1992 | Japan | 359/40 |
| 5-313153 | 11/1993 | Japan | 359/40 |
| WO 92/16075 | 9/1992 | WIPO |

Primary Examiner—William L. Sikes
Assistant Examiner—Charles Miller
Attorney, Agent, or Firm—David G. Conlin; William J. Daley, Jr.

[57] ABSTRACT

An image display device based on liquid crystal panels is arranged for outputting a high quality image, specifically one in which the problem of the shadow border between pixels has been remedied. Embodiments of the display device employ various techniques to address the problem. One solution, a multi-pixelating technique, surrounds pixels with virtual images of pixel, where both the spacing and the range of the multi-pixelating are precisely controllable. In other solution, the divergence of the light incident upon the liquid crystal panel is carefully controlled, or the light field emerging from the liquid crystal panel is modulated, in order to project a carefully controlled pixel image intensity distribution onto a diffusely scattering surface. The techniques developed are applicable to color liquid crystal panels as well, and can be employed to perform a precisely interpolated color mixing of neighboring pixels. Some of the embodiments employee a specially designed lighting unit for providing white parallel rays to the liquid crystal device. Because of advantages in areas of size, weight and image quality, the display device is particularly suitable to head mounted displays.

11 Claims, 52 Drawing Sheets

IMAGE DISPLAY DEVICE HAVING A PIXEL MULTIPLYING MEANS

BACKGROUND OF THE INVENTION

1. Field of the Invention

The present invention relates to an image display device for outputting a high-quality image. More particularly, the present invention relates to a liquid crystal display unit which is arranged to eliminate a boundary shadow between pixels by magnifying each of the pixels composing the display or a color liquid crystal display unit having three kinds of pixels, red, green and blue pixels, and which operates to mix the colors of these pixels and smooth the border between the pixels for obtaining a high-quality color image. The present invention further relates to a small and lightweight backlighting unit for outputting parallel rays for the display unit.

2. Description of the Related Art

Herein, three representative related arts to the present invention will be described.

A typical liquid crystal display unit provides a far lower image quality if a user watches the display closely or magnifies the image with a lens. This is because an opaque boundary exists between adjacent pixels so that these pixels are seen as spatially separated luminous points. In particular, in the case of a for the color display, disadvantageously, the color dots which constitute a single mixed color pixel are viewed as separate and distinct from each other. To cope with this disadvantage, a technique has been proposed in Japanese Lying Open No. 59-36282 or PCT/WO/92/16075.

The first related art concerns the display unit arranged according to the technique as shown in FIG. 50. As shown, the display unit is arranged to have a diffuse backlighting unit 1201, a liquid crystal display 1202, and a light scattering plate 1203. In operation, diffuse rays of light emitted from the backlighting unit 1201 pass through the liquid crystal display 1202 and reach the light scattering plate 1203 where they are scattered. As a result, the image 1205 of a pixel 1204 is expanded on the light scattering plate 1203 so that the shadow region surrounding the pixel will be filled in. Further, in the case of a color display unit, this pixel expansion overlaps adjacent pixels of differing primary colors resulting in a mixed-color image, improving image quality.

As mentioned above, the light scattering plate located just before the display makes it possible to eliminate the space between the pixels. The intensity distribution 1211 of the magnified pixel image 1205 is formed to spread wide as shown in FIG. 51. This brings about a disadvantageous side effect, namely making the edges in the image vague. Because edge detection is important for image comprehension, this blurring of edges can lead directly to eye fatigue. The lack of control mechanisms for setting the size, as well as other parameter values of the pixel's expanded image prevent the remedying of these size effects.

This description will now be oriented to the second related art.

Display units such as liquid crystal displays entail a provision for blocking the transmission of light in the area between adjacent pixels, these areas corresponding to electrode wires. In the case where the image is magnified when it is displayed, these areas are conspicuous. At first, a monochrome liquid crystal display unit having such an arrangement will be discussed with reference to FIG. 56. A liquid crystal display panel 1150 is arranged so that pixels are discretely distributed with an opaque area between adjacent pixels. If the image is magnified when it is displayed, the pixel images are spatially separated and the opaque portion will be conspicuous, thereby lowering the image quality. To overcome this shortcoming, the monochrome display unit of the related art is arranged with light diffusing plate 1151 set after the liquid crystal display panel 1150 for spreading the images of the pixels 1153. Those magnified pixels form a vague image, making the borders between the adjacent pixels less distinguishable from a viewpoint of a user.

Next, the color-mixing type display unit having a liquid crystal display will be discussed as a second type related art, with reference to FIGS. 52 to 56, in which FIG. 52 shows a delta type pixel distribution, FIG. 53 shows a four-pixel distribution, FIG. 54 shows a stripe type pixel distribution, FIG. 55 shows a diagonal type distribution, and FIG. 25 shows a color-mixing type display unit of the related art.

Liquid crystal color display having red, green and blue pixels, have pixel distributions of either a delta distribution shown in FIG. 52, a four-pixel distribution shown in FIG. 53, a stripe distribution shown in FIG. 54, or a diagonal distribution shown in FIG. 55. In these cases, if a user watches the display from a distance, the three primary colors are optically integrated because of limits of human visual acuity. If, however, the image is magnified when displayed, the three primary colors of the pixels are visually distinguishable from one another, thereby greatly lowering the image quality. To cope with this shortcoming, a technique has been proposed to locate the diffusing plate 1151 as shown in FIG. 56 after the color display panel 1150 so as to visually make each pixel less distinguishable. The ray of light emitted from the pixels 1152 on the display 1150 are diffused through the diffusing plate 1151. Hence, the image 1153 of each pixel on the diffusing plate 1151 is spread so that the pixel images overlap each other, realizing color mixture on the display.

Next, a color-mixing type display unit will be discussed as a third kind of the second related art with reference to FIG. 57. As shown, three differing primary color pixels 1161, 1162, 1163 which are intended to be color-mixed are together enclosed by physical barriers 1164, 1165, 1166, and 1167. The physical barriers restrict the color-mixing to each mutually confined three color pixel triplet. The colors are mixed through the diffusing plate 1168 and appear as a mixed-color pixel 1169 on its surface.

In display application, there has been heretofore proposed a head-mounted type display (HMD) as shown in FIG. 58. If a display panel 1172 illuminated from a backlighting 1171 located in the helmet type frame is magnified through the effect of a lens 1173, its image will expand to cover with a large field of view. The mounting of the HMD to the head requires that it be small and light. To meet this requirement, it is desirable that the display panel 1172 be a liquid crystal display and the backlighting unit 1171 be a luminescent lamp.

However, with the first type of the second related art the diffusion characteristics of the diffusion plate are difficult to contract with precision, and it is difficult to obtain a desirable pixel image intensity distribution on the surface of the diffusing plate.

Further, the second type of the second related art has the similar problem to the above when mixing colors with each other. The high-frequency components of the spatial frequency are lost from the overall image and the image content of the display is disadvantageously made vague.

Moreover, the third type of the second related art, which having the advantage of maintaining high-frequency components of a spatial frequency of the overall image even when the colors are mixed, requires technically challenging physical barriers to guide the rays of light. This type of the related art offers no control over varying the pixel's intensity distribution and thereby provided a limited improvement small allowance in designing the LCD display. This type of the related art provides no function for smoothing the borders between the pixels though the color mixture is realized. Finally, fabrication of the physical barriers for guiding the rays of light is too costly.

Next, the description will be oriented to a third related art which concerns a liquid crystal display having three kinds of pixels, red, green and blue pixels on one display with reference to FIGS. 52 to 55 and 59.

As mentioned above with respect to the second related art, FIG. 52 shows the delta pixel distribution. FIG. 53 shows the four-pixel distribution. FIG. 54 shows the stripe pixel distribution. FIG. 55 shows the diagonal pixel distribution. FIG. 59 shows a related art involving color mixing.

A liquid crystal color display having red, green and blue pixels on a single display can employ the delta pixel distribution shown in FIG. 52, the four-pixel distribution shown in FIG. 53, the stripe pixel distribution shown in FIG. 54, or the diagonal distribution shown in FIG. 55. In all case, if the user watches the display from a distance, the three primary colors are optically integrated because of limits in human visual acuity. If, however, the display is magnified such as when viewed through a lens, the three primary colors of the pixels are visually separated from one another, thereby greatly lowering the image quality. To cope with this shortcoming, a color-mixing system has been studied which mixes the pixel colors so that the color pixels are not perceived to be visually separated. As an example of this system, as shown in FIG. 59, a diffusing plate 1082 is provided after a panel 1081 for visually making the pixels less distinguishable. Since a backlight 1080 emits diffuse light to the panel 1081 for illuminating the panel, the ray of light emitted from the pixels 1083 on the panel 1081 form image 1084 of magnified pixels. As such, these pixel images overlap with one another, mixing the colors on the display.

The third related art provides no capability for controlling the divergence of the diffused ray emitted from the backlight unit 1080, so that the rays may spread widely. Shortening the distance from the panel 1081 to the diffusing plate 1082 would result in a narrower and more desirable spread of the pixel's image 1084, however the necessary thickness of the class superstrate of the liquid crystal panel restricts toe shortening of this distance to a length that results in an undesirably wide pixel image spread. Limitations on the range of speed of diffusion with available diffusion plates prevent the diffusion plate 1082 from being able to compensate for the excess divergence of the pixel image in the third related art.

SUMMARY OF THE INVENTION

It is an object of the present invention to provide an image displaying device which is arranged to have a less costly display unit for offering high image quality and a high degree of freedom in optimizing the display, and to provide a small and lightweight backlighting unit for the display unit.

It is another object of the present invention to provide an image displaying device which is arranged to prevent the image content of the display from being smeared and to have a less costly color-mixing display unit for offering high image quality and greater freedom in designing the characteristics of the display.

In carrying out the objects, according to the first aspect of the present invention, an image display device arranged to use a display unit, includes a pixel multiplying means located on a display unit surface of the display device and whereby input pixels displayed on the display unit are visually increased in number when the pixels are output.

According to a second aspect of the present invention, an image display device arranged to use a liquid crystal display, includes: a lighting means for emitting diffuse light for lighting a liquid crystal display; and a fine refracting means for refracting rays passed through the liquid crystal display in a predetermined condition.

The fine refracting means may be formed inside of the glass plate, which is a constituent component of the liquid crystal display unit.

The fine refracting means may be a fiber optics plate.

The fine refracting means may comprise a micro lens array or a mixed element of a micro lens array and a diffuser.

Further, it is preferable to provide a means for visually magnifying the image.

It is further preferable to provide a pair of the image displaying device.

In operation, the pixel multiplying means is located on the display, unit. The pixels of on the display unit are applied to the pixel multiplying means by which the pixels appear to be increased in number as they are output.

Moreover, the lighting means operates to emit diffuse light to the liquid crystal display unit. The applied rays are selectively passed through the liquid crystal display unit according to the image displayed in the liquid crystal display unit. The light passed through the liquid crystal display unit is refracted by the fine refracting means in a predetermined way.

The provision of the magnifying means makes it possible to magnify the image passed through the fine refracting means. Further, the pair of image display units permits the matching of display images to the user's left nd right eyes separately.

Since the micro lens array is used as the pixel multiplying means, control of design is enabled to provide optimal output in accordance with the pixel pitch and the pixel distribution of the liquid crystal display.

In this designed optimal output, the gap between the pixels is effectively filed so as to allow the image to appear continuous. For a color display, the colors are mixed so that the image quality is kept high even if the image is magnified, and the causes of user eye strain are greatly suppressed.

The fine refracting means may have the same or smaller pitch than the pixel pitch of the liquid crystal display; this provides a degree of freedom in overall system design.

According to a third aspect of the invention, a display device includes: a lighting means for outputting white parallel rays; a light valve for controlling the transmittance of the parallel rays emitted from the lighting means; a fine refracting means for properly refracting the rays whose transmittance is controlled by the light valve and outputting the refracted rays; and means for scattering the rays output from the fine refracting means.

According to a fourth aspect of the invention, a display unit includes: a lighting means for emitting white parallel rays; a pixelated coloring means for putting three primary colors of red, green and blue to the parallel rays emitted from the lighting means and outputting these colored rays; a light valve for controlling a transmittance of the colored rays output from the coloring means; a fine refracting means for freely refracting the colored rays whose transmittance are controlled by the light valve and outputting the refracted colored rays; and a mixing means for mixing the rays colored by three primary colors output from the fine refracting means.

Preferably, the mixing means contains a glass plate and the fine refracting means comprises a micro Fresnel lens formed on a surface of the glass plate. Or the fine refracting means may comprise a binary optics element. Further, the fine refracting means may have a positive lens power or a negative one. In addition, the fine refracting means may contain eccentric lenses.

According to a fifth aspect of the invention, a backlighting device used as the lighting means of the display unit described above, includes: a white point light source for outputting white rays; means for refracting rays output from the point light source; an optical fiber for transmitting rays refracted by the refracting means; and a converting means for converting the rays transmitted by the optical fiber into parallel rays.

Preferably, the converting means may contain one or more parabolic mirrors or a Fresnel lens.

The image display device is arranged to have the display unit, the backlighting unit, the signal generating unit, and the signal transmitting unit.

In the operation of the fourth to the fifth aspects of the invention, in the monochrome display unit, the light valve operates to control a transmittance of a parallel ray output from the lighting means and the fine refracting means operates to refract the ray whose transmittance is controlled by the light valve when the ray is output. The mixing means operates to scatter the ray output from the fine refracting means. As compared with the foregoing second type of the related art arranged to locate the diffusing plate for making each pixel vague, the monochrome display unit provides a far more vivid image and enables precise control of the intensity distribution of pixel images on the scattering means. Hence, the borders between the adjacent pixels may be interpolated for smoothing the borders, making possible a higher-quality image.

Turning to the color-mixing type display unit, the coloring means operates to color the three primary colors of red, green and blue in a pixel distribution onto the parallel rays of light output from the lighting means. The light valve operates to control the transmittance of the rays of three primary colors output from the coloring means. Then, the fine refracting means operates to refract the rays of three primary colors. Next, the mixing means operates to mix together rays of the three primary colors output from the fine refracting means. As compared with the second type of the second related art which provides a diffusing plate to blur pixels together, the current invention preserves the high-frequency components of the spatial frequency making it possible to offer a vivid image. As compared with the third type of the second related art, the fine refracting means operates to control the light intensity distribution incident upon the mixing means. With this operation, the borders between the adjacent pixels after colors are mixed are allowed to be smoothly interpolated, which results in improving the degree of freedom in design of the display.

In the backlighting unit, a refracting means operates to refract white light output from the point light source. The refracted light is transmitted through an optical fiber. A converting means operates to convert the light transmitted through the optical fiber into parallel rays. This backlight unit's power supply can be physically removed a great distance from the panel because of the use of optical fiber reducing the actual backlight unit in size and weight. In the embodiment of this invention to be described below, the relatively large and heavy light source unit, that is, the point light source and the light source unit composed of the refracting means for guiding the ray to the optical fiber can be held in a separate housing from an HMD. In an HMD application only the optical fiber and the converting means contribute to the size and weight of the HMD. A light source unit of the embodiment to be discussed later comprises a point light source for a white ray and the refracting means. The refracting means operates to condense the rays emitted from the point light source into an area which is smaller than the diameter of the optical fiber. By applying the condensed ray to the end of the optical fiber, the rays are introduced into the optical fiber. The rays of the light source are transmitted via the optical fiber to the converting means located behind the display. The optical fiber is composed of thin fibers and is very lightweight and smoothly bendable. As such, by bundling the optical fiber with the video signal lines connected to the HMD, the rays are advantageously transmitted to the HMD device. The converting means operates to convert the rays transmitted through the optical fiber into the parallel rays and feed the parallel rays to the display. The converting means is realized by a parabolic mirror or a Fresnel lens in order that the converting means is made more lightweight than a converting means composed of an ordinary lens. According to the backlight unit of the invention, therefore, it is possible to realize the backlight unit for outputting the parallel rays, which backlighting unit is quite suitable to the display unit according to this aspect of the invention.

Further, the image display device according to this aspect of the invention, comprising the display unit and the parallel ray backlight unit may be applied as a head mounted type display which offers a high-quality image and has advantages in size and weight characteristics.

According to a sixth aspect of the present invention, a color-mixing display device includes: divergence control type lighting means for outputting rays whose divergence can be controlled; a filter for transmitting rays of three primary colors, red, green and blue, of the rays output from the lighting means, selectively about pixels; a light valve for controlling the transmittance of the rays of the three primary colors output from the filter at each of the pixels; and a back projection type screen for receiving the rays of the three primary colors whose transmittances are controlled by the light valve from the back and reproducing an image from the rays.

In operation, the divergence control type lighting means operates to output rays contained within a specified degree of divergence. The color filter is operated to selectively pass rays of the three primary colors, red, green and blue from the rays output from the divergent control type lighting means. The light valve controls the transmittance of the rays of the three primary colors about each pixel. The back projection type screen operates to receive the rays of the three primary colors whose transmittances are controlled by the light valve and reproduce an image from the rays. The color mixture and smoothing of each pixel of the image are realized on the back projection type screen. The size, the form and the intensity distribution of the image pixels have great freedom of design. The resulting high-quality image is realized even if the image is magnified. Hence, unlike the conventional device, the color mixture and the smoothing are carried out without having to provide a device for mixing colors and smoothing the image between the display panel and the screen.

In this embodiment of the present invention, unlike the prior art arranged to do processing after the rays are passed through the panel, rays of light having a proper divergence are provided to the panel by the lighting unit. No device is provided between the panel and the screen. The lighting unit can be (i) a device for taking rays of white light from a fine surface light source of a constant size, form and intensity distribution and by the action effect of the refracting means converting them to divergence controlled rays, (ii) a device using a refracting means and a color separating light source having a plurality of light sources for emitting light of the three primary colors, red, blue and green, these sources being properly disposed, or (iii) a device for providing a means of ray divergence control for selectively passing rays between a diffuse backlight unit and the panel. The lighting unit enables the size, the form and the intensity distribution of each pixel's image on the screen to be fully controlled for all of the pixel distribution. The relative position of each color pixel to another is allowed to be controlled. Hence, the device may be designed so as to project the images of the red, the green and the blue to be color-mixed onto one point of the screen.

Further objects and advantages of the present invention will be apparent from the following description of the preferred embodiments of the invention as illustrated in the accompanying drawings.

DESCRIPTION OF THE PREFERRED EMBODIMENTS

Preferred embodiments of the present invention will be described hereafter with reference to the appended drawings.

Figure 1:
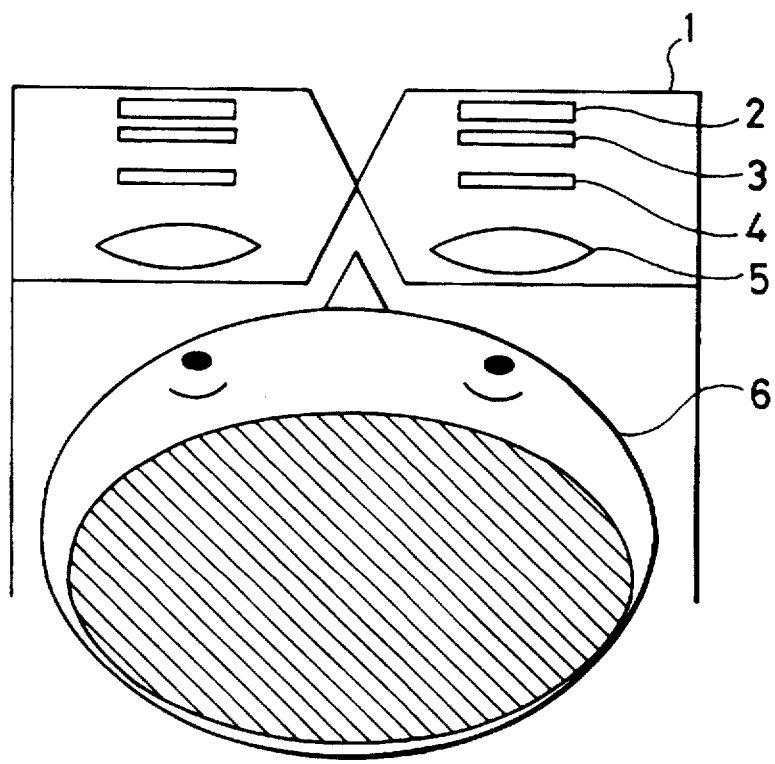
FIG. 1 is a view showing an head-mounting type display to which an image display device applies according to a first embodiment of the present invention.

In FIG. 1, a head mounted type display (HMD) according to this embodiment is arranged to have an eyeglasses type case 1, a backlight unit 2, a liquid crystal display 3, a micro lens array 4, and a lens 5. As shown, the overall device is housed in the eyeglasses type case 1 so that it may be fitted to the head of a user 6 when it is used.

The part corresponding to the lens of the eyeglasses is arranged to have a backlight unit 2, a liquid crystal display 3, a micro lens array 4, and a lens 5 located in sequence from the outside. The user views a magnified image when the device is fitted to his or her head.

In such an arrangement, if the lens operates to magnify the image, the pixels forming the image to be displayed are not visually separated on the screen. Further, for the color display, the color pixels are not visually separated. A high-quality image results even though the image has been magnified.

The micro lens array 4 is an optical element manufactured as a planar array of minute lenses. The lenses are disposed at the same pitch as the pixel pitch of the display or at a smaller one. An image pattern as shown in FIG. 2 on the liquid crystal display through the micro lens array.

The function of the micro lens array will be discussed with reference to FIG. 2.

Figure 2:
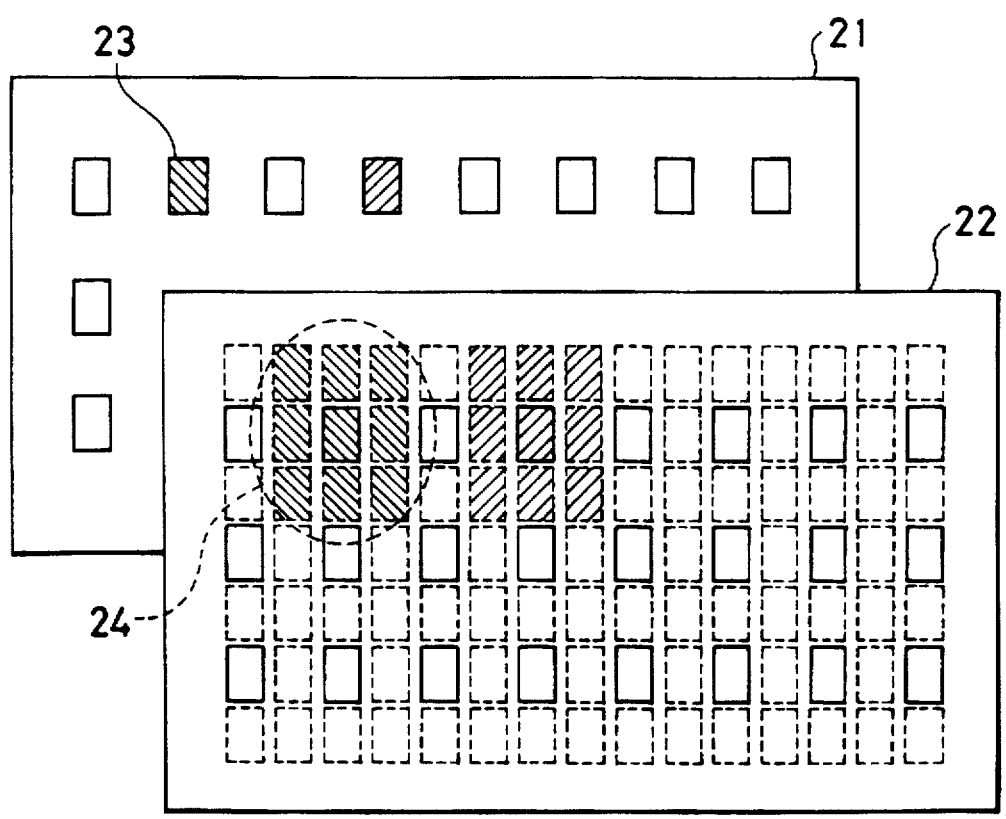
FIG. 2 is a view for explaining the effect of a micro lens array included in the image display device according to the first embodiment.

In FIG. 2, a numeral 21 denotes a liquid crystal display. A numeral 22 denotes a micro lens array. A numeral 23 denotes pixels to be addressed. A numeral 24 denotes an image formed of pixels by the micro lens array.

Figure 51:
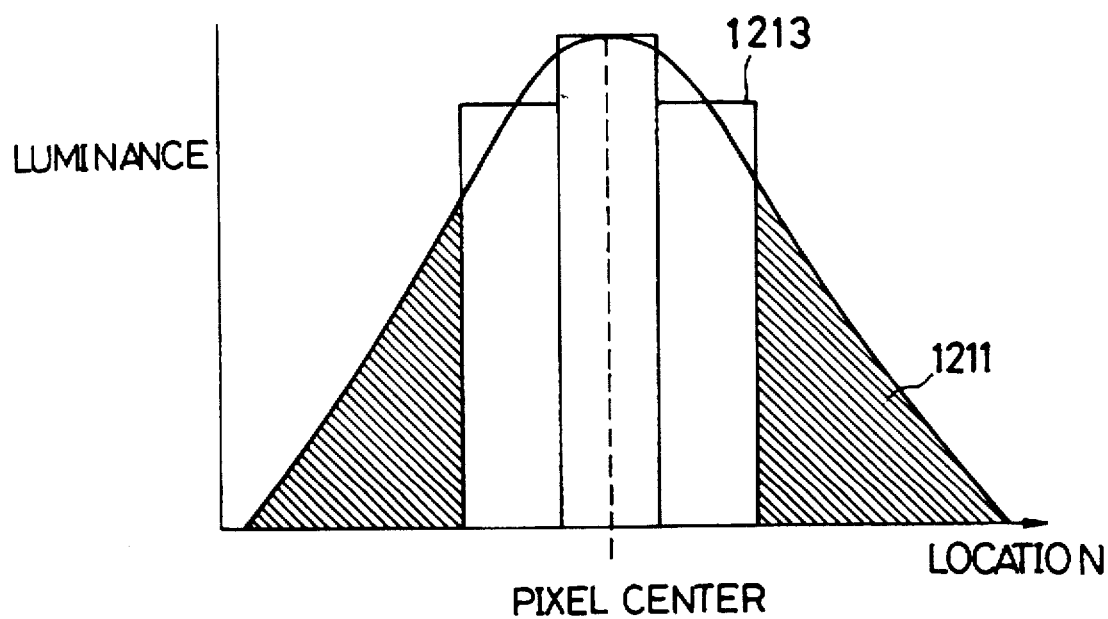
FIG. 51 is a graph showing a luminance distribution of a pixel image produced by a light scattering plate and a micro lens array.

The characteristic function of the micro lens array is based on the effect that reproduced image of the pixels appears discretely on the periphery of each pixel. This function makes it possible to eliminate the shadow space between adjacent pixels and form the luminance distribution of the pixel image like a square 1213 as shown in FIG. 51. The resulting image, therefore, keeps acute edges, eye strain to the user. Moreover, by properly designing a focal distance, a pitch, a distribution, a form of the micro lens array 4 and a distance between the micro lens array and the panel, it is possible to control the interval between each pixel in the reproduced image, the number of reproduced image pixels, and the range about each pixel where image pixels are reproduced.

The micro lens array has the two functions indicated below.

As a first function, an effect is provided of sporadically reproducing image pixels around each pixel for virtually increasing the number of pixels. As a second function, another effect is provided of defining the area wherein the reproduced image pixels of each pixel appear. Another advantageous feature, is that the micro lens array does not need precise positioning with regard to the pixels of the liquid crystal display.

At first, the first effect will be discussed.

Figure 3:
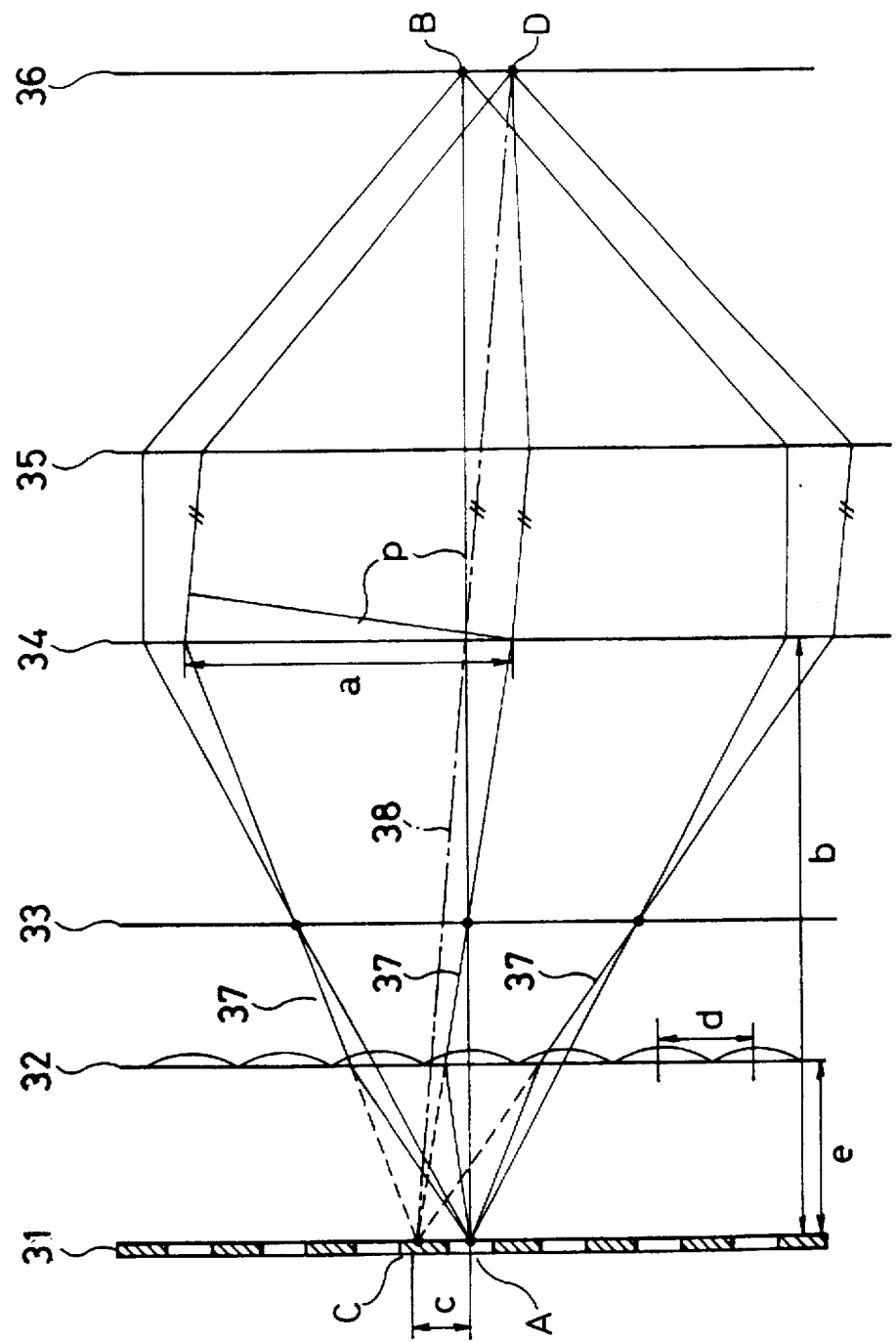
FIG. 3 is an explanatory view showing a first effect of the micro lens array.

Assume that an optical system of the head mounted type display (HMD) 1 is modeled as shown in FIG. 3.

In FIG. 3, a numeral 31 denotes a liquid crystal display. A numeral 32 denotes a micro lens array. A numeral 33 denotes the real plane of the liquid crystal display, formed through the effect of the micro lens array. A numeral 34 denotes a magnifying lens. A numeral 35 denotes the lens of an eye. A numeral 36 denotes a retina of the user.

Herein, for making the description simpler, the arrangement is assumed as follows.

The distance between the magnifying lens 34 and the liquid crystal panel 31 coincides with the focal distance of the magnifying lens 34. The focal point of the eye's lens 35 is adjusted to allow the user to clearly see the liquid crystal panel. The center A of the pixel is located on the optical axis of the lens.

At first, consider rays of light emitted from the center A of the addressed pixel which then passed through the centers of the micro lenses of the array 32. These rays pass through the magnifying lens 34 by whose action they are converted into rays parallel to the optical axis of the lens 34. The parallel rays are focused onto the point B of the retina 36 through the effect of the eye lens 35.

The pathes of these rays are the same whether a micro lens array 32 is inserted in the arrangement or not, since by passing through the centers of individual micro lenses they are not refracted. In either case the rays will focus to B of FIG. 3.

Next, consider the ray of light traveling along another passage. The rays of light are refracted through the micro lens array so that the ray may travel as if it is emitted from a different point from the point A on the liquid crystal panel. As an example, consider the ray of light 37 which seems to be emitted from a non-luminous point C located between the pixels. After the ray of light is refracted by the micro lens array, the ray is passed through a real image point corresponding to the point A and then reaches the magnifying lens 34 in which the ray is converted into a ray parallel to all other rays that appear to generate from virtual source point C.

Since these rays travel as if they are emitted from the point C, the angle of the parallel rays is no longer parallel to the optical axis but has an inclination (angle p) being parallel to an auxiliary line 38 connecting the point C with the center of the magnifying lens 34.

These rays interfere with each other according to the Fraunhofer grating condition. If a light path difference between the rays is close to a integer multiple of the light's wavelength, those rays are intensified by each other. In the other case, those rays are canceled by each other.

Assuming that the light path difference coincides with the light wavelength, the rays of light are refracted by the lens 35 and then are focused onto the point D at which those rays are intensified by each other. The resulting rays form an interference figure. As a result, the point A appears reproduced on the point C located in the opaque boundary between pixels. That is, the point C appears as a virtual image on the panel.

In this case, the light path different coincides with the wavelength. However, since the interference condition only requires the light path difference to be an integer multiple of the wavelength, a multitude of the interference figures, that is, the virtual image points of A are periodically produced at the same intervals as the interval c between the points A and C.

Next, the expression for obtaining the interval c of the interference figure will be derived as follows.

At first, the interference condition indicates that the light path difference coincides with the wavelength of the ray. Hence, the following expression 1 is established.

$$a \cdot p = w \tag{1}$$

wherein a denotes the distance on the magnifying lens 34 between the rays passed through adjacent micro lenses, p denotes the angle of the ray to be formed with respect of an optical axis, and w denotes a wavelength of the ray.

Further, with respect to the angle p, the following expression 2 will be established.

$$p = c/b \tag{2}$$

wherein b denotes the distance between the liquid crystal display and the magnifying lens, and c denotes the distance between the point A and the point C corresponding to the first interference figure.

Next, by the relationship of similar triangles it is possible to establish the expression 3.

$$b/a = e/d \tag{3}$$

wherein d denotes the pitch of the micro lenses and e denotes the distance between the liquid crystal display and the micro lens array.

By substituting the expressions 2 and 3 for the expression 1, it is possible to derive an expression 4 for obtaining the interval c of the interference figure.

$$c = w \cdot e/d \tag{4}$$

Next, consider the second effect of the micro lens array, in which the interference figure caused by the micro lens array is restricted to a constant range.

Figure 4:
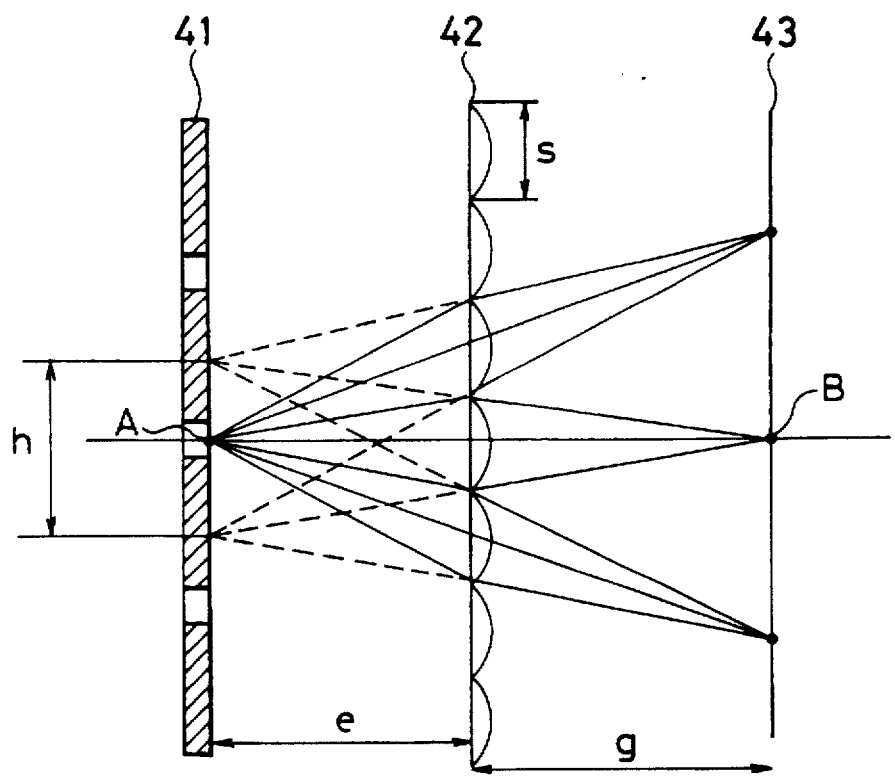
FIG. 4 is an explanatory view showing a second effect of the micro lens array.

For describing it more clearly, the part close to the liquid crystal display shown in FIG. 3 is magnified as shown in FIG. 4.

Like the first effect considered above, rays of light emitted from the point A of a pixel are refracted through the micro lens array and form a real image of the point A such as the one shown as point B.

Since the rays of light travel as if emitted from within the range h, the interference figure are restricted to the range of h. This range is the same about any one of the panel's pixels.

Next, the range h in which the interference figure is restricted will be derived as follows.

At first, the distance between the lens and the point B is obtained by the expression 5 based on the imaging formula.

$$g = e \cdot f/(e-f) \tag{5}$$

wherein e denotes the distance between the liquid crystal display and the lens, f denotes a focal distance of the micro lens, and g denotes a distance between the micro lens array and the point B.

Next, from the condition of similar triangles, expression 6 will be established.

$$h = s \cdot (g+e)/g \tag{6}$$

wherein s denotes a size of the micro lens, and h denotes the range in which the interference figures of the point A appear.

By substituting the expression 5 for the expression 6, it is possible to obtain the following expression 7.

$$h = s \cdot (e/f) \tag{7}$$

In practice, when designing a micro lens array having the desired characteristics, the lens array will be designed according to the following procedure.

At first, by transforming the expressions 4 and 7, the expressions 8 and 9 will be derived.

$$d = (w \cdot e)/c \tag{8}$$

$$f = (s \cdot e)/h \tag{9}$$

Figure 5:
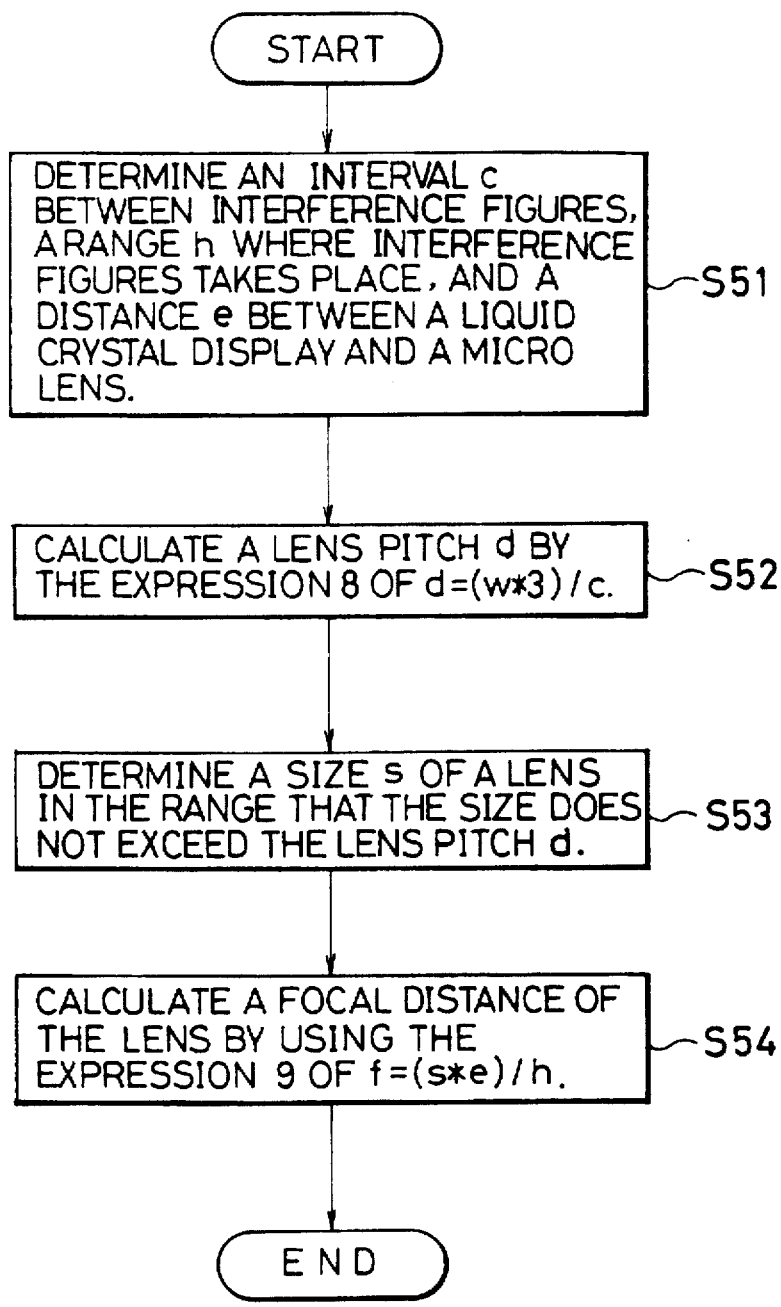
FIG. 5 is a flowchart showing a procedure for designing the micro lens array.

In turn, the procedure for designing the micro lens will be discussed along the flowchart shown in FIG. 5.

At step S51, an operation is performed to determine the interval c of the necessary interference figure, the range h in which the interference figures can arise, and the distance e between the liquid crystal display and the micro lens array. Then, the operation goes to a step S52 at which the pitch d of the micro lens is derived from the expression 8. Next, the operation goes to a step S53 at which the size s of the lens is determined from the pitch d of the micro lens and then goes to a step S54. At this step, the focal distance f of the micro lens is obtained from the expression 9.

Figure 6:
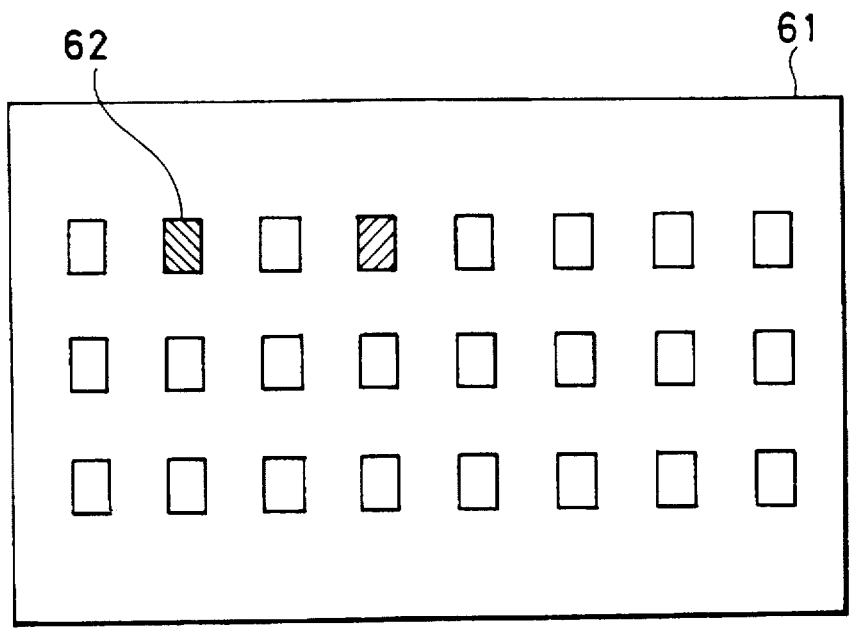
FIG. 6 is an explanatory view showing a liquid crystal display composed of pixels disposed in a stripe manner.
Figure 7:
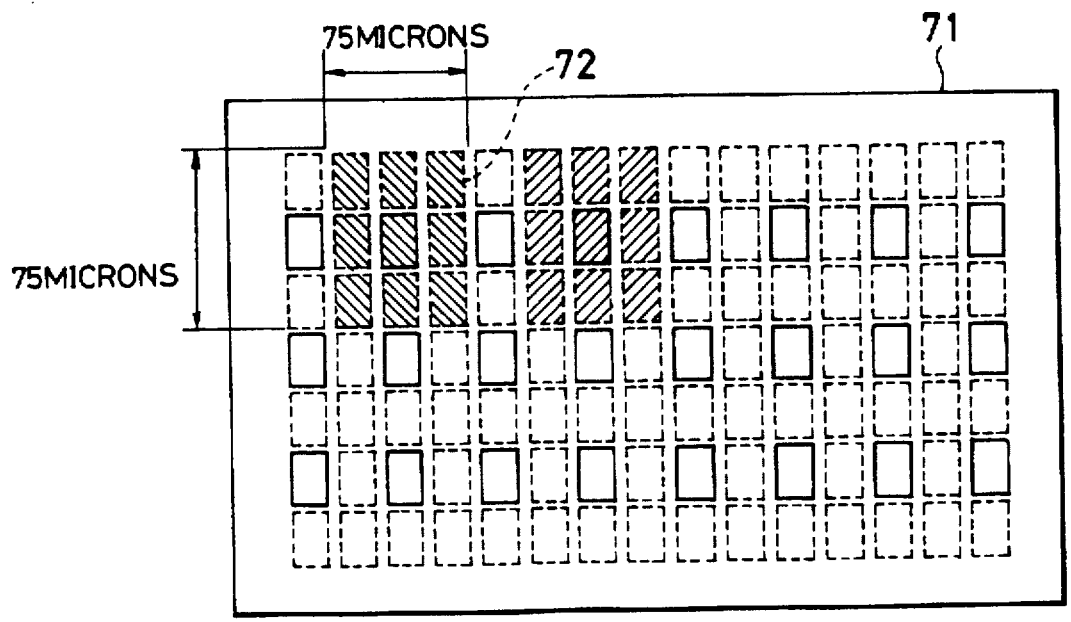
FIG. 7 is a view showing a design of an interference image produced by the micro lens array.

As an example, the liquid crystal display 61 as shown in FIG. 6 is designed. In the display, the pixels are disposed to keep a 50-micro pitch. To form just one interference figure 72 at the middle between the pixels as shown in FIG. 7 with the condition that the distance between the micro lens and the liquid crystal display is 1 mm, it is necessary to set the interval between the interference figures as 25 microns and the range of the interference figure as 75 microns.

With a value of 550 nm as the wavelength of the light, the following designing values are allowed to be obtained from the expressions 8 and 9. The value of 550 nm is used as a central value of the visual spectrum.

| Lens Pitch of the Micro Lens Array | 22 microns |
| Focal Distance of the Micro Lens | 293 microns |

Next, the foregoing designing method will be expanded to the case of a display where the parameters are different in the horizontal and the vertical directions.

In this case, the pitch of the micro lens array and the focal distance of the micro lens will also differ in the horizontal and the vertical directions. Being able to separately adjust the interval and the range of the interference figures for each co-ordinate axis, greater freedom of design is facilitated for the image.

The expressions (8) and (9) are established in the horizontal and the vertical directions if the micro lenses are disposed in a striped manner as shown in FIG. 6. Hence, the same designing procedure as described above holds true to both of the horizontal and the vertical directions.

The form of the range in which the interference figure takes place changes according to the form of each lens. For example, if the micro lens is formed like a hexagon, the interference figure arise in an hexagon area.

Figure 8:
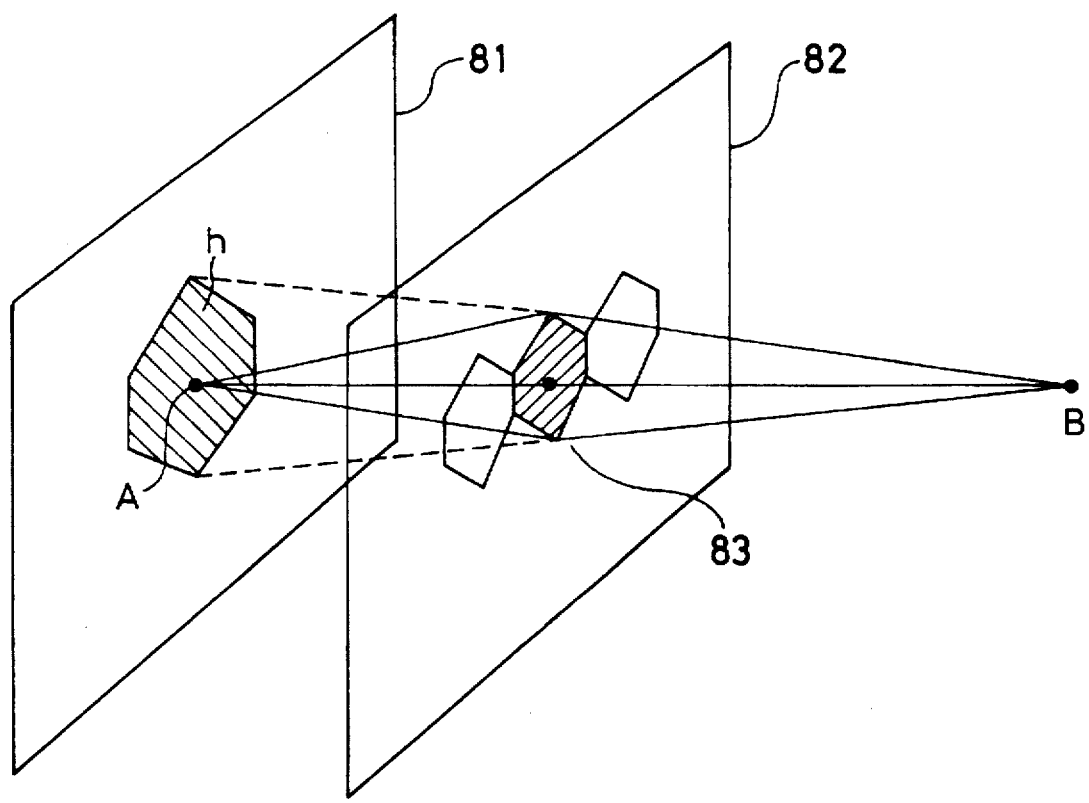
FIG. 8 is an explanatory view showing the range in which an interference image takes place.

FIG. 8 shows the relationship between the form of the micro lens and the range in which the interference figure takes place. The rayfan of light emitted from the point A inside of a pixel contained in the liquid crystal display 81 is refracted by the micro lens 83 so that the rayfan forms a real image of the point A on the point B. At this time, since the rays of light seem to have originated from within the range h, the interference figures are restricted to the range of h. This range holds true for any of the micro lenses. The form of the range in which the interference figure takes place is determined by the form of the micro lens 83. Based on this relation, by changing the form of the micro lens 83, it is possible to freely control the shape of the area in which the interference figures arise.

Figure 9:
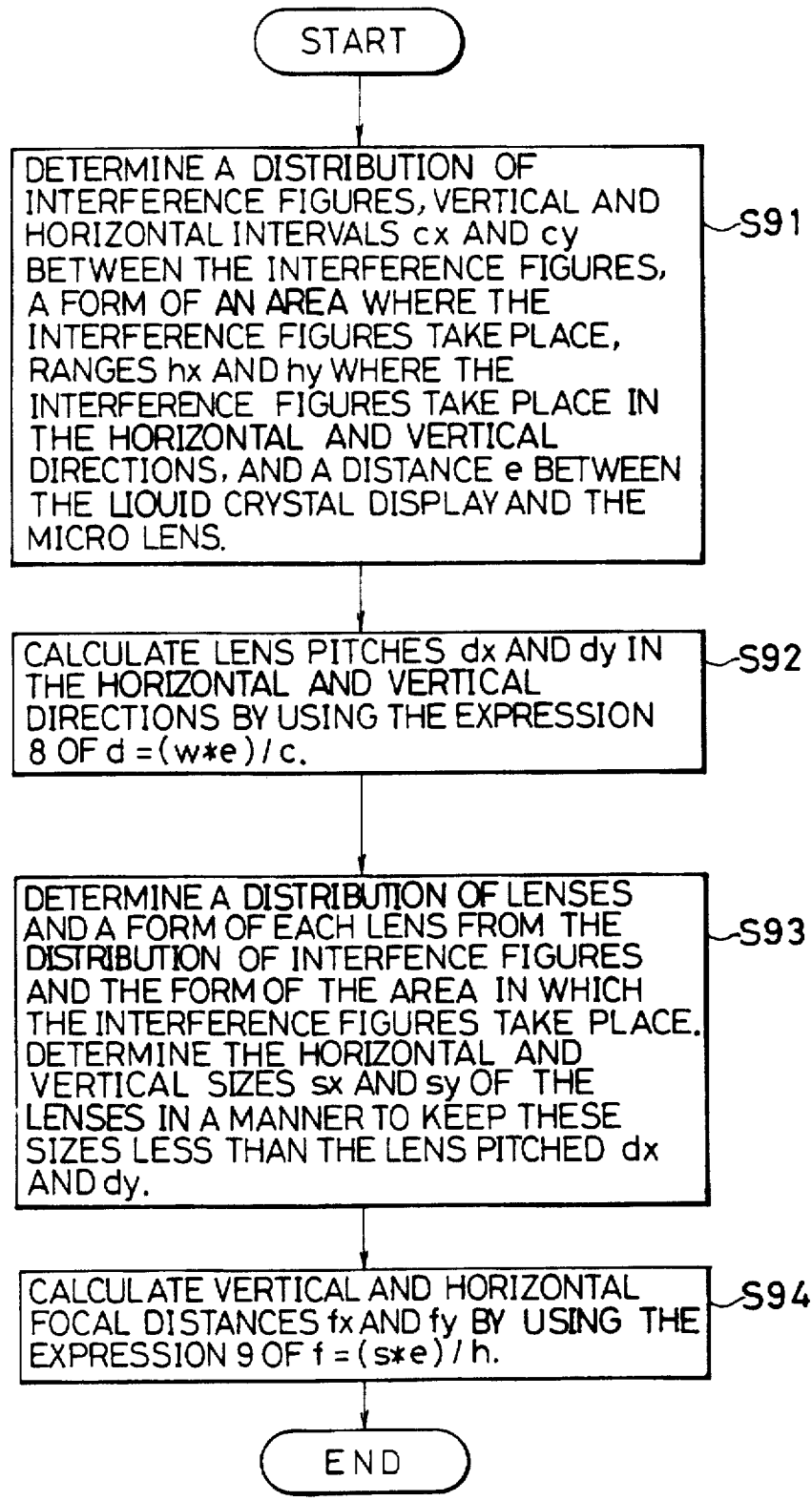
FIG. 9 is a flowchart showing a procedure for designing a micro lens array if the micro lens array has different parameters in the horizontal and the vertical directions.

FIG. 9 is a flowchart showing a designing procedure if the parameters are different in the horizontal and the vertical directions. As an example, a design is executed as shown in FIG. 10.

Figure 10:
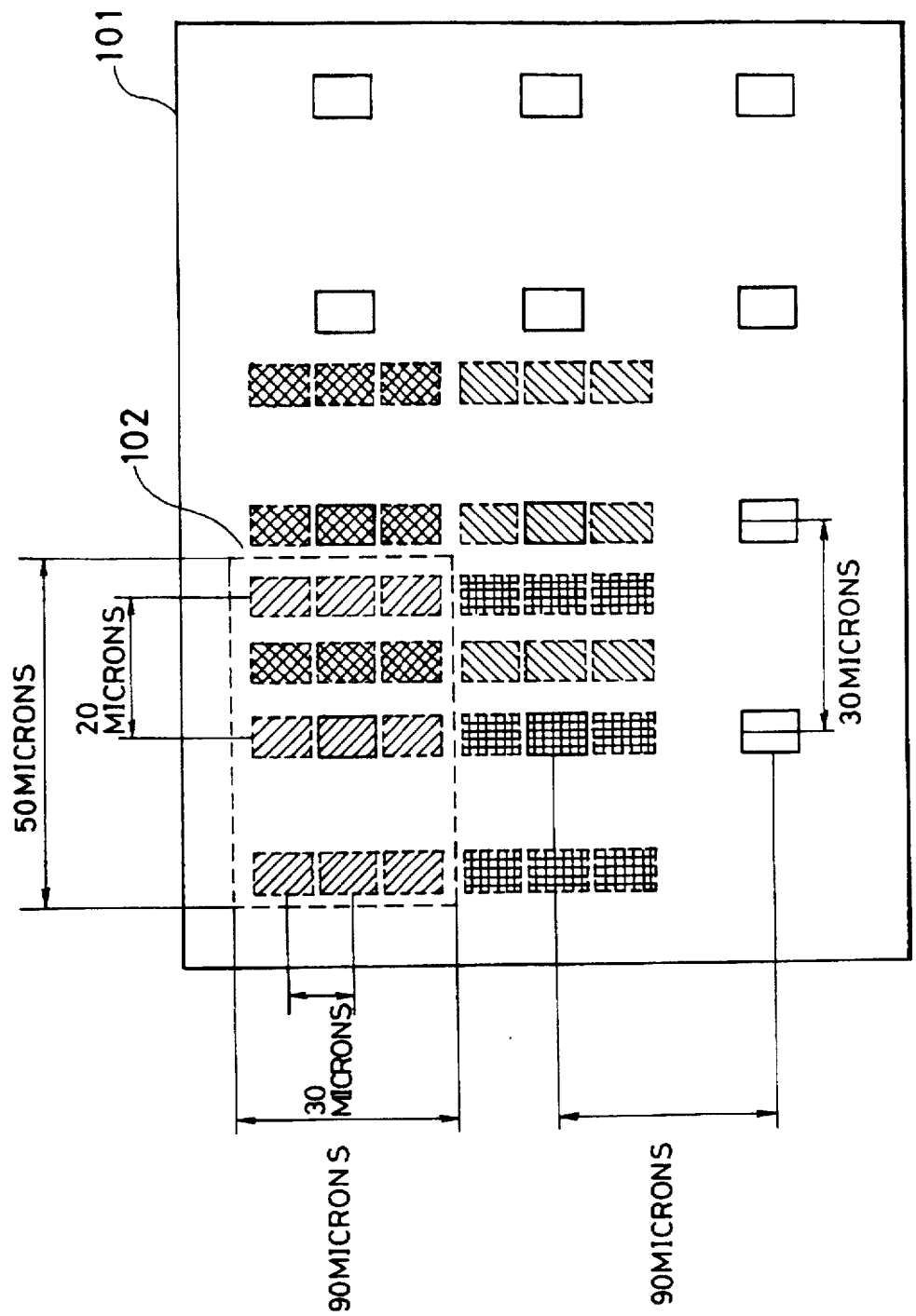
FIG. 10 is a view showing a design for an interference image appearing on the liquid crystal display composed of pixels disposed in a stripe manner.

In FIG. 10, the liquid crystal panel includes component pixels disposed in a striped manner. The pixel pitch is 30 microns in the horizontal direction and 90 microns in the vertical direction. Further, the total number of the interference figures appearing around the subject pixel is eight. The interval is 20 microns in the horizontal direction and 30 microns in the vertical direction. Hence, the range for the interference figure may be a rectangle, the horizontal side of which is 50 microns and the vertical side of which is 90 microns. In addition, the interval between the micro lens array and the liquid crystal display is set as 1 mm.

The flowchart of FIG. 9 indicates a procedure for designing the micro lens if the parameters differ in the horizontal and the vertical directions. At step S91, the operation is executed to determine the distribution of the interference figures, the interval cx and cy of the interference figure in the horizontal or the vertical direction, the shape of the area in which the interference figure takes place, the ranges hx and hy in which an interference pattern takes place in the horizontal or the vertical direction, and the distance e between the liquid crystal display and the micro lens. Then, the operation goes to step S92. At this step, an operation is executed to calculate lens pitch, dx and dy, in the horizontal and vertical directions by using the expression 8. Then, the operation goes on to step S93.

At this step, the distribution of the micro lenses and the form of each micro lens are determined depending on the distribution of interference figures and the range in which each interference pattern takes place. Then, the lens size and or sy in the horizontal and vertical directions is determined, restricting the size to within the lens pitch dx or dy obtained at the step S92. Next, the operation goes to step S94.

At this step, the focal distance fx or fy of each micro lens in the vertical or the horizontal direction is determined on the expression 9. Thereby, the operation is concluded.

Following the flowchart shown in FIG. 9, the below design values are calculated.

| Distribution of Micro Lenses | Stripe Distribution |
| Form of Micro Lens | Rectangular |
| Horizontal Lens Pitch | 27 Microns |
| Horizontal Focal Distance | 560 Microns |
| Vertical Lens Pitch | 18 Microns |
| Vertical Focal Distance | 200 Microns |

Figure 11:
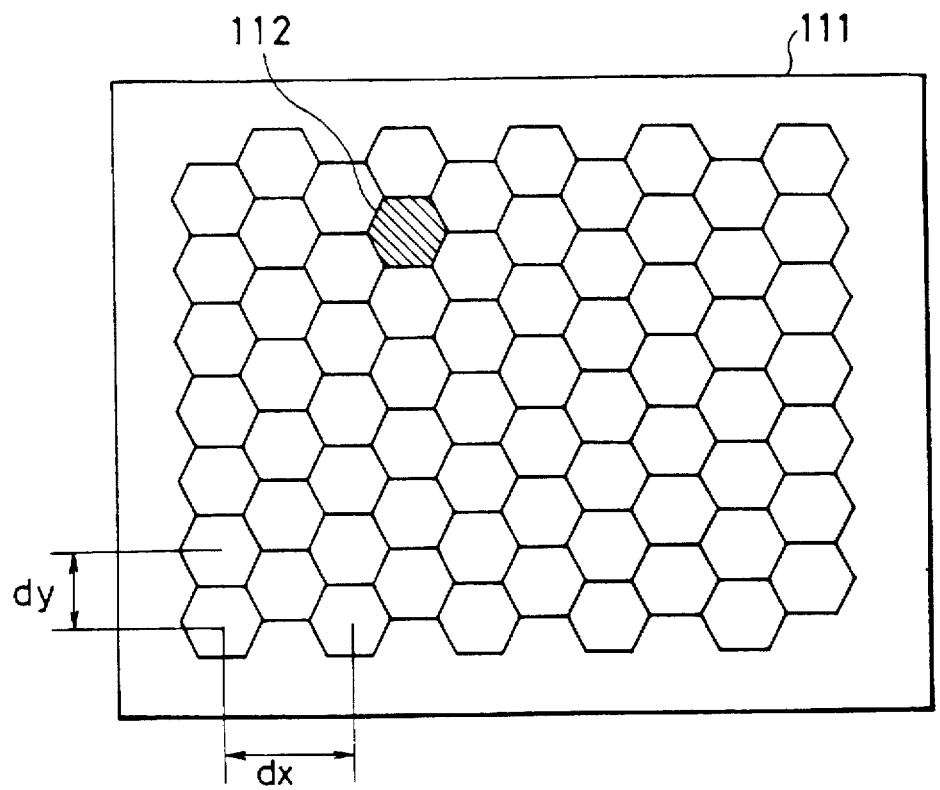
FIG. 11 is an explanatory view showing a micro lens array disposed in a delta manner.
Figure 12:
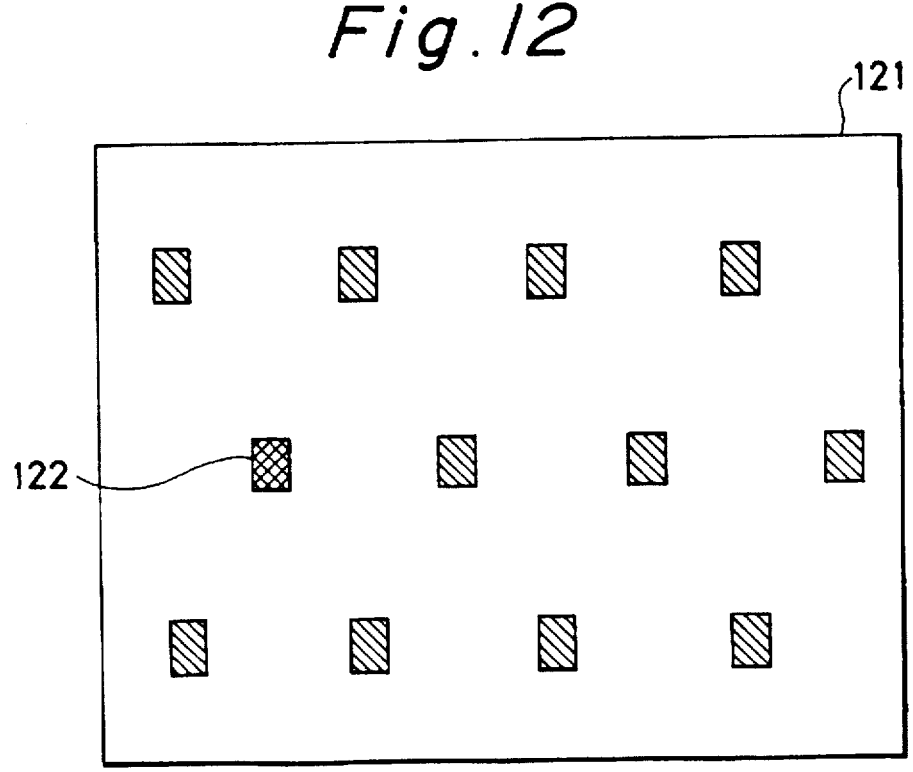
FIG. 12 is an explanatory view showing a liquid crystal display composed of pixels disposed in a delta manner.
Figure 13:
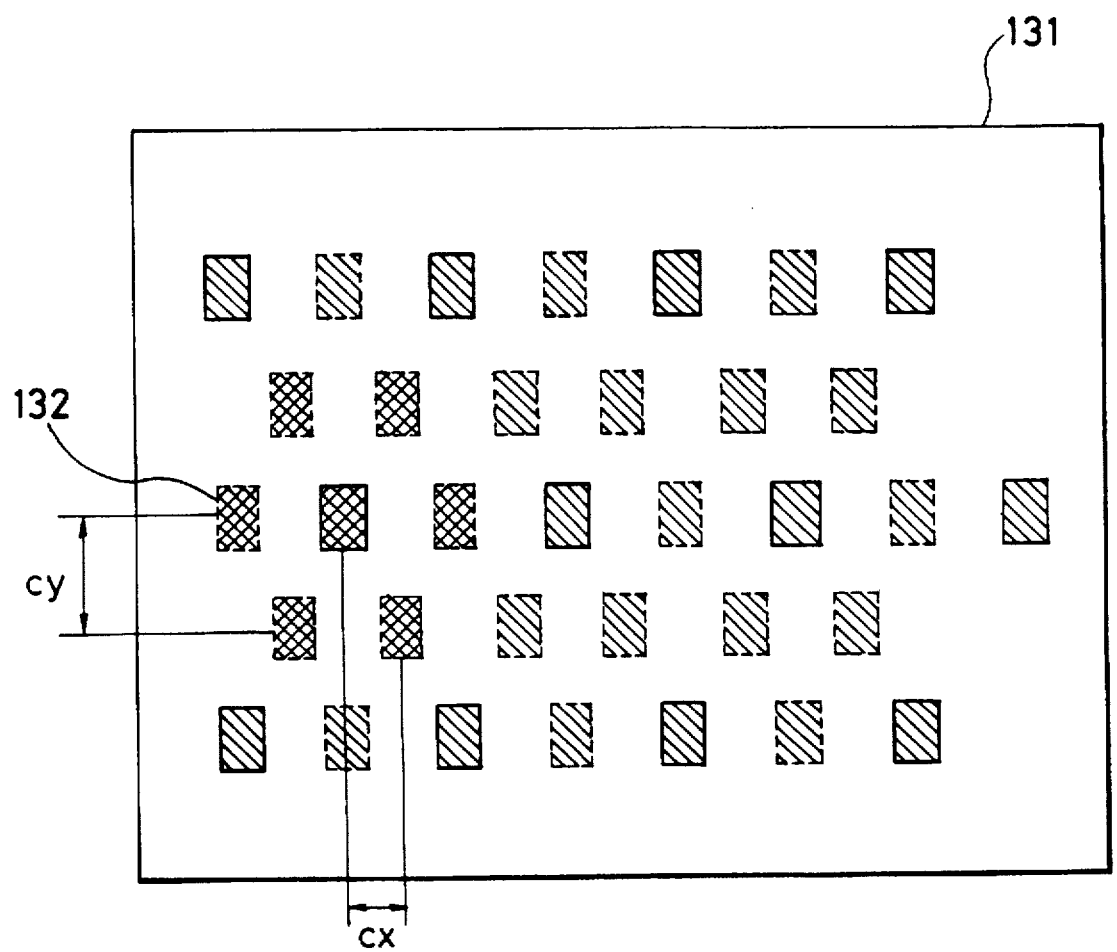
FIG. 13 is an explanatory view showing an interference image produced by the micro lens array disposed in a delta manner.

Further, the interference figures 132 in a delta distribution can be generated as shown in FIG. 13 by using a delta distributed hexagonal micro lens array 111 as shown in FIG. 11. This is effective in liquid crystal display 121 having pixel distribution as shown in FIG. 12. As shown in FIG. 11, the horizontal micro lens pitch is defined as dx and the vertical micro lens pitch is defined as dy. As shown in FIG. 13, the horizontal and vertical interval between the interference figures is defined as cx and cy. Using these definitions, expressions 8 and 9 can be applied.

Hence, following the procedure shown in FIG. 9, the micro lens array can be designed. As an example, a design is done, shown in FIG. 14.

Figure 14:
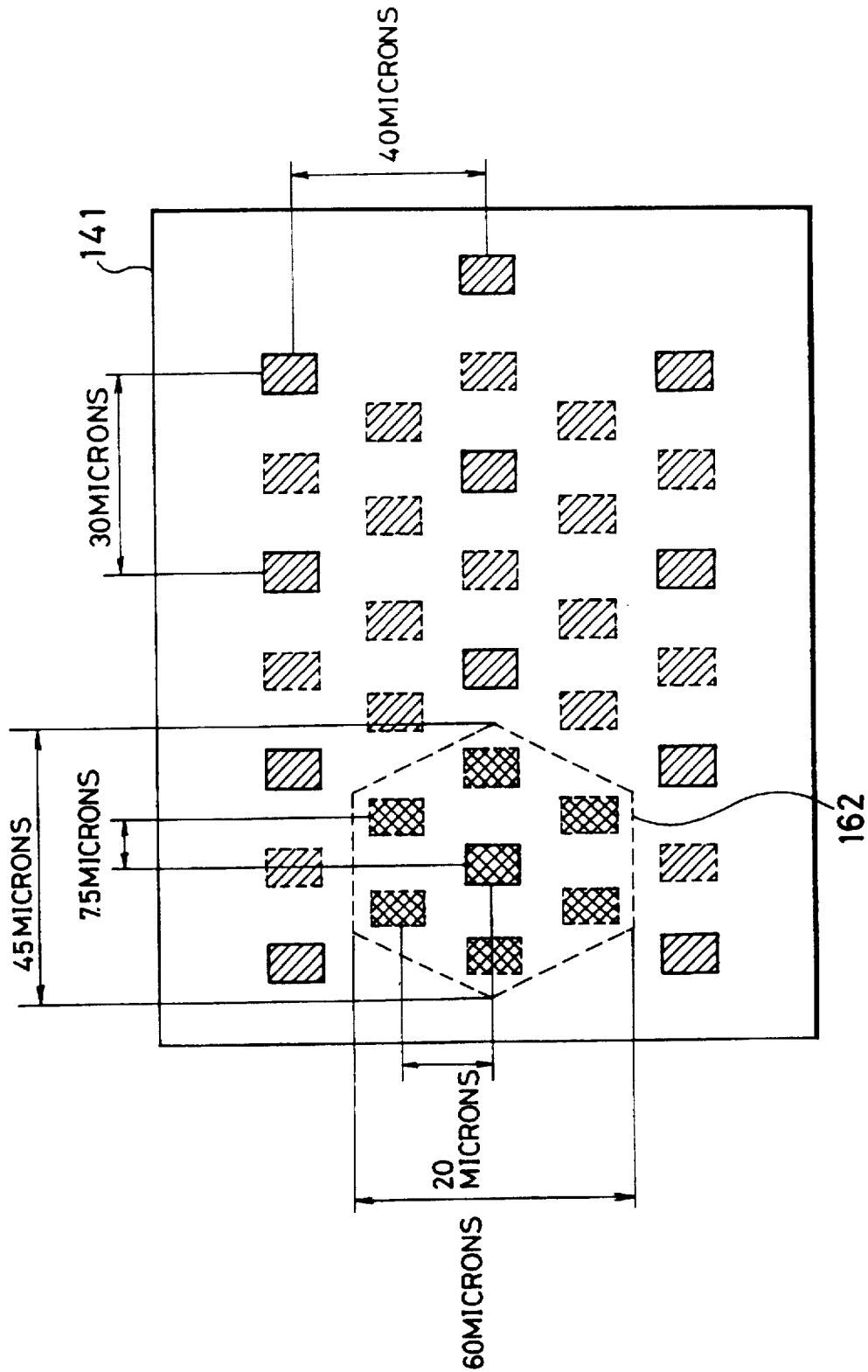
FIG. 14 is an explanatory view showing a design for an interference image produced by the micro lens array disposed in a delta manner.

As shown in FIG. 14, the liquid crystal display 141 comprises pixels disposed like a delta. The horizontal and vertical pixel pitch are 30 and 40 microns, respectively. The total number of the interference figures between the subject pixel and neighboring pixel is six. The interval between the interference figures is 7.5 microns in the horizontal direction or 20 microns in the vertical direction. The area in which the interference figures take place is formed like a hexagon, the horizontal side of which is 45 microns and the vertical side of which is 60 microns. The interval between the liquid crystal display and the micro lens array is set as 1 mm.

If the micro lens array is designed according to the flowchart of FIG. 9 with the aforementioned parameters, the following design values area obtained.

| Distribution of Micro Lenses | Delta Distribution |
| Form of Micro Lens | Hexagon |
| Horizontal Lens Pitch | 73 microns |
| Horizontal Focal Distance | 1089 microns |
| Vertical Lens Pitch | 28 microns |
| Vertical Focal Distance | 467 microns |

When this micro lens array is applied to a color display unit, the reproduced image of each pixel overlaps with the reproduced image of an adjacent pixel. Hence, the colors of both pixels are mixed. When a user views this display's magnified image, the problem of the separation and conspicuousness of color dots is suppressed.

How much the colors are mixed can be controlled by controlling the range of the interference pattern.

As described above, the light filed can be precisely controlled. Hence, in contrast to the system using a light scattering plate, it is possible to remove the non-luminous shadow area between pixels, while preserving the image clarity. In the case of color display unit, the color mixture is realized. Hence, a high-quality image can be obtained even if the image is magnified.

Figure 19:
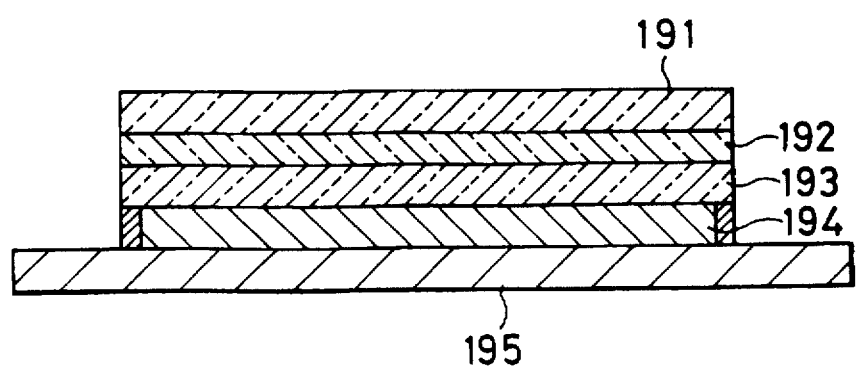
FIG. 19 is a side view showing a liquid crystal display included in the image display device, in which a fine refracting unit is installed inside of a surface glass.

Further, in the design conditions, the distance between the micro lens array and the liquid crystal display may be made smaller than the thickness of glass formed on the surface of the display. In this case, the glass on the surface of the display uses a pair of sandwiched glass plates 191 and 193 (see FIG. 19). A micro lens array 192 is sandwiched between the glass plates 191 and 193. The sandwich is placed on the liquid crystal 194 formed on a substrate glass 195.

Figure A mixing element can be produced by mixing the micro lens array with a diffuser to form a single optical element. In certain applications the mixed optical element will give the most desirable smoothing and mixing results.

Figure 15:
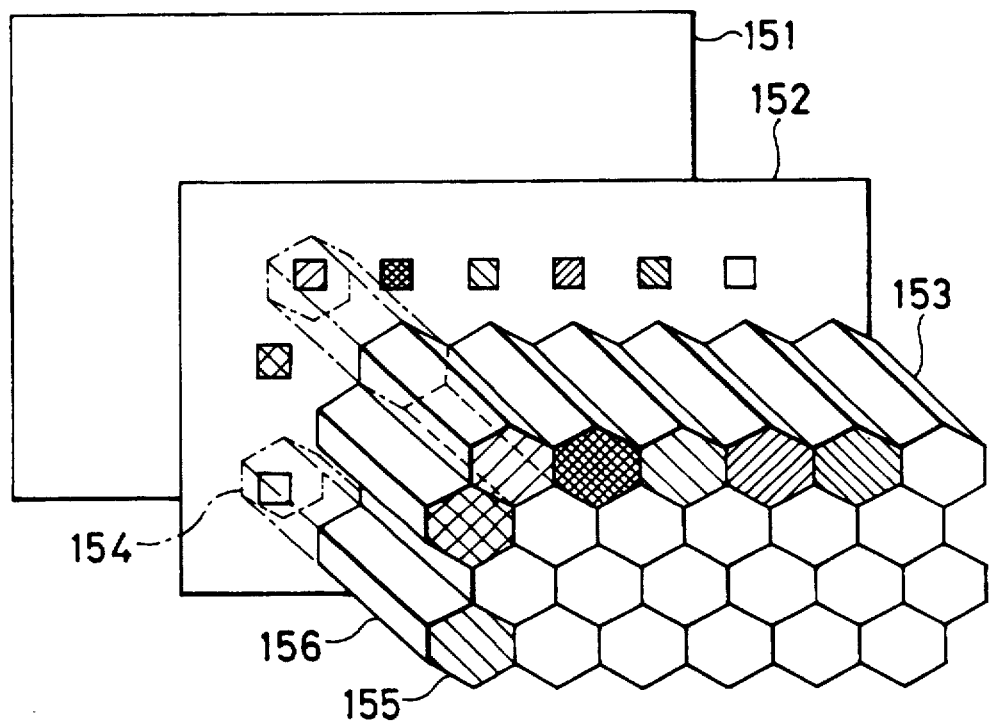
FIG. 15 is a view showing an image display device according to a second embodiment of the present invention.

FIG. 15 shows an image display device according to a second embodiment of the present invention.

As shown in FIG. 15, the image display device according to the second embodiment of the present invention is arranged to have a backlight unit 151 serve as a light source for emitting diffuse light, a liquid crystal display 152 closely located in front of the backlight unit 151 for displaying any image, and a fiber optics plate 153 closely located in front of the liquid crystal display 152 for waveguiding the light from the liquid crystal display 152 according to a predetermined condition. The fiber optics plate 153 comprises a set of optical fibers 156 ranged in parallel. Each optical fiber is made by covering core glass having a high index of refraction with clad glass having a low index of refraction. The sectional form of each optical fiber 156 is roughly hexagonal. Those optical fibers are bundled so that no gap is formed among the optical fibers. Each optical fiber 156 operates to internally reflect rays of light on the border between the core glass and the clad glass. Since reflection occurs repeatedly along the border, the light is disadvantageously scattered while being transmitted.

To overcome this disadvantage, each pixel of the liquid crystal display 152 is located so as to coincide with the pitch of each fiber of the fiber optics plate 153 as shown in FIG. 15. The light from a pixel 154 is transmitted through one fiber 156 and then goes out of the output end 155 being opposite to the entrance of the fiber 156 to its output end 155. Since the light is scattered in transmission, the entire output end 155 of the fiber appears luminous.

Each pixel 154 is expanded fully to the size of the output end 155 of the optical fiber, and the shadow area between pixels is eliminated.

Figure 16:
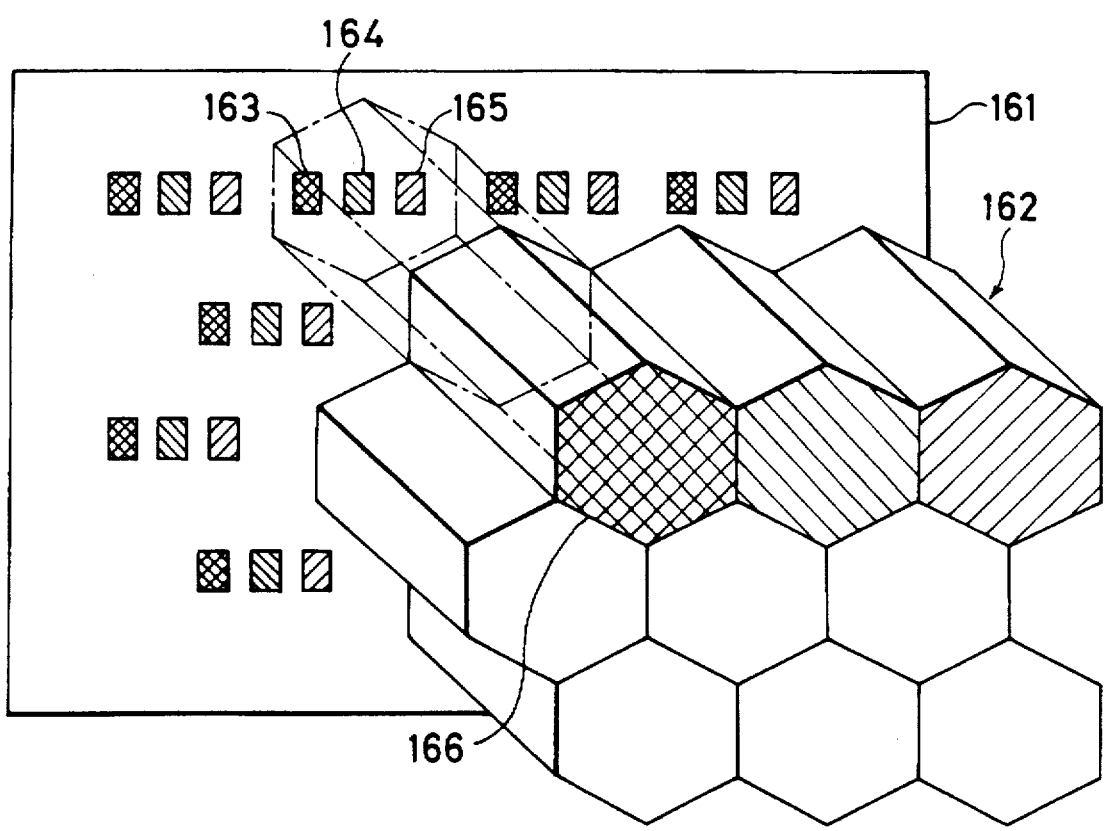
FIG. 16 is a view showing an image display device according to a third embodiment of the present invention.

Next, FIG. 16 shows an image displaying device according to a third embodiment of the present invention.

This embodiment is arranged so that a fiber optics plate 162 is used as a waveguiding means and is applied to a color liquid crystal display unit.

Herein, the color display 161 comprises pixels distributed in a RGB delta pattern. Each fiber of the plate 162 is arranged to have a RGB combination of pixels 163, 164 and 165. As mentioned above, the optical fiber operates to scatter the light being transmitted. Hence, it appears that each of the pixels 163, 164 and 165 is fully expanded at the output end, and that the RGB colors are mixed at the output end 166.

As such, the color mixed output pixels are not overlapped with their neighbor pixels. The RGB pixels are expanded fully at the output end of the optical fiber, eliminating the space between adjacent pixels and mixing the colors of each RGB triplet.

Figure 17:
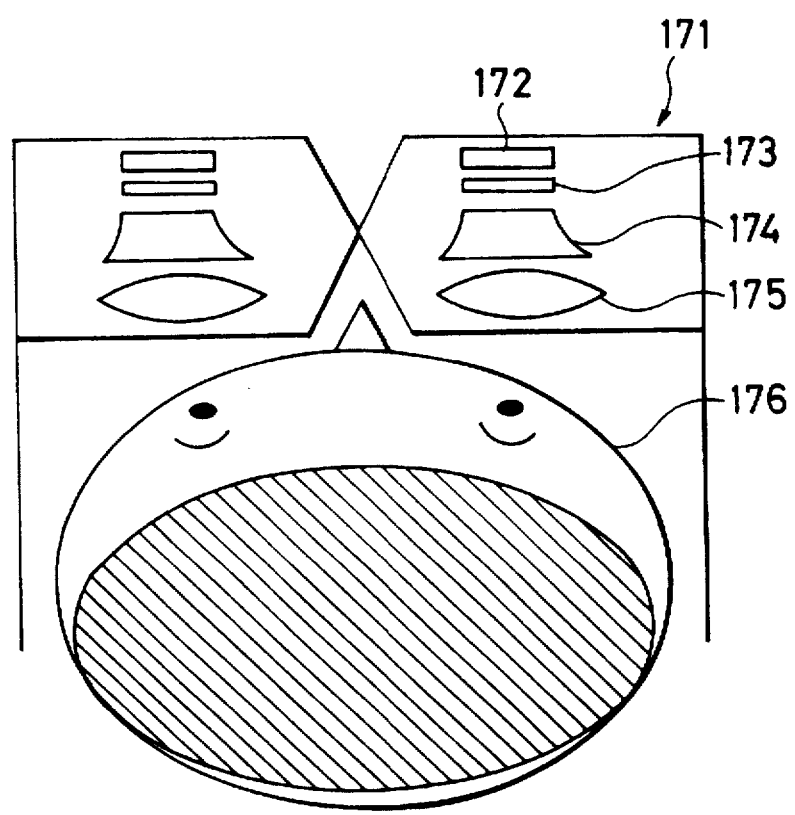
FIG. 17 is a view showing an image display device according to a fourth embodiment of the present invention.

Next, FIG. 17 shows an image display device according to a fourth embodiment of the present invention, which is arranged to use a fiber optics plate 174 as waveguiding means in lieu of the micro lens array 4 in the head mounted display as shown in FIG. 1.

The head mounted display (HMD) is arranged to have an eyeglasses type case 171, a backlight unit 172, a liquid crystal display 173, a fiber optics plate 174, and a lens 175.

The overall device is held in the eyeglasses type case 171. The device is fitted to the user's head when it is used.

The part corresponding to the lens of the eyeglasses is arranged to have a backlight unit 172, a liquid crystal display 173, a fiber optics plate 174, and a lens 175 located in sequence from the outside.

In such an arrangement, even though the image is magnified by the lens, the image pixels are not visually distinct. When the arrangement is applied to a color display, the problem of resolving individual color dots does not occur. Hence, the user views a high-quality large image.

Figure 18:
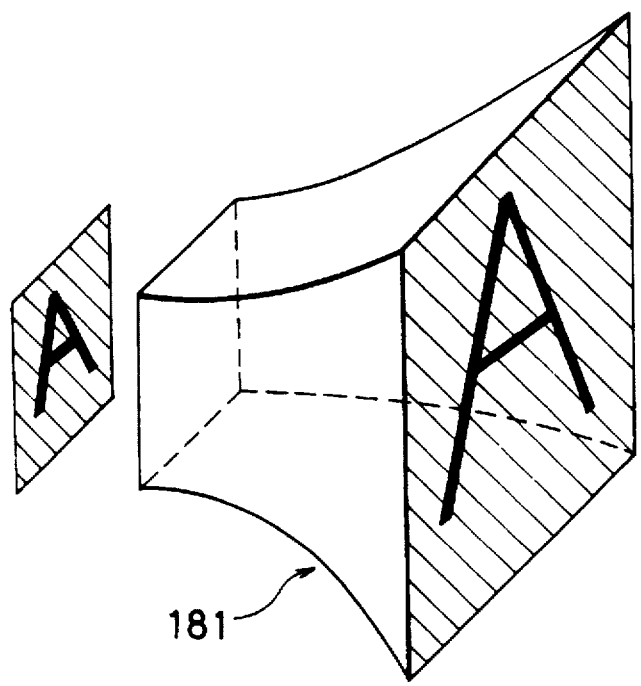
FIG. 18 is a view showing an outer appearance of a fiber optics plate having one or more magnifications.

Further, if the fiber optics plate 181 is formed substantially like a rectangular pyramid as shown in FIG. 18, the fiber optics plate 181 may, also, provide a function of magnifying the image.

If the fiber optics plates 174 and 181 provide some magnification in the head mounted display (HMD), the burden of the lens is reduced so that the aberrations in the image caused by the lens are likewise reduced.

In turn, the description will be oriented to an image display device according to a fifth embodiment of the present invention with reference to the drawings.

Figure 20:
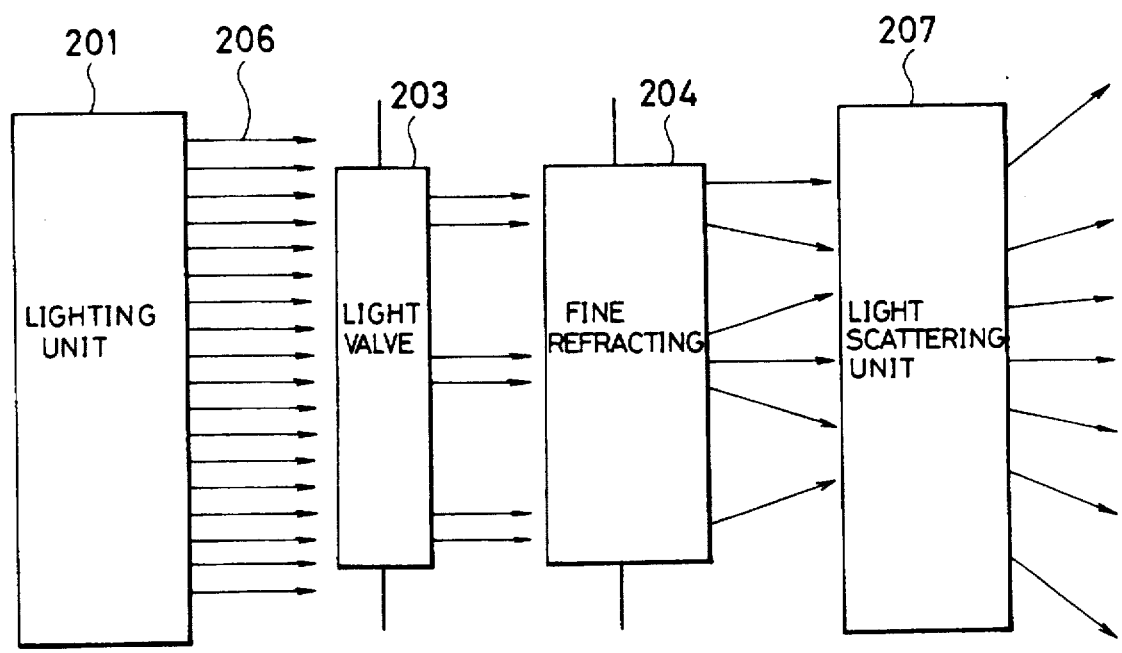
FIG. 20 is a diagram showing a display device according to a fifth embodiment of the present invention.
Figure 21:
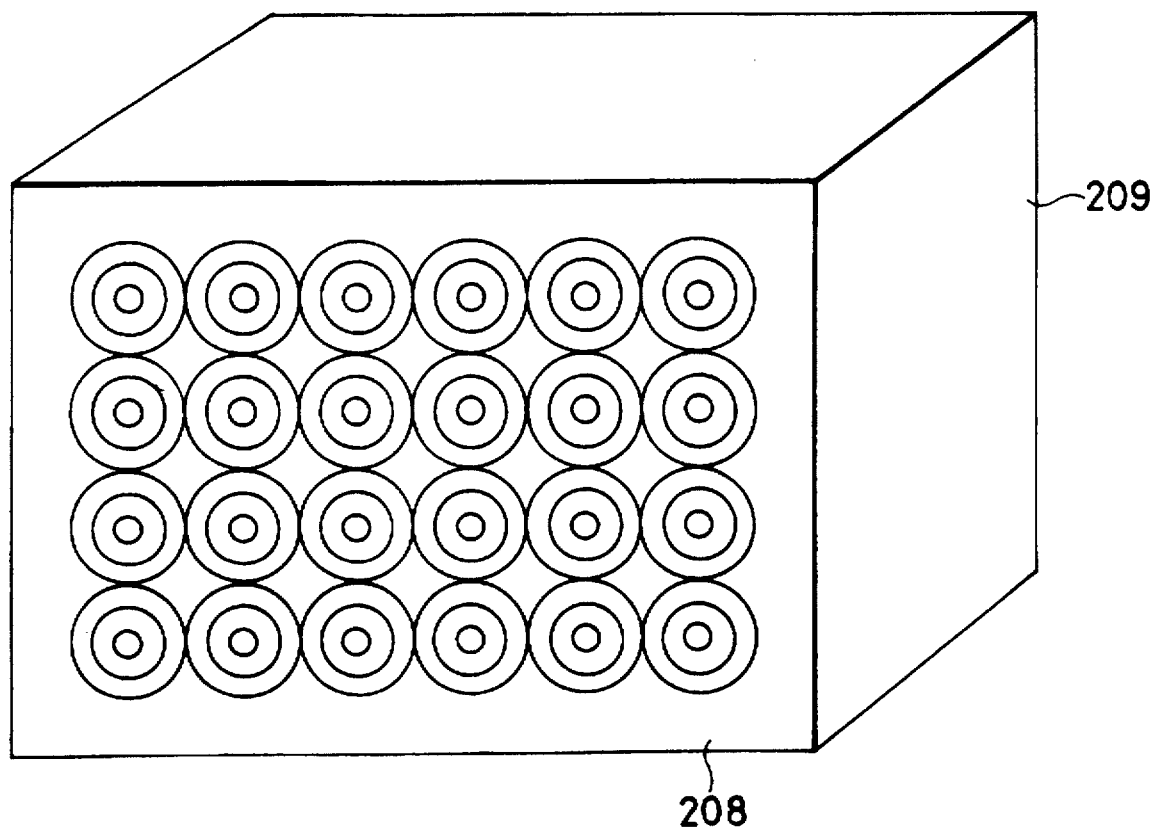
FIG. 21 is a view showing a combined fine refracting unit and light scattering unit included in the display device.
Figure 22:
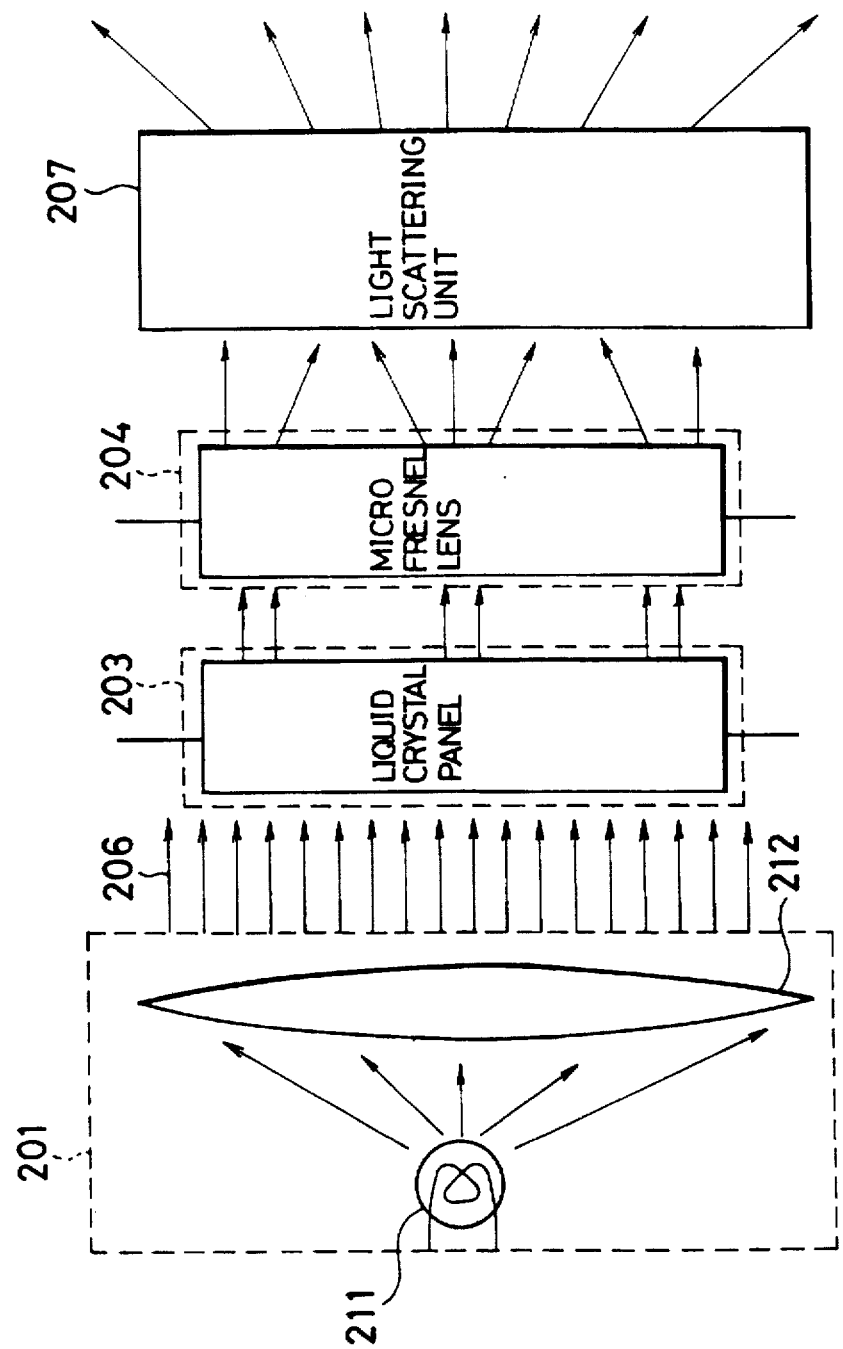
FIG. 22 is a detailed diagram showing the display device shown in FIG. 20.
Figure 23:
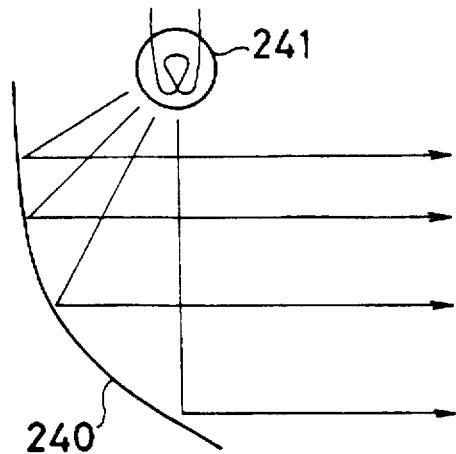
FIG. 23 is a view showing a lighting unit included in the display device.
Figure 24:
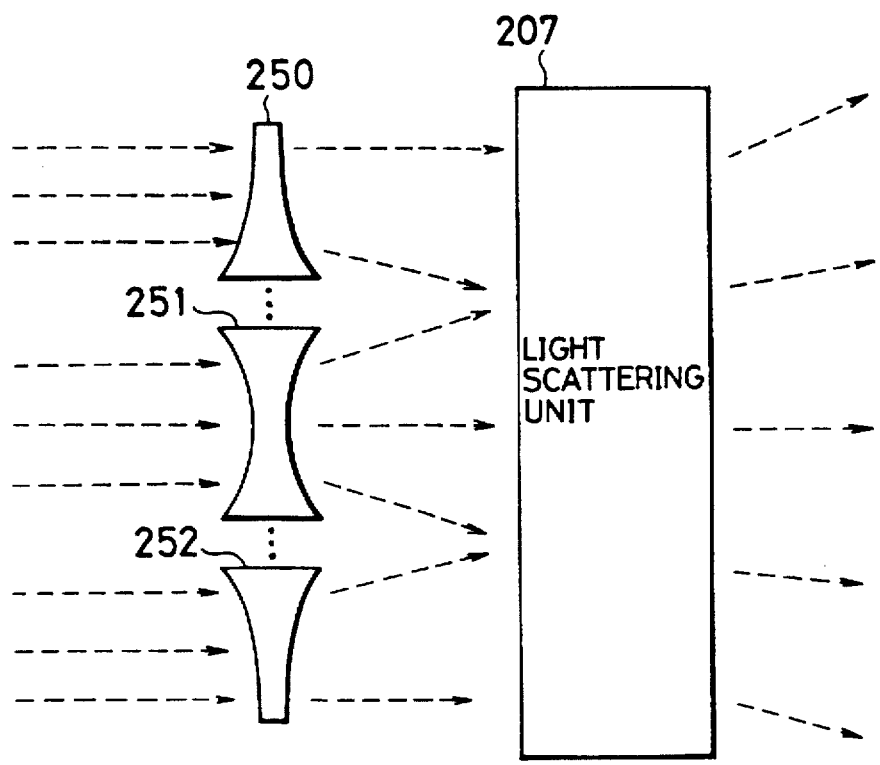
FIG. 24 is a view showing a fine refracting unit having a negative lens power.
Figure 25:
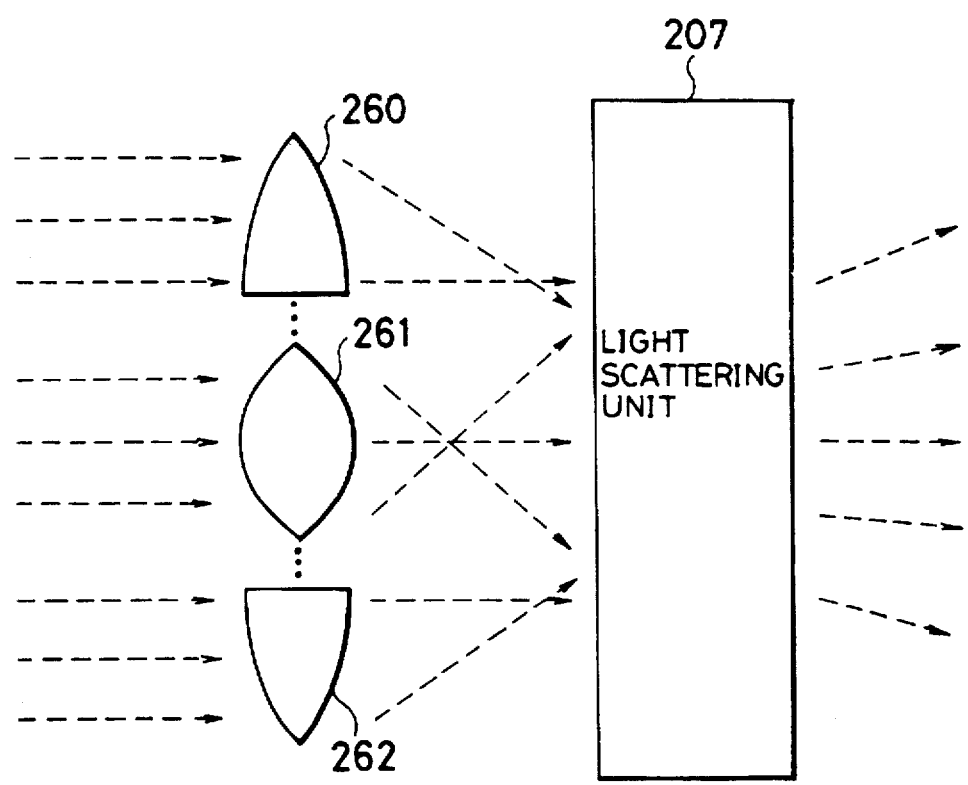
FIG. 25 is a view showing a fine refracting unit having a positive lens power.

The image display device according to the fifth embodiment of the invention will be discussed with reference to FIGS. 20 to 25. FIG. 20 shows an arrangement of the display device according to this embodiment of the invention. FIG. 21 shows a combined fine refracting unit and light scattering unit. FIG. 22 shows the arrangement of the display device of FIG. 20 in more detail. FIG. 23 shows a lighting unit. FIG. 24 shows a fine refracting means provided with negative lens power. FIG. 25 shows minute refracting means provided with positive lens power.

As shown in FIG. 20, parallel ray of light 206 emitted by a lighting unit 201 are passed through a light valve 203. The light valve 203 operates to control a transmittance of each pixel. If this light is projected onto a light diffusing plate, an image can be observed. If, however, this image is magnified when a user sees it, the pixels are visually distinct on the image, greatly lowering the image quality. To make each pixel less distinguishable, as mentioned above regarding the related art, the diffusing level of the light diffusing plate can be made stronger. This, however, makes the image vague, lowering the quality of the image. To overcome this shortcoming, the image display device according to this embodiment is arranged to control the light from the light valve 203 through the effect of the fine refracting unit 204. That is, the fine refracting unit 204, as shown in FIG. 20, operates to project the light from each pixel onto the light diffusing unit 207 in such a way as to fill in the border portion between the pixels. The light diffusing unit 207 has an effect of diffusing the ray projected from the fine refracting unit 204.

In contrast to the foregoing second related art, the image displaying device arranged as above makes it possible to maintain high image quality even when the image is magnified. Further, because the characteristics of the fine refracting unit 204 can be designed, the image display device according to this, fifth embodiment enables control of a protected pixel's light intensity distribution on the light diffusing unit 205. The borders of pixels may be smoothly connected with each other.

FIG. 21 shows a combined fine refracting unit 208 and light scattering unit 209. A micro Fresnel lens array is formed on one surface of the glass plate to affect the fine refracting unit 208. On the rear surface of the glass plate, the light scattering unit is formed by means of an opal finish or a grinding treatment. The above arrangement makes it possible to integrate the fine refracting unit 208 with the light scattering unit 209, which results in reducing the image display device of this embodiment in size and weight.

In FIG. 22, the same components as those shown in FIG. 20 have the same reference numbers. A lighting unit 201 for emitting a white parallel ray of light comprises a lamp 211 serving as a white point light source and a lens 212 for converting the light from the lamp 211 into parallel rays. The arrangement of the lighting unit 201 is not limited to that of this embodiment. Alternately, it may be composed of a lamp 241 serving as a point light source and a parabolic mirror 240 as shown in FIG. 23. Further, if the lighting unit 201 is applied to a head mounted display (HMD), it is preferable to use a backlighting device to be discussed below as another embodiment.

The white parallel rays of light 206 output from the lighting unit 201 enter the light valve 203 which controls the transmittance of each pixel. The light valve 203 comprises a liquid crystal panel.

The rays of light passed through the light valve 203 are put into the fine refracting unit 204 which modulates the direction of the rays. The fine refracting unit 204 comprises either a micro Fresnel lens array of either positive or negative lens power, or a binary optics element. As shown in FIG. 22, the fine refracting unit 204 is designed so that the rays of light of each pixel may be applied to the light scattering unit 207 so as to compensate for the opaque region between pixels.

Next, the optical effect of the fine refracting unit 204 will be discussed in detail. If the fine refracting unit provides a negative lens power, as shown in FIG. 24, the ray of light pass through the pixels composing the liquid crystal panel are diverged, and then scattered by the light scattering unit 207. In this arrangement, for diverging the ray of light, the lenses 250, 251 and 252 are provided with negative lens power. The lenses 250 and 252 are eccentric lenses, and can be used to provide assymetric divergence. If the fine refracting unit has a positive lens power, as shown in FIG. 25, the ray of light passed through the pixels of the liquid crystal panel is converged through a focal point for expansion, and then scattered by the light scattering unit 207. In this arrangement, for spreading the light, the lenses 260, 261 and 262 are provided with positive lens power. The lenses 260 and 262 are eccentric lenses.

Figure 26:
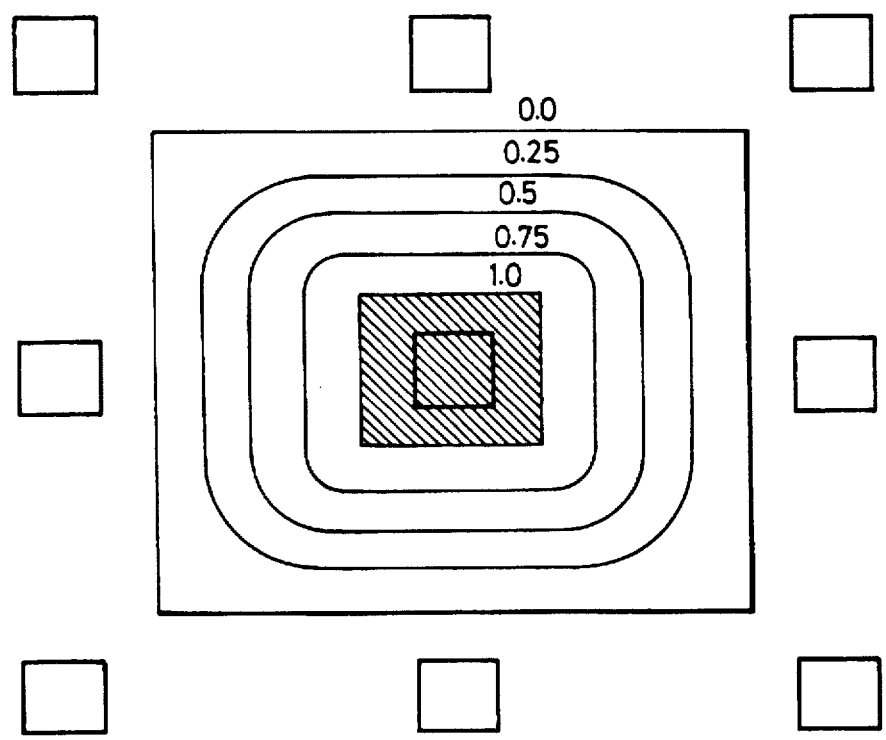
FIG. 26 is an explanatory view showing a light intensity strength distribution appearing on the light scattering unit.

FIG. 26 shows a light intensity distribution on the light scattering unit. In FIG. 26, numerals on contours indicate relative values of the light intensity distribution. The light intensity distribution on the light scattering unit for the light projected from the center pixel is linearly diminished from the central pixel towards the peripheral pixels. Such a light intensity distribution makes it possible to smoothly interpolate for the border between pixel. If the image is magnified as in an HMD, the image display device according to this embodiment enables the output of a high-quality image formed to remedy the shadow portion between pixels.

Figure 27:
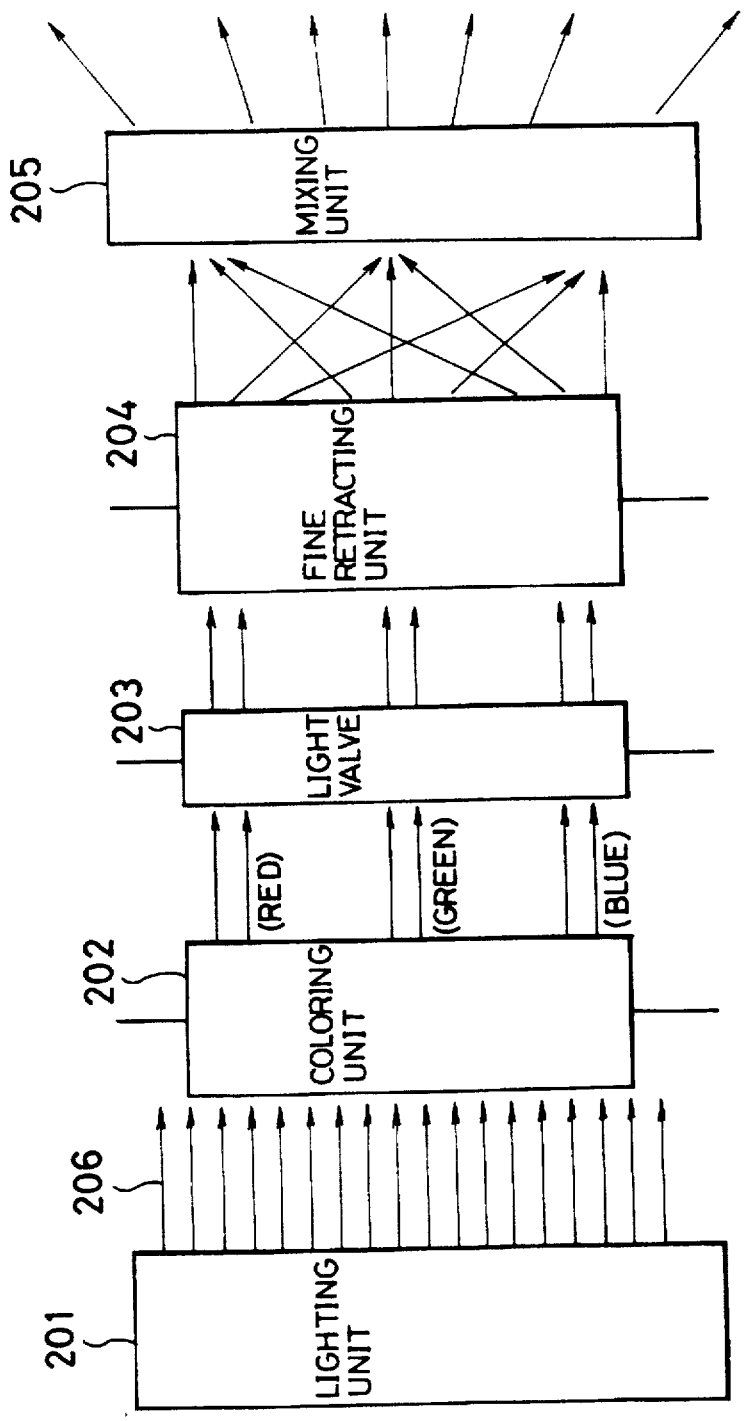
FIG. 27 is a diagram showing a color-mixing type display device according to a sixth embodiment of the present invention.
Figure 28:
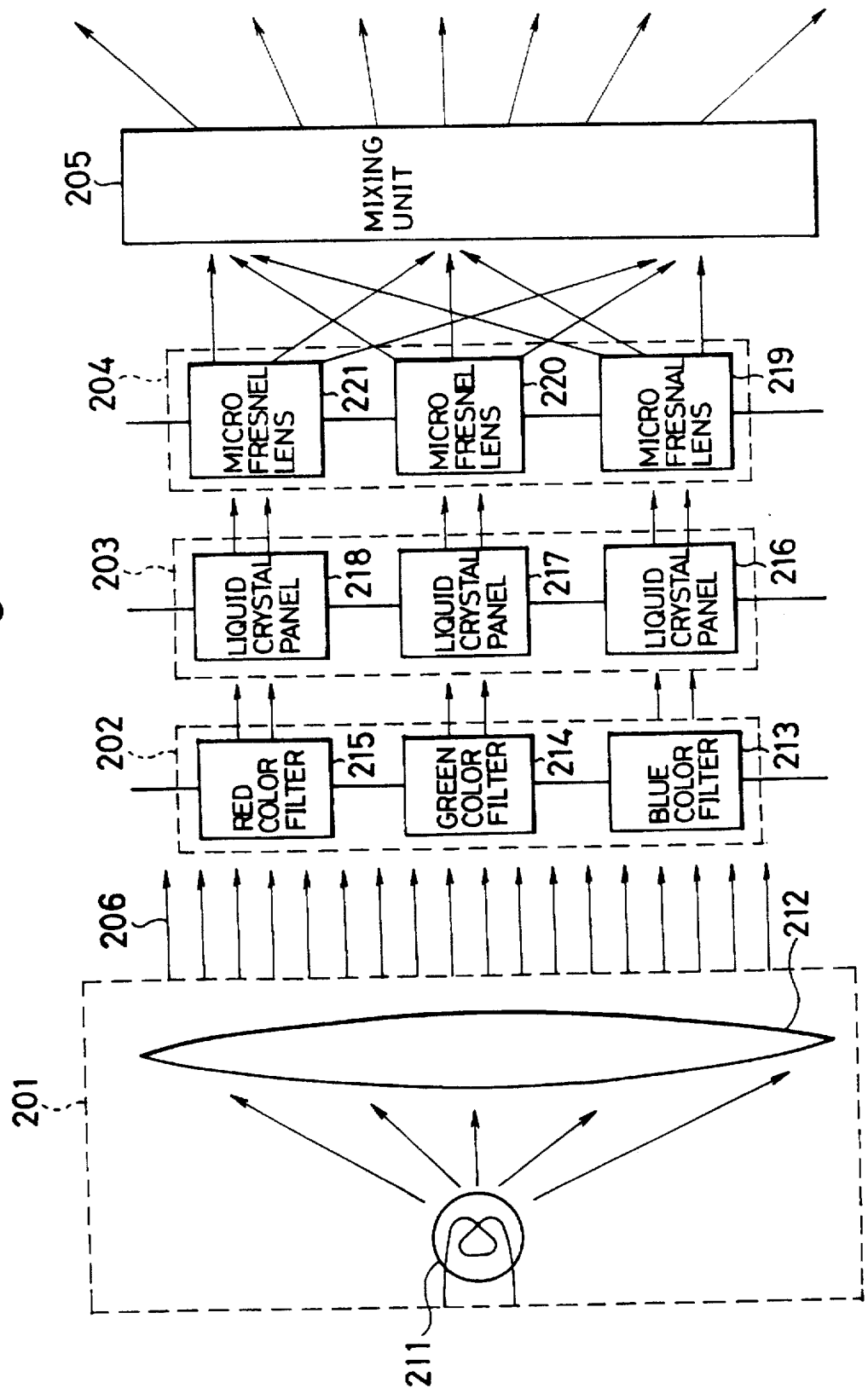
FIG. 28 is a diagram showing the color-mixing type display device shown in FIG. 27.
Figure 29:
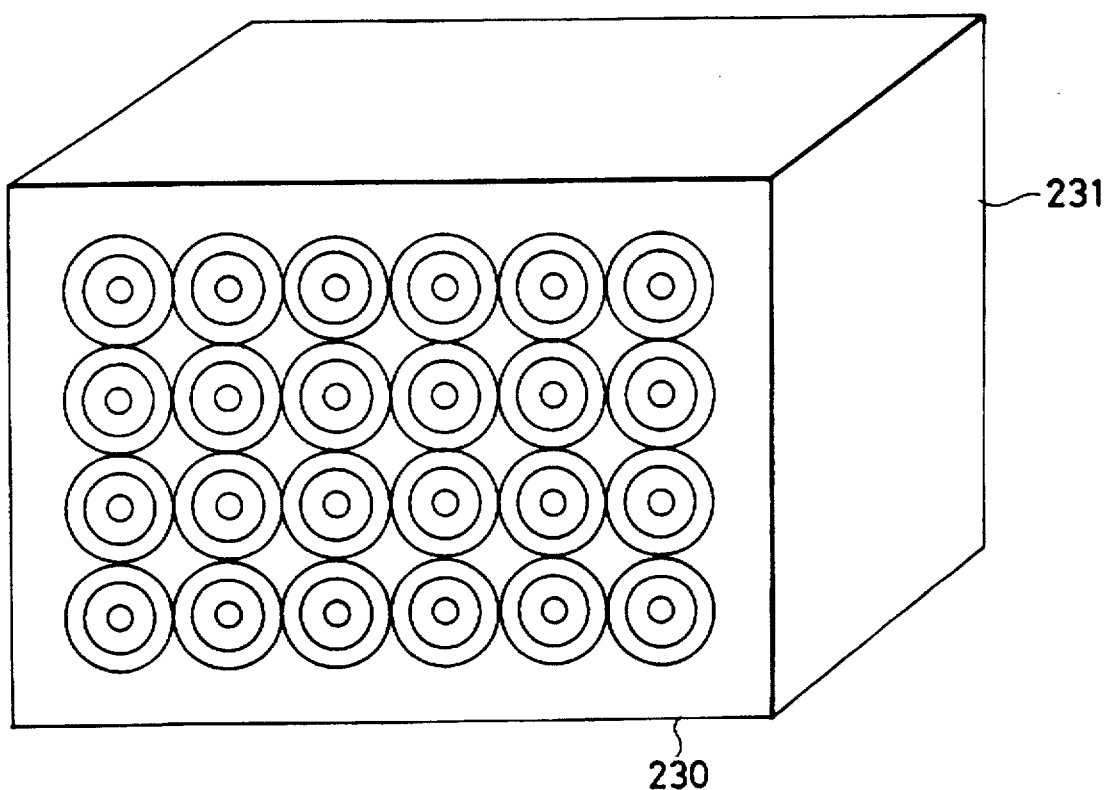
FIG. 29 is a view showing a combined fine refracting unit and mixing unit included in the color-mixing type display device shown in FIG. 28.
Figure 30:
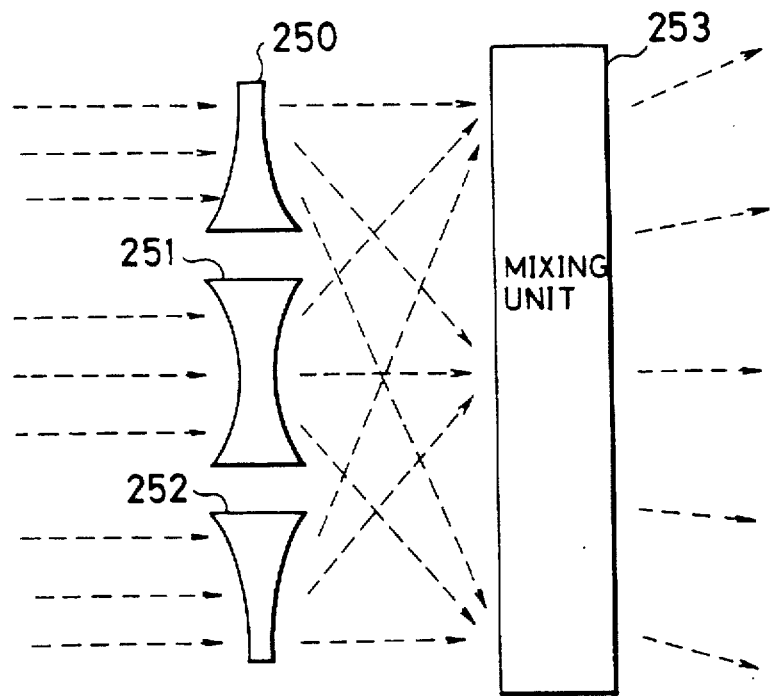
FIG. 30 is a view showing the fine refracting unit having a negative lens power.
Figure 31:
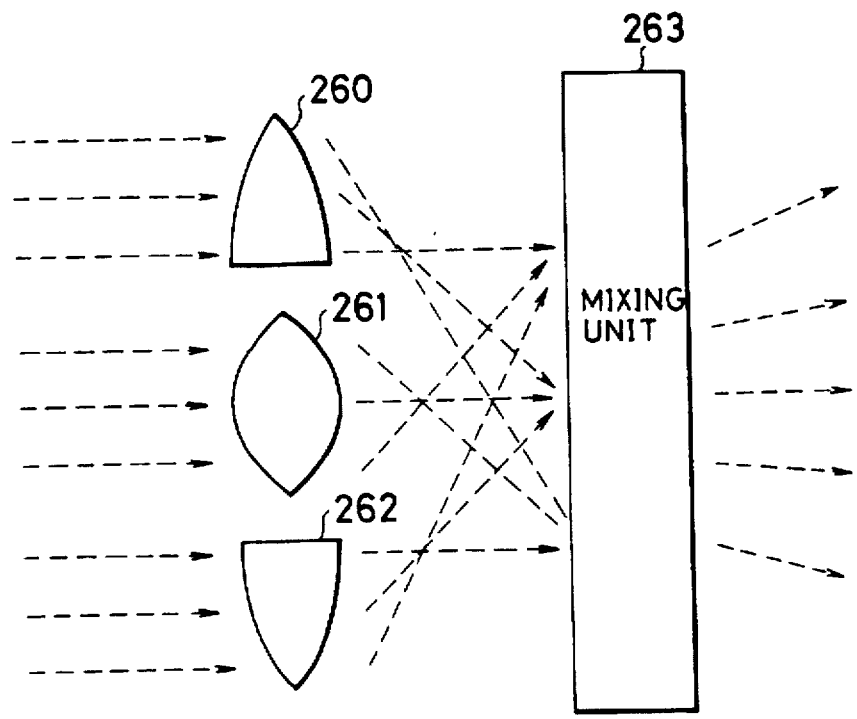
FIG. 31 is a view showing the fine refracting unit having a positive lens power.

The description will now be oriented to a color-mixing type image display device according to a sixth embodiment of the present invention with reference to FIGS. 27 to 31. FIG. 27 is a diagram showing a color-mixing type image display device according to this embodiment. FIG. 28 is a diagram showing the arrangement of the image display device in detail. FIG. 29 is a view showing a fine refracting unit and a mixing unit. FIG. 30 is a view showing a fine refracting unit having a negative lens power. FIG. 31 is a view showing a fine refracting unit having a positive lens power. In FIGS. 27 to 31, the same components as those shown in FIGS. 20 to 26 have the same reference numbers.

In FIG. 27, the white parallel rays 206 emitted from the lighting unit 201 are passed through a coloring unit 202 for filtering to any one of the three primary colors of red, green and blue. Then, the light is passed through the light valve 203 for controlling the transmittance of each pixel. If the light is then projected onto a light diffusing plate, a color image is formed, but if this image is magnified for viewing, the colored pixels are individually conspicuous, thereby greatly lowering the image quality. As mentioned above concerning the third related art, it is possible to increase the diffusing level of the light diffusing plate to make each pixel less conspicuous. In this technique, however, the high-frequency components are lost from the image. The quality of the resulting image is thus lowered. In this embodiment, the light output from the light valve 203 is refracted in a pixel-by-pixel manner by means of the fine refracting unit 204. The fine refracting unit 204 projects the ray of light from the three colored pixels of a color-mix triplet onto the same area on the mixing unit 205. The mixing unit 205 scatters the light of the three color pixel triplet after the colored light has been mixed.

In this embodiment, the high-pass components of the spatial frequency are maintained in the process of mixing the colors. The deterioration of the image quality does not occur even when the image is magnified. The foregoing third related art controls the path of light through the effect of physical barriers. As such, the light intensity distribution on the light diffusing plate is not precisely controllable. According to this embodiment, by changing the characteristic of the fine refracting unit 204, it is possible to precisely control the light intensity distribution on the mixing unit 205. The borders between the pixels are smoothly connected with each other by means of this color mixing operation.

FIG. 29 shows the fine refracting unit 230 and the mixing unit 231. The fine refracting unit 230 is implemented by forming a micro Fresnel lens array on the surface of a glass plate. The mixing unit 231 is formed on the rear surface of the glass plate by means of an opal finish or an abrading treatment. In the foregoing arrangement, the fine refracting unit 230 is allowed to be integrated with the mixing unit 231. Hence, the image display device produced according this embodiment may be reduced in size and weight.

In FIG. 28, the same components as those shown in FIG. 27 have the same reference numbers. In FIG. 28, a lighting unit 201 for emitting white parallel rays comprises a lamp 211 serving as a white point light source, and a lens 212 for converting the rays from the lamp 211 into the parallel rays. The arrangement of the lighting unit 201 is not limited to this embodiment. Like the fifth embodiment, the lighting unit 201 may be composed of the lamp 241 serving as a point light source and the parabolic mirror 240 as shown in FIG. 23. Further, if it is applied to a head mounted display (HMD), as mentioned below, it is preferable to use as the lighting unit the backlighting device according to an embodiment to be discussed below.

The white parallel rays emitted from the lighting unit 201 are fed to the coloring unit 202. The coloring unit 202 comprises a blue color filter 213, a green color filter 214, and a red color filter 215. For each pixel, one color (red, green or blue) filter corresponds. The coloring units 202 for the pixels are disposed in a delta distribution (see FIG. 52), a four-pixel distribution (see FIG. 53), a stripe distribution (see FIG. 54), or a diagonal distribution (see FIG. 55). If FIG. 28 is taken to represent a delta distribution of the pixels in which the horizontal combination of red, green and blue is selected as a color-mixing combination, the video signal to be fed to the pixels belonging to the same color-mixing combination is required to be data sampled at the same coordinates in the original image.

The rays passed through the coloring unit 202 are put into the light valve 203 for controlling the transmittance of each pixel. The light valve 203 comprises a liquid crystal panel, which provides many pixels in correspondence to the red, green and blue color filters. The rays passed through the light valve 203 enter into the fine refracting unit 204 when controls the direction of the light from each pixel. The fine refracting unit 204 comprises either micro Fresnel lenses 219, 220 and 221 having positive or negative lens power, or a binary optics element. As shown in FIG. 28, the fine refracting unit 204 is designed to apply the rays from the red, blue and green pixels belonging to the same color-mixing combination onto the same area on the mixing unit 205.

In turn, the optical effect of the fine refracting unit 204 will be discussed below. If the fine refracting unit provides negative lens power, as shown in FIG. 30, the rays passed through the pixels of the liquid crystal panel are diverged so as to be spread across the area for the color-mixing combination on the mixing unit 253 and then are scattered. In this case, for diverging the rays, the lenses 250, 251 and 252 each having negative lens power are used. The lenses 250 and 252 are eccentric. If the fine refracting unit provides positive lens power, as shown in FIG. 31, the rays passed through the pixels of the liquid crystal panel are converged through a focal point so as to be spread into the area of the color-mix combining on the mixing unit 263 and are then scattered. In this case, for converging the rays, the lenses 260, 261 and 262 each have positive lens power. The rays, the lenses 260 and 262 are eccentric. The lenses 250, 251, 252 and the lenses 260, 261, 262 shown in FIGS. 30 and 31 refract the rays more strongly than the lenses 250, 251, 252 and the lenses 260, 261, 262 shown in FIGS. 24 and 25 used for the description of the fifth embodiment.

Figure 32:
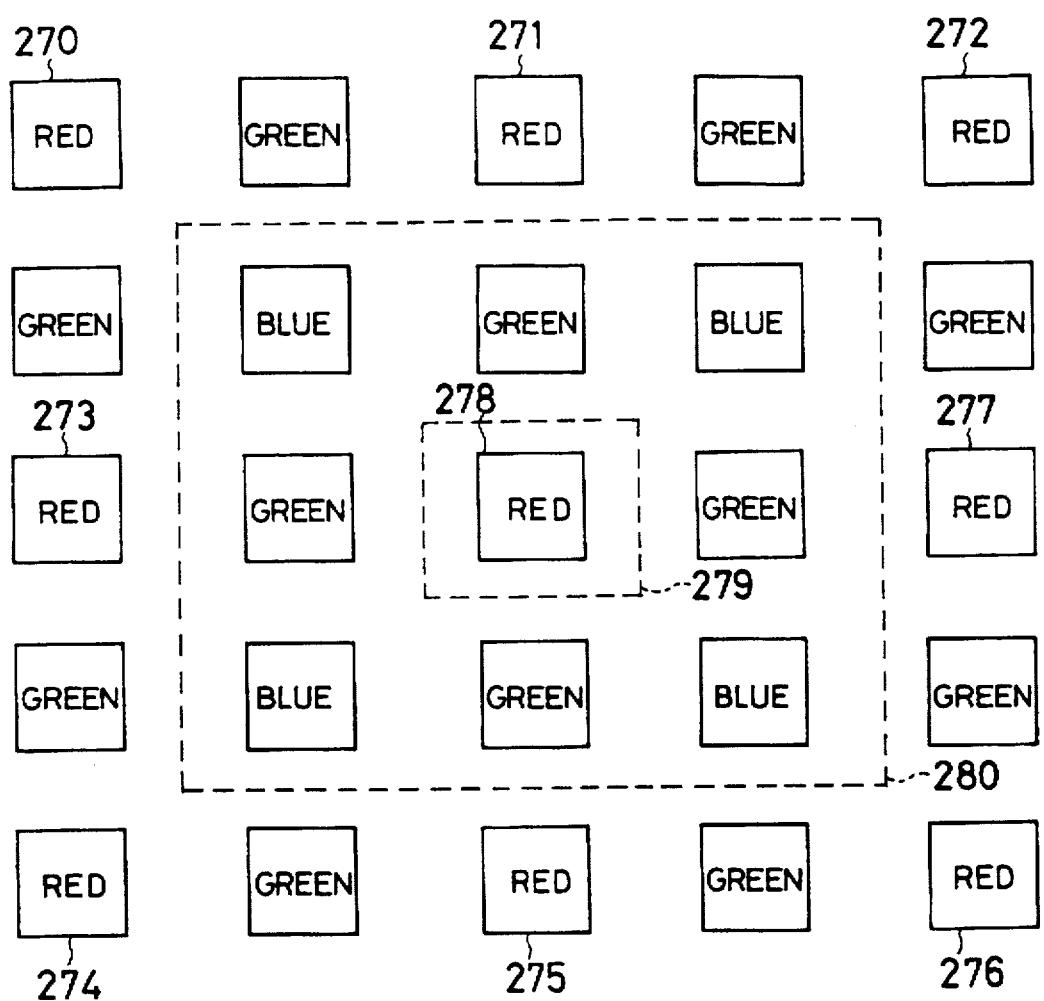
FIG. 32 is an explanatory view showing color mixture done in a four-pixel distribution.
Figure 33:
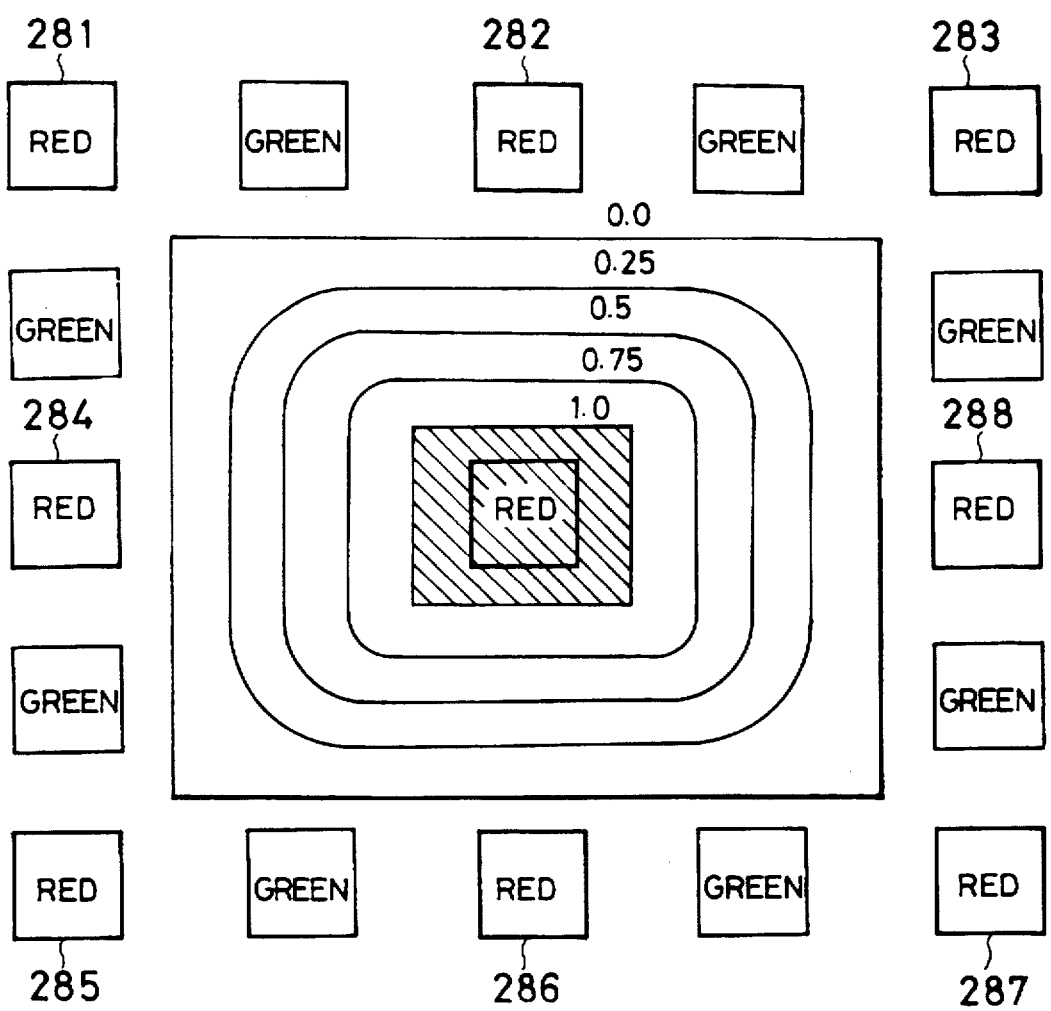
FIG. 33 is an explanatory view showing a light intensity distribution appearing on the mixing unit.

The system of mixing colors is not limited to the foregoing embodiment. The description will new be oriented to the color mixture done in the four-pixel distribution. FIG. 32 is an explanatory view showing the color mixture done in the four-pixel distribution. FIG. 33 is an explanatory view showing a light intensity distribution appearing on the mixing unit.

FIG. 32 shows the light intensity distribution on the mixing unit. About a central red pixel 278, the rays passed through the pixel are spread by the fine refracting unit. A certain peak intensity is realized inside of the near border 279. The intensity is progressively diminished from the inside to the outside in the section between the border 279 and the border 280. At the border 280, the intensity is made zero. As shown in FIG. 33, the figures on the light-intensity contours indicate the relative values of the intensity distribution on the mixing unit for the rays from the central red pixel. The light from adjacent red pixels 270 to 277 and 281 to 288 is spread about their centers in a similar relative intensity distribution operate to project the rays onto the mixing unit so as to keep the similar distribution around each of those pixels. By overlapping these distributions, the resulting red image is allowed to be formed as a smooth interpolation of all the red intensities, even in areas having blue or green pixels, but no red pixel. The other color pixels are similarly processed to mix the colors with no gap in the overall image and smoothly connect the borders between the pixels with each other. In this case, whether or not the pixel belongs to a color-mixing combination, the video signal to be fed to the pixel is required to be the data sampled in the original image at the point corresponding to the screen position of the pixel.

The mixing unit 205 (FIG. 28) is formed by coating an opal layer onto a glass surface or by abrading the glass surface. If either of the two forming processes is used, the mixing unit 205 has the effect of scattering the incident rays. Hence, the mixing unit 205 operates to mix the rays each having any one of the three primary colors, received from the fine mixing unit 204 and then emit the mixed rays from its opposite face.

Figure 34:
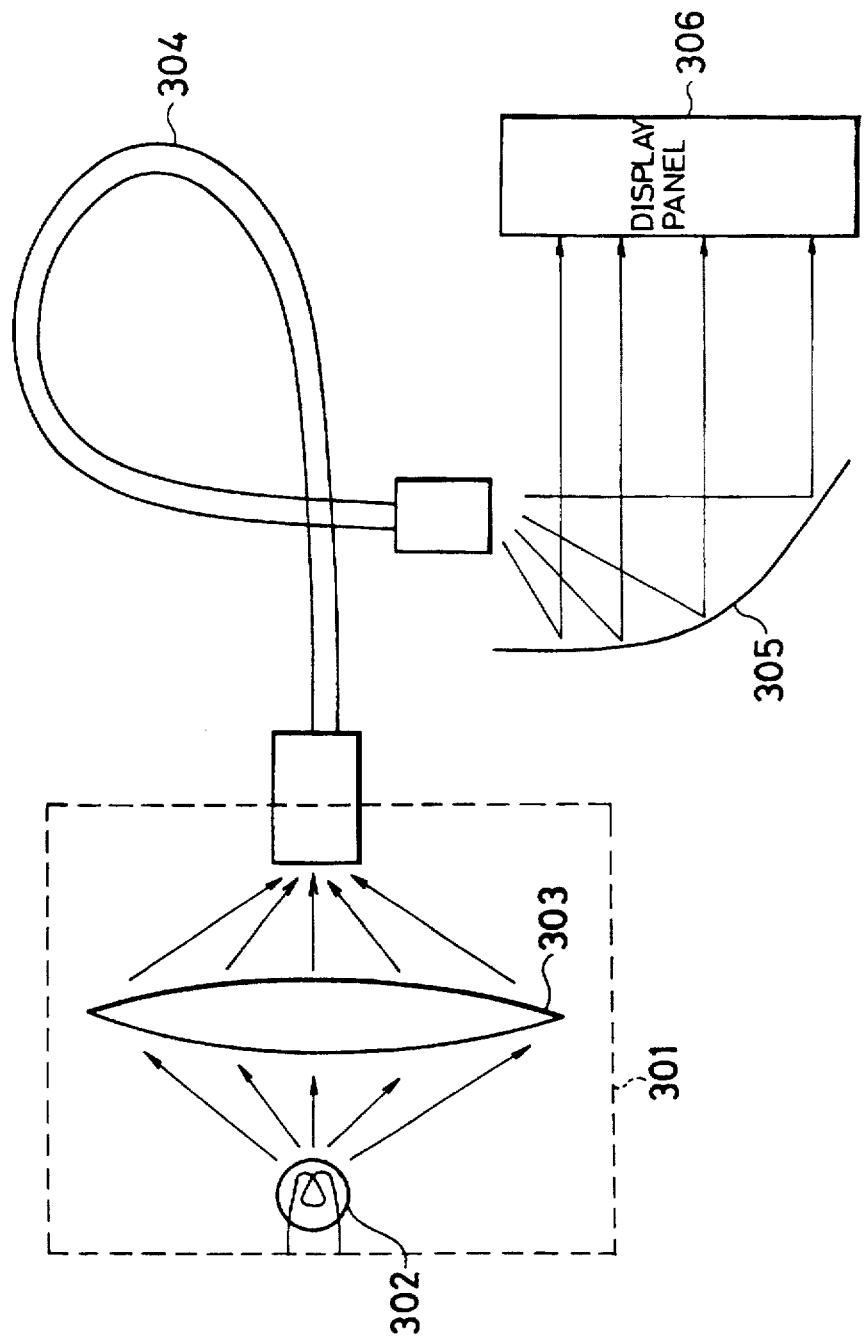
FIG. 34 is a diagram showing a backlighting device according to a seventh embodiment of the present invention.
Figure 35:
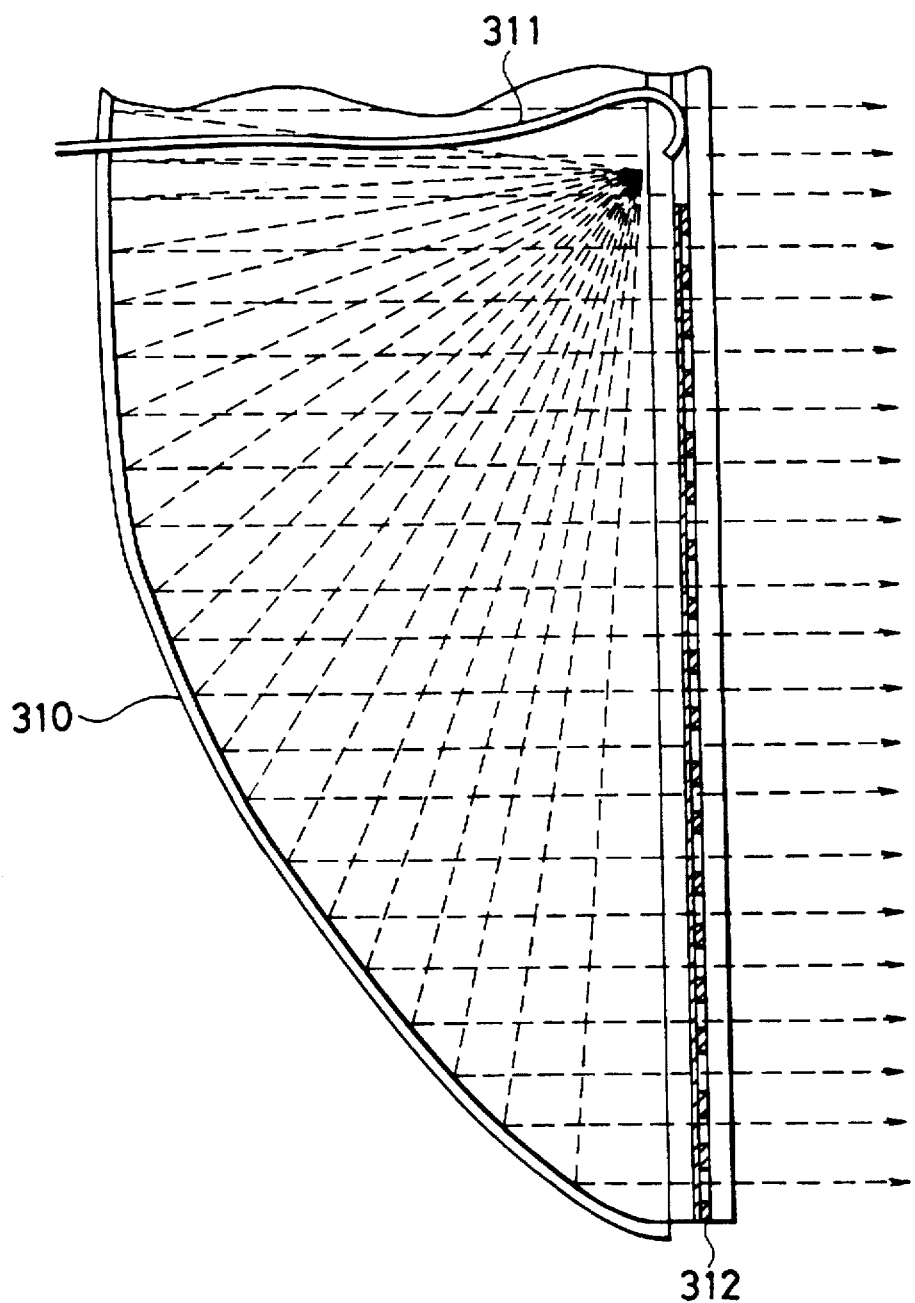
FIG. 35 is a section showing a partial section of a converting unit included in the backlighting device.
Figure 36:
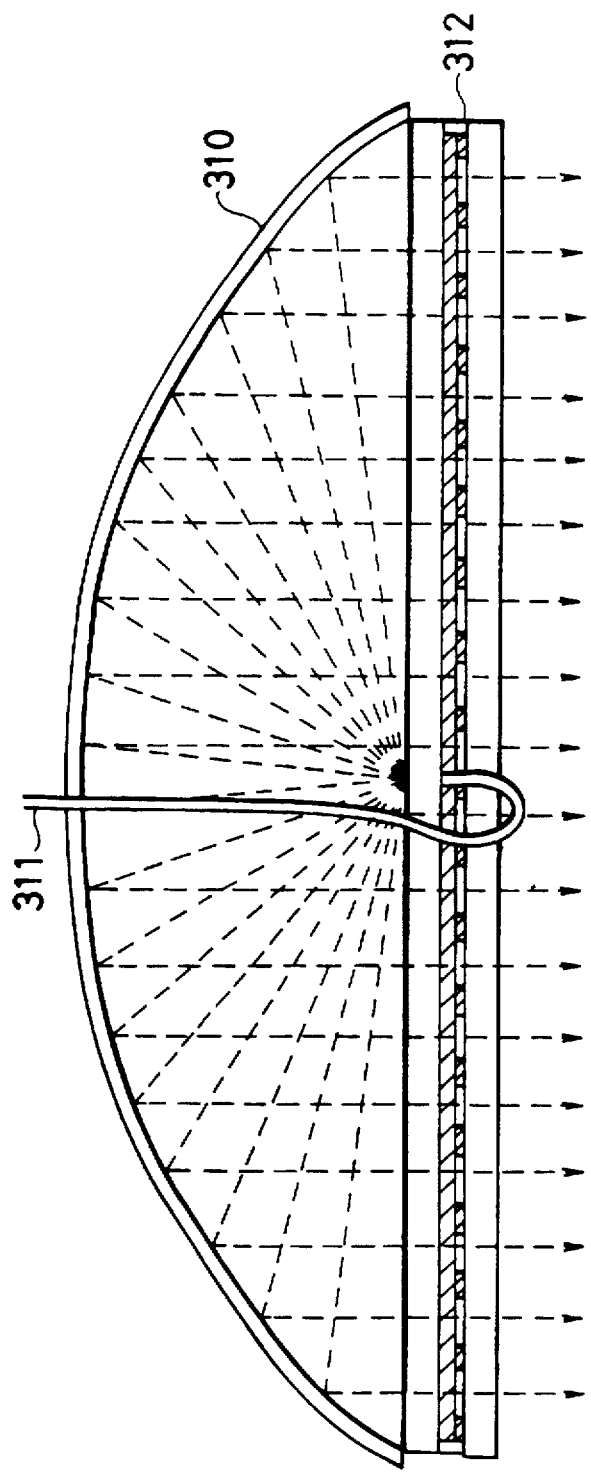
FIG. 36 is a view showing a section crossed at right angles with the partial section of the converting unit shown in FIG. 35.
Figure 37:
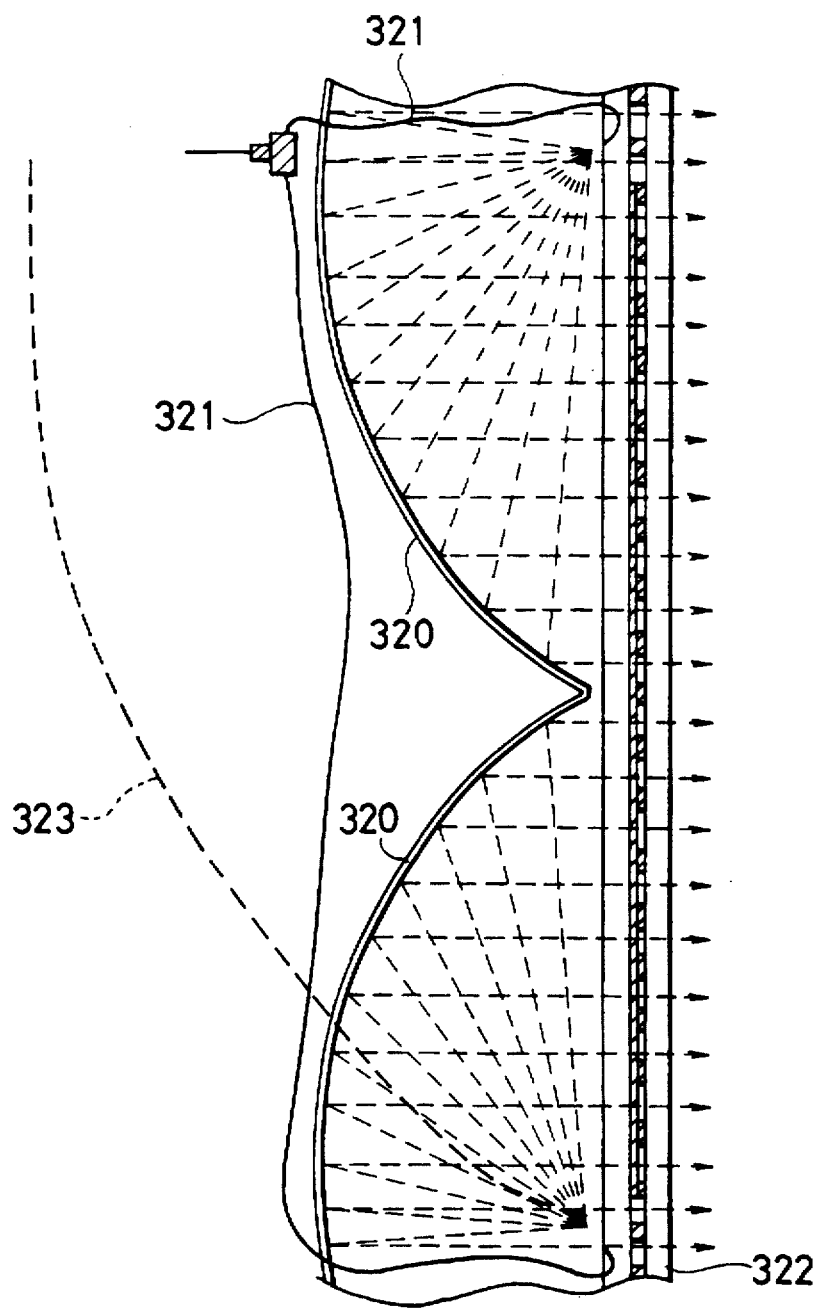
FIG. 37 is a view showing a partial section of another converting unit.
Figure 38:
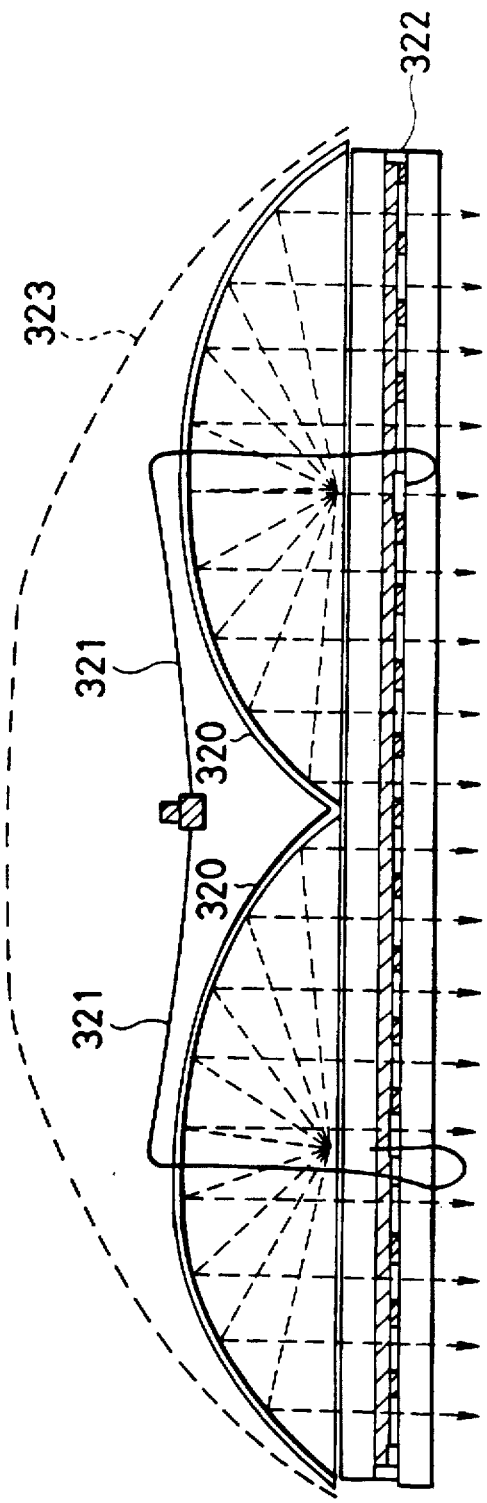
FIG. 38 is a view showing a section crossed at right angles with the partial section of the converting unit shown in FIG. 37.
Figure 39:
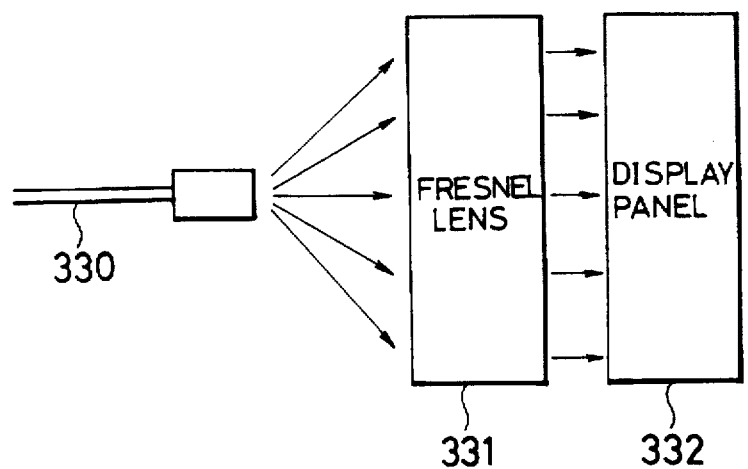
FIG. 39 is a view showing another converting unit.

Continuing, the description will be oriented to the back-light device according to a seventh embodiment of the present invention with reference to FIGS. 34 to 39. FIG. 34 is a view showing a backlighting device according to this embodiment of the invention. FIG. 35 is a section showing a partial section of a converting unit. FIG. 36 is a section showing a section crossed at right angles with the partial section of the converting unit shown in FIG. 35. FIG. 37 is a section showing a partial section of another converting unit. FIG. 38 is a section showing a section crossed at right angles with the partial section of the converting unit shown in FIG. 37. FIG. 39 is a view showing another converting unit.

In FIG. 34, a light source unit 301 comprises a white point light source 302 and a refracting unit 303. The white point source 302 can be, amongst others, a metal halide lamp or an xenon lamp. The refracting unit 303 operates to focus the rays output from the point light source 302 into an area which is smaller than the diameter of the optical fiber 304 and induce the rays into the end of the optical fiber 304. The optical fiber 304 is used for transmitting the light from the source unit 301 to the converting unit 305 located at the back of the display. The optical fiber 304 comprises fine fibers so that the optical fiber 304 may be lightly and flexibly bent. As such, the optical fiber 304 is allowed to be bundled with some cables like the video signal cable connected to the head mounted display (HMD) in order that the optical fiber 304 may be easily fitted to the HMD. The converting unit 305 has the function of converting the light transmitted through the optical fiber 304 into parallel rays. The parallel rays are fed to the display panel 306. The display panel comprises a display device such as the light valve.

FIGS. 35 and 36 show the converting unit. As shown, the converting unit comprises a parabolic mirror 310. By fixing the end of the optical fiber 311 to the focal point of the parabolic mirror 310, the rays output from the optical fiber 111 are converted into parallel rays. The parabolic mirror 310 can produce a smaller and lighter converting unit than can a standard lens. The parallel rays are projected on the display panel 312.

Another converting unit incorporating parabolic mirrors is shown in FIGS. 37 and 38. By dividing the parabolic mirror into plural parabolic mirrors 320, distance from the display panel 322 to the furthermost point of the parabolic mirror is made shorter than that of the converting unit using a single parabolic mirror as shown in FIGS. 35 and 36. This makes it possible to produce a very thin converting unit. (A dotted line 323 in FIGS. 37 and 38 indicates a contour of the converting unit arranged to use the parabolic mirror as shown in FIGS. 35 and 36.)

In FIGS. 37 and 38, the optical fiber 321 is divided into two before it reaches the converting unit. An end of the divided optical fiber is secured to the focal point of each of the parabolic mirrors. Like the converting unit shown in FIGS. 35 and 36, therefore, the parallel rays are produced and fed to the display panel 322. The arrangement of converting unit is not limited to the above. As shown in FIG. 39, the converting unit may be realized by a Fresnel lens 331. The Fresnel lens 331 is planar and so can be integrated into the display panel, which contributes to the thinning of the converting unit. The end of the optical fiber 330 is fixed at the focal point of the Fresnel lens, so that the ray output from the optical fiber 330 is converted into the parallel rays, which are fed to the display panel 332.

Figure 40:
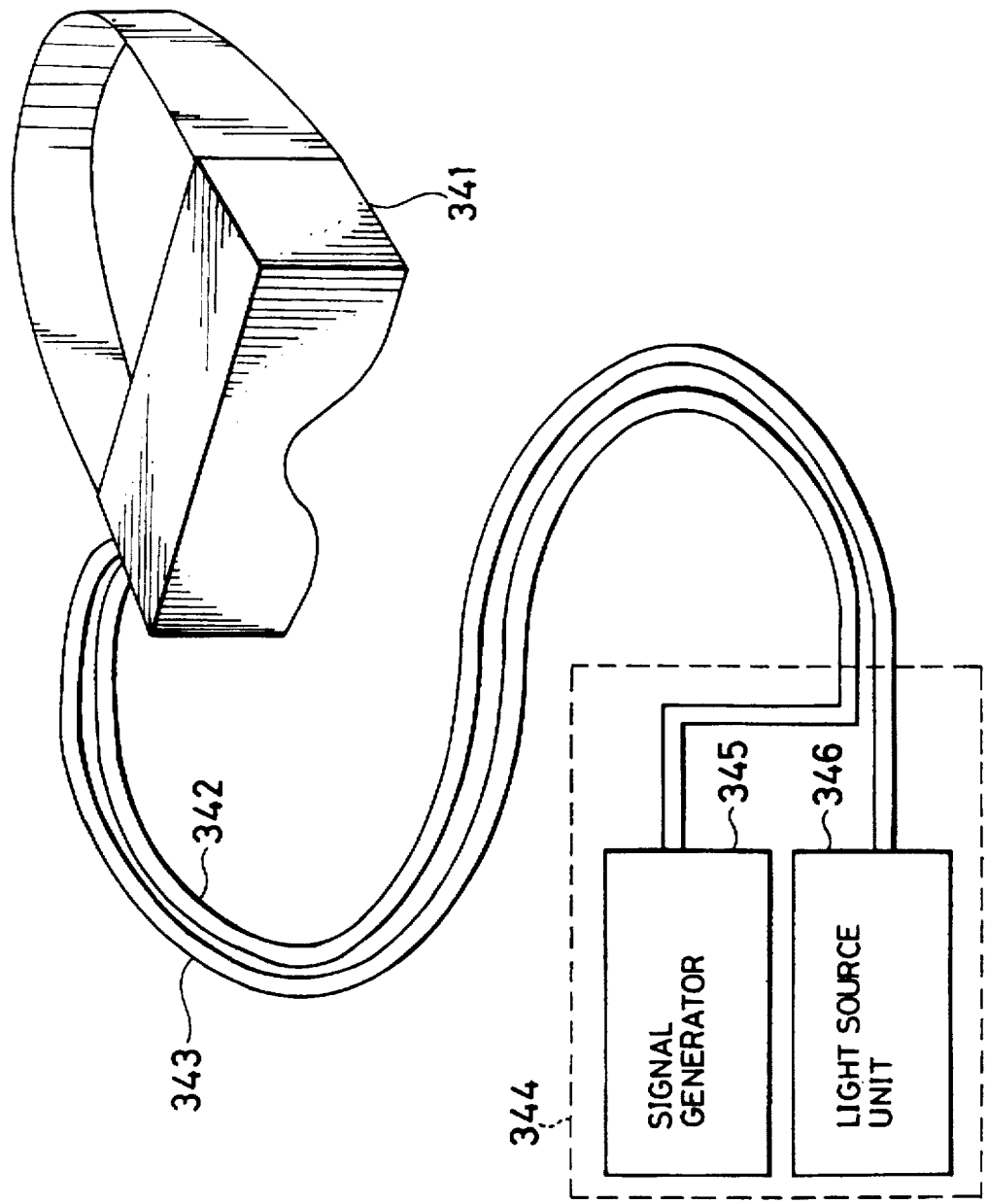
FIG. 40 is a diagram showing an image display device according to an eighth embodiment of the present invention.

Next, the description will be oriented to an image display device according to an eighth embodiment of the present invention with reference to FIG. 40. FIG. 40 is a view showing an image display device as applied to the head mounted display (HMD), the image display device having the display device and the backlighting device of the invention, arranged in combination with a signal generator and a signal transmitting unit. As shown in FIG. 40, the image display device according to the present invention is arranged to have a system box 344 composed of a light source unit 346 and a signal generator 345, an optical fiber 342 connecting the system box 344 with the HMD 341, and a signal transmitting unit 343. Herein, the HMD 341 comprises the display device of the invention. The light source unit 346 comprises the backlight device of the invention as described above.

This image display device is arranged so that the HMD 341 may be separated from the light source unit 346 and the signal generator 345 which constitute a relatively large percentage of the overall volume and weight. As such, the HMD paper is made small and lightweight. The optical fiber 342 comprises slender fiber-like glass or resin. The signal transmitting unit 343 comprises an ordinary cable. Both of the optical fiber 342 and the signal transmitting unit 343 may be bundled as one cable so that the bundle may be made light and flexible. The resulting HMD offers both a superior image, as well as advantages in size and weight considerations. Further, the backlight device arranged to feed the parallel rays and the display device arranged to visually prevent pixels from being conspicuous are used for composing the image display device, which results in a very high-quality image.

Figure 41:
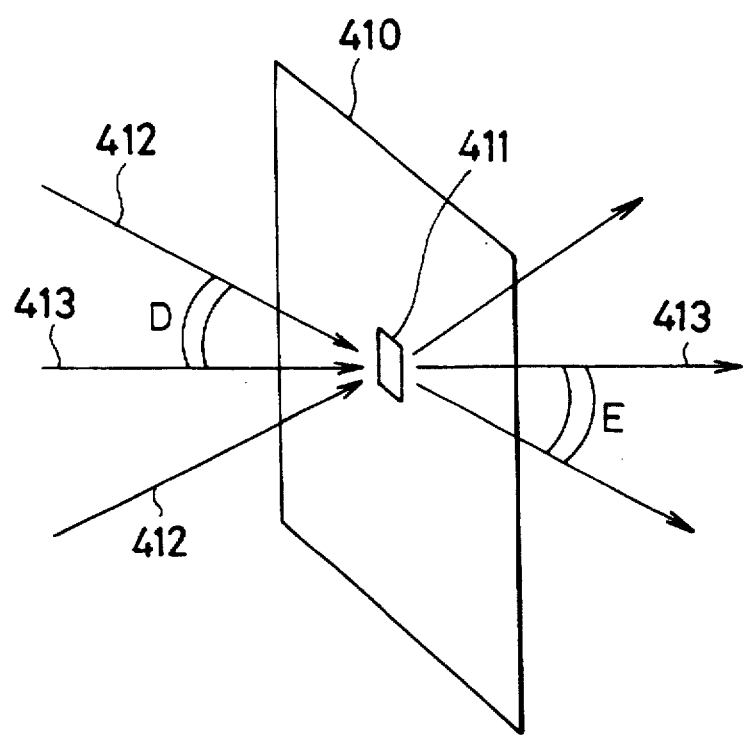
FIG. 41 is an explanatory view showing divergence of a ray.

In turn, the description will be oriented to a color-mixing type image display device according to a ninth embodiment of the present invention. Before the description, the term "divergence level" or just "divergence" used in the following description will be defined. FIG. 41 is a view for explaining the divergence level. In this figure, a numeral 410 denotes a light valve. A numeral 411 denotes a pixel to be addressed (subject pixel). A numeral 412 denotes a ray of light entered at the maximum angle of incidence. A numeral 413 denotes a vertical perpendicular to the plane of the light valve.

The divergence level of a field of light emerging from a pixel is a factor of both the angle of exitting rays as well as the intensity distribution across the face of the pixel. Our treatment will assume a uniform distribution across the pixel area, so that we may treat divergence as merely a matter of ray angularity. Thus, our meaning or usage of divergence level is equivalent to divergence angle. In FIG. 41, maximum entrance angle D and exit angle E are identical. We use D, defined as a maximum, as our divergence angle, or equivalently divergence level, or more simply divergence.

Figure 42:
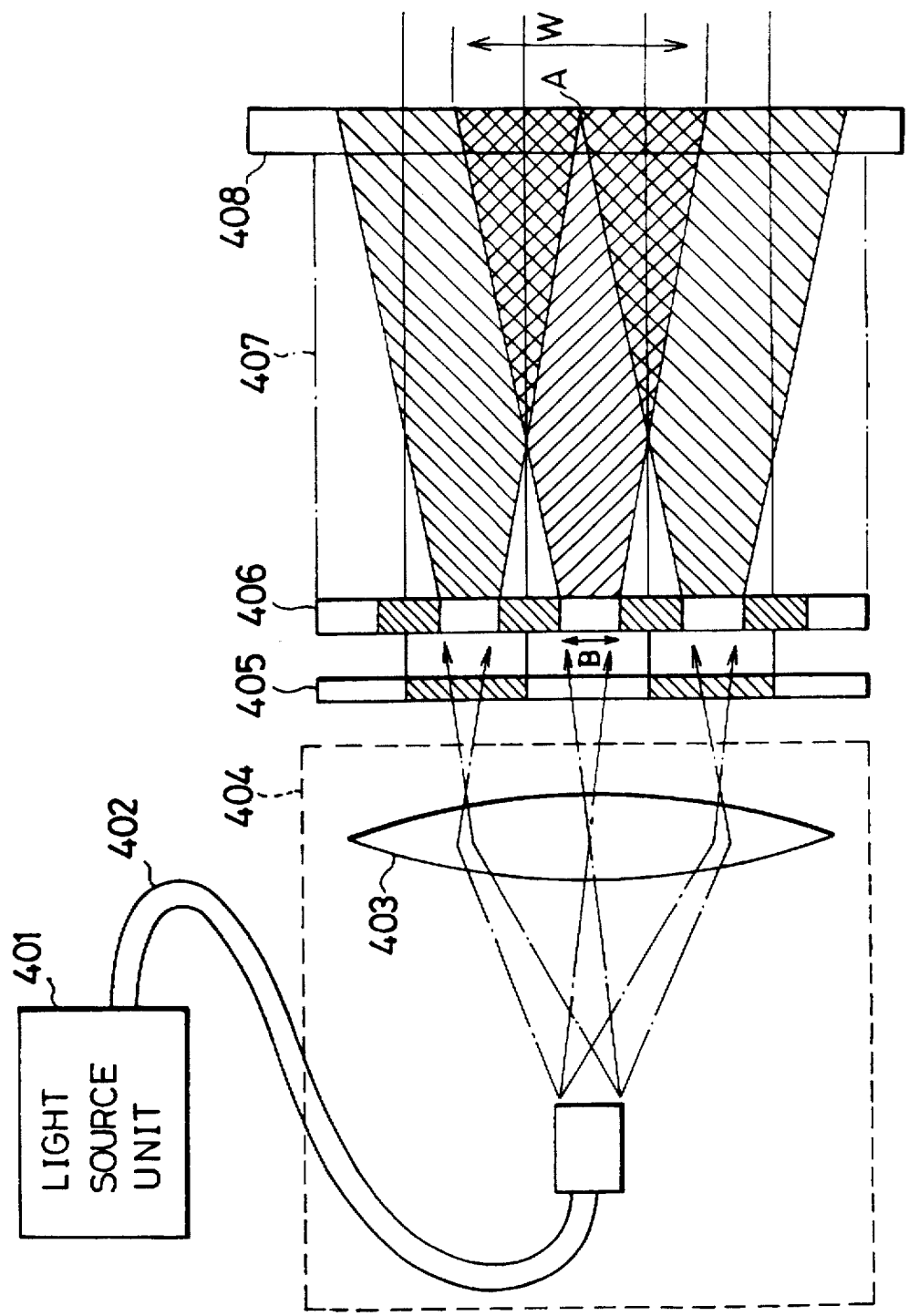
FIG. 42 is a diagram showing a color-mixing display device according to a ninth embodiment of the present invention.

FIG. 42 shows a color-mixing image display device according to a ninth embodiment of the present invention. As shown, the color-mixing image display device is arranged to have an optical fiber 402, a Fresnel lens 403, a color filter 405, a light valve 406, a glass plate 407 formed on the surface of the light valve 406, and a back projection type screen 408. In FIG. 42, the relatively thick glass plate 407 for covering the light valve 406 is illustrated. This is shown for more clearly explaining the color-mixing effect. Normally, the glass plate has a thickness of about 1 mm. This holds true to the drawings to be used in the following description.

The white ray generated by the light source unit 401 is transmitted to the divergence level controlling lighting unit 404 through the optical fiber 402. If the light source unit 401 is designed to generate the diffuse light at the output end of the optical fiber 402, the output end of the optical fiber 402 may be used as a fine surface light source having the diameter of the optical fiber 402. By making the center of the fine surface light source coincide with the focal point of the Fresnel lens 403, the ray from the fiber's central point is converted into parallel rays by the Fresnel lens 403. Parallel rays are the most suitable illumination for liquid crystal light valves 406. The effect of the light valve on a ray of light varies with its angle of incidence. Here, however, because the angles of divergence are restricted this effect can be neglected. Even if the fine surface light source slips out of the focal position there is sufficient tolerance to escape undesirable effects.

FIG. 42 demonstrates the case where the center of the fine surface light source coincides with the focal point of the Fresnel lens 403 and the Fresnel lens 403 outputs the central parallel rays. In this case, the divergence level of the rays output from the Fresnel lens 403 is determined by expression 10 below. By properly selecting the diameter of the optical fiber 402 and the focal distance of the Fresnel lens 403, it is possible to freely design the divergence level of the rays output from the lighting unit 404.

$$D = \tan^{-1}[(S/2)/F] \qquad (10)$$

wherein D denotes the divergence level, S denotes the diameter of the optical fiber, and F denotes a focal distance of the Fresnel lens.

The output light from the lighting unit 404 enters the color filter 405. In FIG. 42, for the color filter 405, and the light valve 406, only three pixels are demonstrated. In actual practice they are composed of a great multitude of pixels. Concerning the pixel distribution, three pixels of green, blue and green are picked up from the left hand in the second row of the four-pixel distribution shown in FIG. 53 (about the related art). The rays passed through the color filter 405 enter into the light valve 406 so that the luminance of the ray may be modified according to a video signal fed to the light valve 406. The light valve 406 may consist of a liquid crystal panel. The rays, passing through each pixel of the light valve 406, pass through the glass plate 407 consisting the surface of the light valve 406. Then, the rays diverge to a size defined by the following expression (11) and are incident onto the back projection type screen 408.

$$W = 2 * \tan[D] * L + B \qquad (11)$$

wherein W denotes a size of a pixel image on the screen 408, D denotes the divergence level of the light from the lighting unit 404, L denotes a distance from the pixel in the light valve 406 to the screen 408, and B denotes a size of the pixels of the light valve 406. Hence, by properly selecting the divergence level of the light output from the lighting unit 404 and the distance from the light valve 406 to the screen 408, the pixel image area size can be precisely controlled.

FIG. 42 shows the arrangement designed so that the rays from two green pixels are just abutting at the middle point A on the back projection type screen 408. Same color pixels, discretely separated from one another on the light valve 406, are connected with one another on the screen 408 for smoothing the image. As indicated by the arrow W of FIG. 42, the color pixel projected onto the back projection type screen 408 is overlapped by other color pixels. Thus, color mixture is realized in the image. FIG. 42 shows the state of mixing the green with the blue. On the actual panel, the red pixels are located diagonally with respect to the blue pixels. As such, the red pixels overlap the blue and the green pixels within the range indicated by the arrow of FIG. 42. The projected image includes the mixture of all three primary colors.

In the manufacture of the display, since the Fresnel lens 403 is thin and tabular, it is possible to integrate the Fresnel lens 403, the color filter 405, the light valve 406, the glass plate 407, and the back projection type screen 408 as one thin unit.

In the above arrangement, without having to provide any refracting device between the light valve 406 and the back projection type screen 408, and with the lighting unit 404 easily realized, the color-mixing display device may be devised so that the pixel colors are mixed and the borders between the pixels are made smooth for displaying a high-quality image.

In turn, the description will now be oriented to a method for precisely controlling the intensity distribution of a pixel image on the screen.

Figure 43:
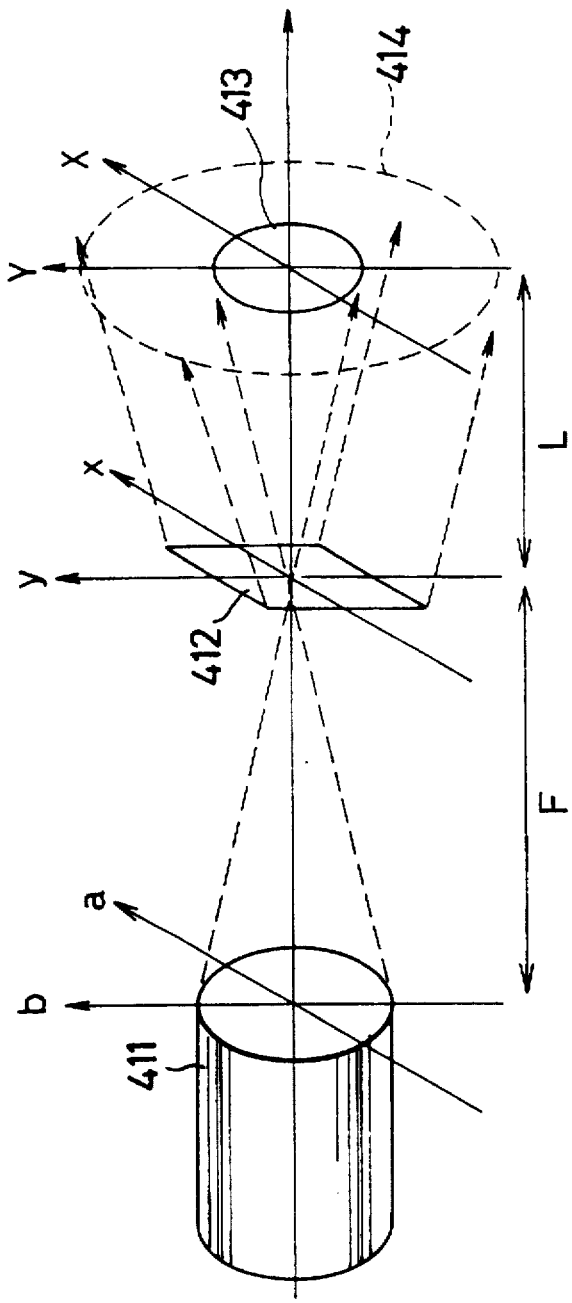
FIG. 43 is a view showing a distribution of components of the color-mixing display device for explaining an intensity distribution.
Figure 44:
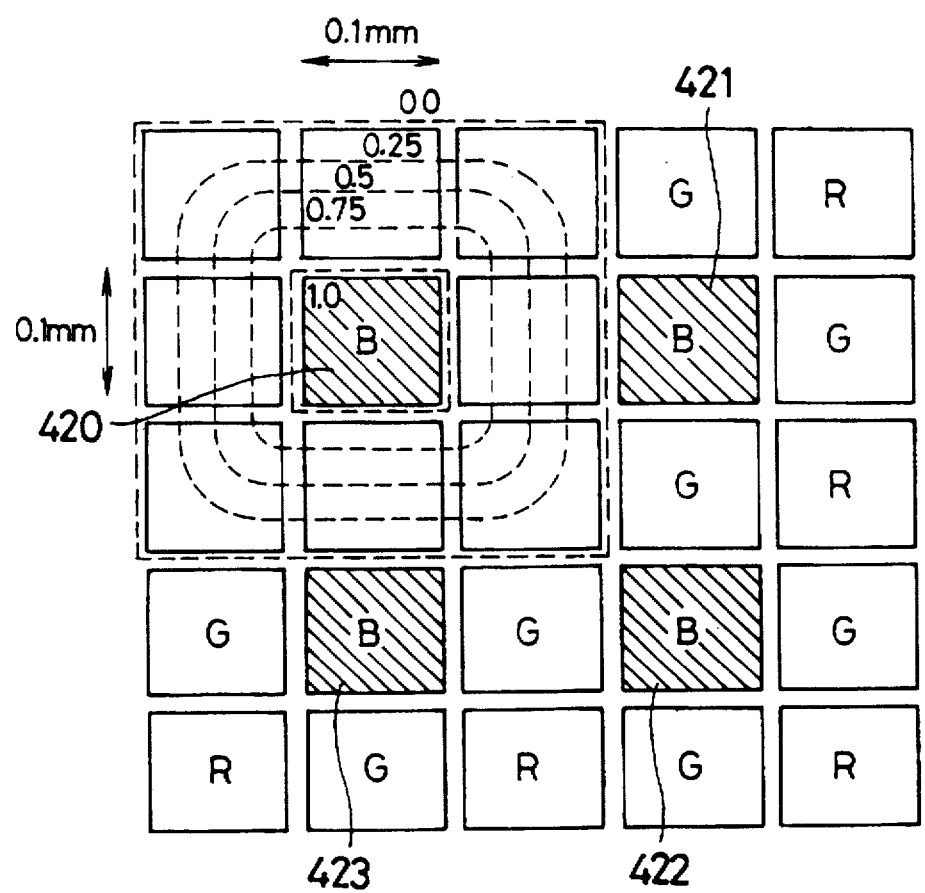
FIG. 44 is an explanatory view showing an intensity distribution of a pixel image on the screen.

FIG. 43 shows how the components are disposed for explaining the intensity distribution. FIG. 44 shows an intensity distribution of a pixel image on the screen.

In FIG. 43, numeral 411 denotes a fine surface light source. A numeral 412 denotes a pixel located on the optical axis of a lens integrated into the light valve. A numeral 413 denotes an image of the fine surface light source formed of rays passed through the center of the light valve 412. A numeral 414 denotes an image formed of the overall pixel 412. In FIG. 44, G denotes a green pixel, B denotes a blue pixel, and R denotes a red pixel. In FIG. 43, the refracting lens and the color filter are taken as being coincident to the light valve for simplifying the arrangement. Further, the fine surface light source 411 is located at the focal point of the refracting lens. The coordinate axes are defined as shown in FIG. 43, and the function and the variables are defined as follows.

F: Distance between the fine surface light source 411 and the pixel 412 of the light valve, which is coincident to the center of the refracting lens.

L: Distance between the pixel 412 and the image 414 on the back projection type screen fe (a, b): Intensity distribution on the fine surface light source 411 fb (x, y): Transmittance of the pixel 412 fs (X, Y): Intensity distribution of the image 414

As such, it is necessary to derive a relational expression for the intensity distribution represented by fs(X, Y) based on the other functions and variables.

For this purpose, at first, consider the image 413 formed on the screen by the ray passed through the center of the pixel 412. The pixel 413 coincides with the center of the lens. Hence, the image 413 may be represented by the expression (12) as is understood from FIG. 43.

$$fe[-(F/L)*X, -(F/L)*Y]*fb[0, 0] \qquad (12)$$

Since the central rays output from the lens are parallel, the expression (12) is effective at any location of the light valve. That is, the image formed on the screen by the ray passed through the coordinate (x, y) of the pixel 412 of the light valve can be represented by the following expression (13).

$$fe[-(F/L)*(X-x), -(F/L)*(Y-y)]*fb[x,y] \qquad (13)$$

Hence, the image 414 of the overall pixel formed on the screen can be obtained by integrating the distribution represented by the expression (13) with respect to the coordinate (x, y) of the pixel, concretely, based on the following expression (14).

$$fs(X, Y) = -\int_{-\infty}^{\infty} -\int_{-\infty}^{\infty} fe[-(F/L)*(X-x), -(F/L)*(Y-y)] * fb[x, y]dxdy \qquad (14)$$

In the above discussion, the expression (14) is obtained about the pixel having its center on the optical axis. Since the central rays output from the lens are parallel rays, this expression (14) is applicable to pixels off the optical axis. If it is desirable to implement a specific intensity distribution on the screen, the size, the form and the luminance distribution of the fine surface light source 411 may be designed to implement the distribution by consideration of this expression (15).

Now, the description will be oriented to a concrete example of the fine surface light source indicated by the above theory. Assume the following conditions are given.

F=10 μm: Distance between the fine surface light source 411 and the pixel 412 contained in the light valve, in which case the refracting lens is located at the pixel 412.

L=1 mm: Distance between the pixel 412 and the image 414 on the back projection type screen fe (a, b): Function of describing the intensity distribution on the fine surface light source 411 fb (x, y): Transmittance of the pixel 412, which in this example is a square with sides of 0.1 mm, and has a transmittance of 1.0. The pixels are distributed as shown in FIG. 44.

fs (X, Y): Intensity distribution of the image 414 on the back projection type screen. Assume that the intensity distribution indicated by the contours of FIG. 44 is realized about the blue pixel 420 to be addressed. The numerals 1.0 to 0.0 of the contours indicate relative values of intensity and it is also intended that a similar distribution is realized around the other pixels.

According to the intensity distribution shown in FIG. 44, if the blue pixels 421, 422 and 423 are spread like the upper left blue pixel 420, the intensity distributions will overlap with each other. In the areas where the blue pixels 420, 421, 422 and 423 exist, the blue pixel value is directly displayed. In the area where no blue pixel exists, a smooth interpolation is implemented. This holds true to the other colors. The smooth interpolation is done over the entire screen image, and a high-quality color-mixed image is obtained.

Based on the above discussion, it can be shown that the intensity distribution on the screen as shown in FIG. 44 can be realized for the display panel as described above by using a fine surface light source that is formed in a square with sides of 2 μm and having uniform intensity. In this embodiment, the example design is very simple. The applied range of the designing method is not limited to this embodiment. Using computer simulation, expression (14) can be evaluated for fine surface intensity distributions far more complicated than the simple uniform distribution used in the example.

Figure 45:
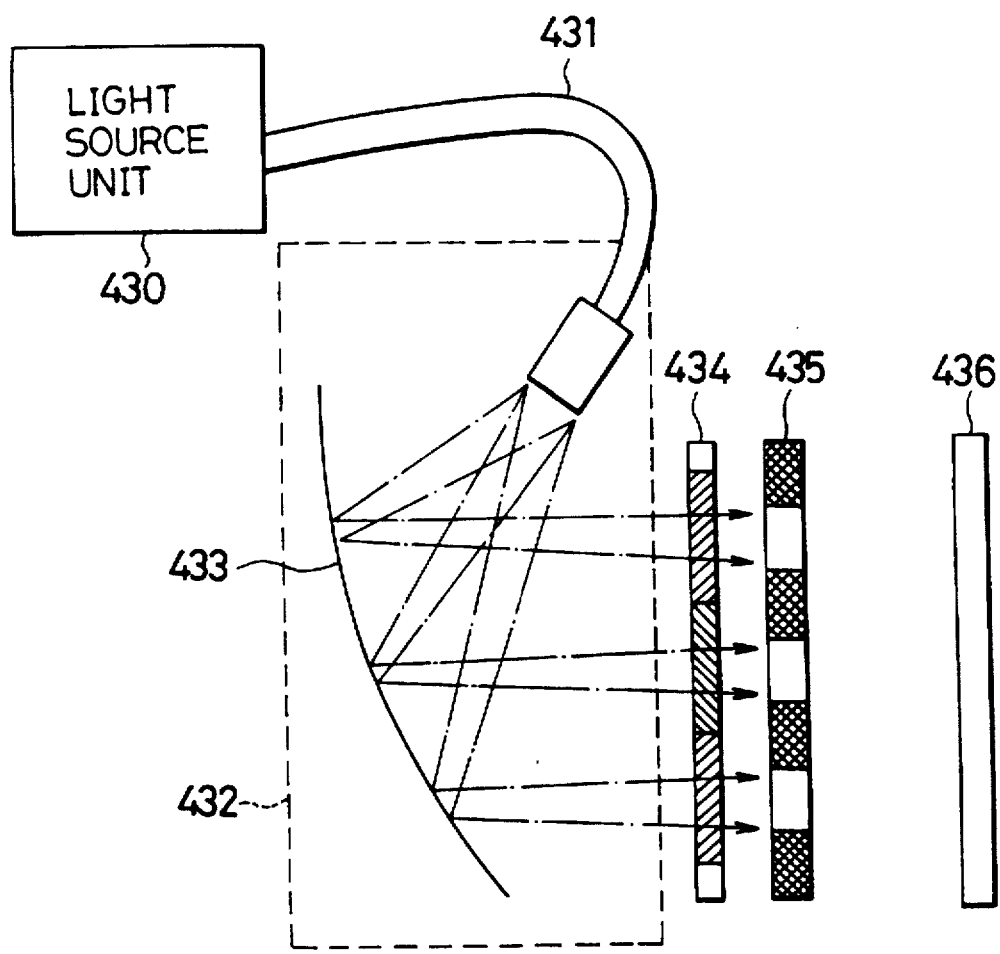
FIG. 45 is a view showing a color-mixing display device according to a tenth embodiment of the present invention.

In turn, the description will now be oriented to a color-mixing image display device according to a tenth embodiment of the present invention with reference to FIG. 45.

In FIG. 45, a numeral 430 denotes a light source unit. A numeral 431 denotes an optical fiber. A numeral 432 denotes a divergence control type lighting unit. A numeral 433 denotes a parabolic mirror. A numeral 434 denotes a color filter. A numeral 435 denotes a light valve. A numeral 436 denotes a back projection type screen.

In this embodiment, the parabolic mirror 433 is used in place of the Fresnel lens 403 shown in FIG. 42. The other arrangement and function of this embodiment are the same as those of the ninth embodiment shown in FIG. 42. The use of an off-axis parabolic mirror 433 makes it possible to mount the fine surface light source at the top of the light valve, thereby reducing the overall thickness of the device.

Figure 46:
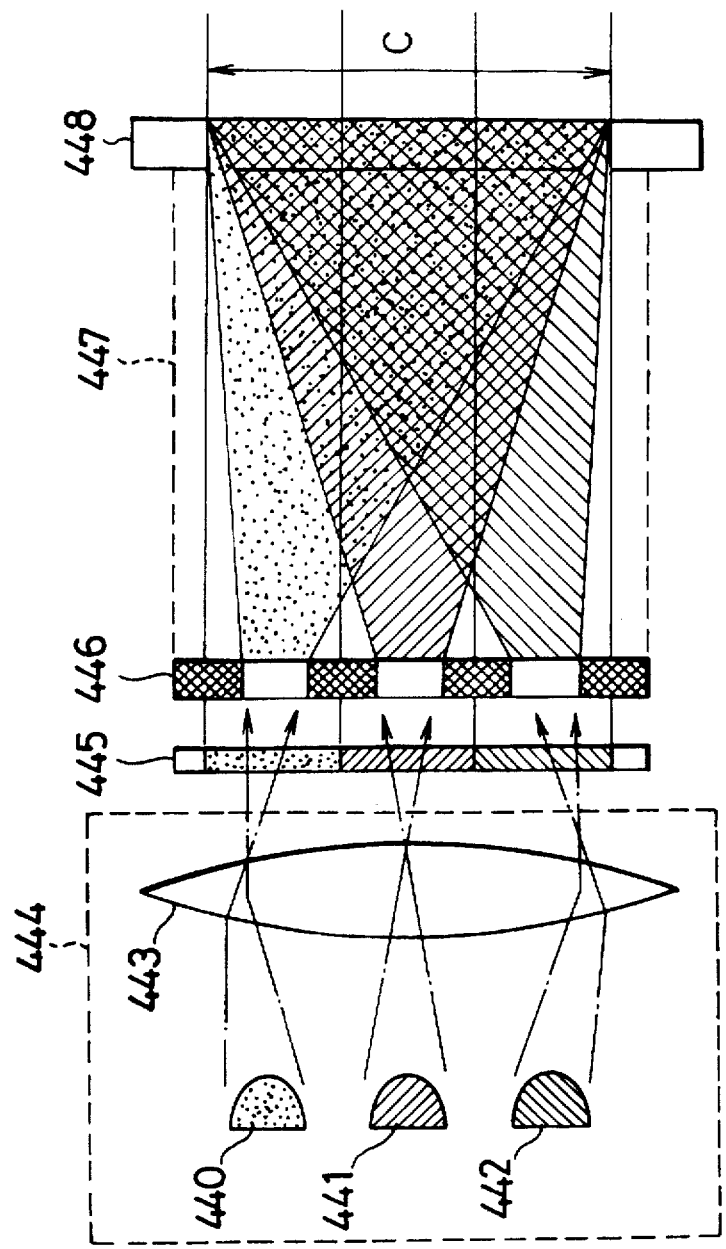
FIG. 46 is a view showing a color-mixing display device according to an eleventh embodiment of the present invention.

Next, the description will be oriented to the color-mixing image display device according to the eleventh embodiment of the present invention with reference to FIG. 46.

Figure 52:
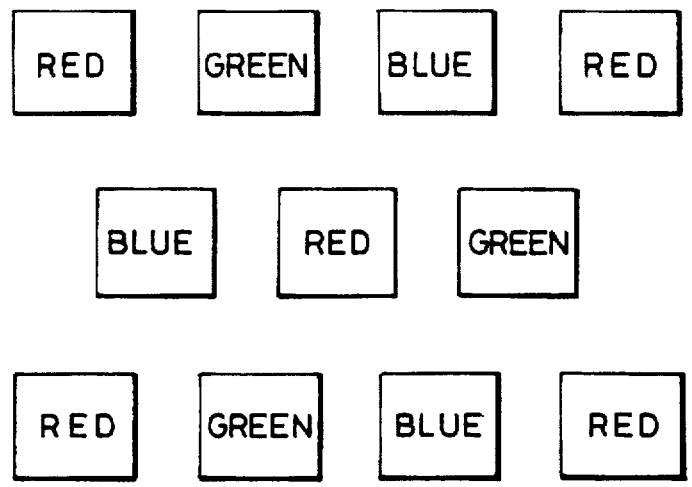
FIG. 52 is a view showing delta distribution of pixels.
Figure 53:
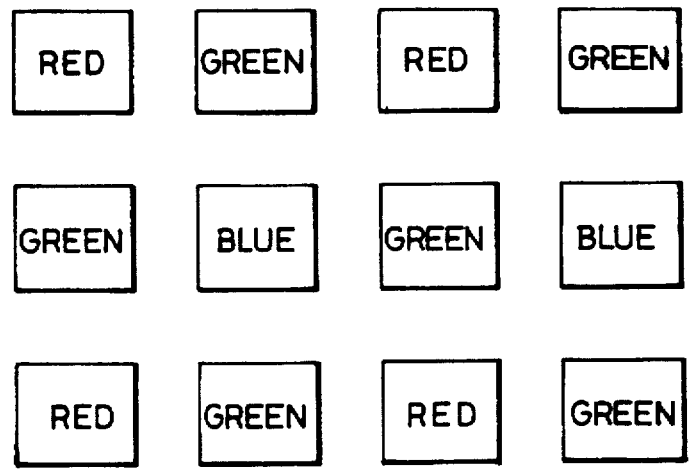
FIG. 53 is a view showing four-pixel distribution of pixels.
Figure 54:
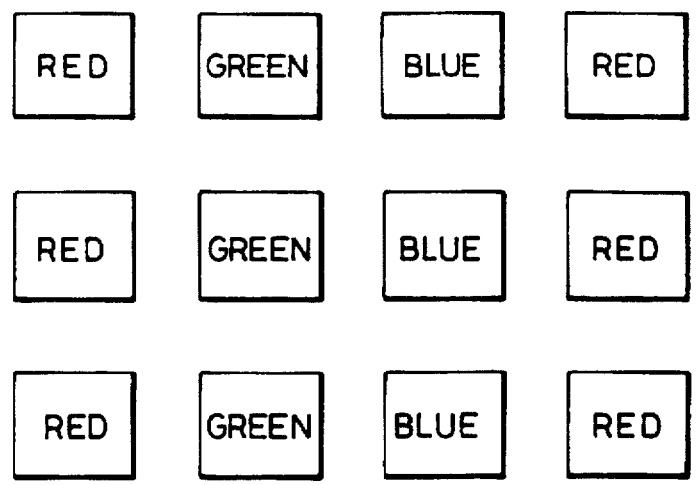
FIG. 54 is a view showing stripe distribution of pixels.
Figure 55:
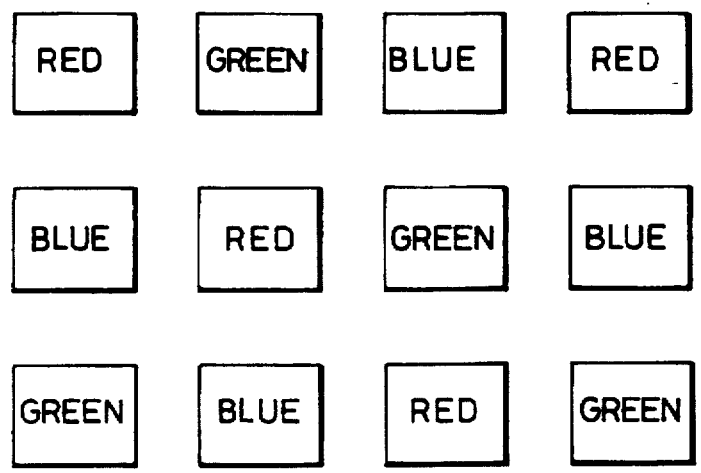
FIG. 55 is a view showing diagonal distribution of pixels.
Figure 56:
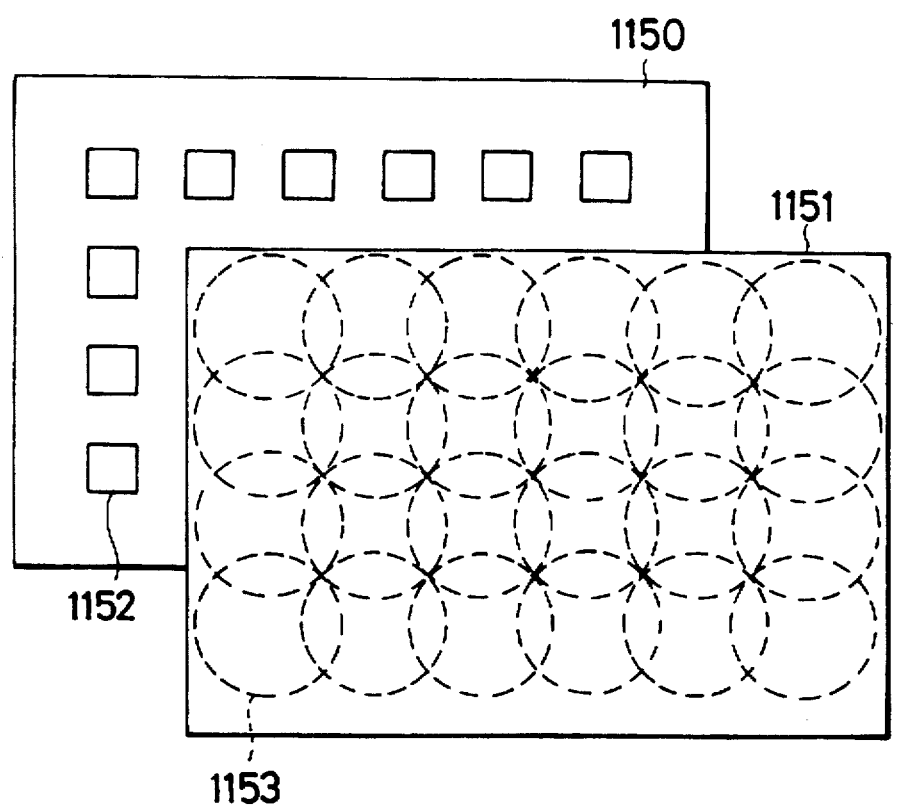
FIG. 56 is an explanatory view showing a display unit according to another related art of the present invention.
Figure 57:
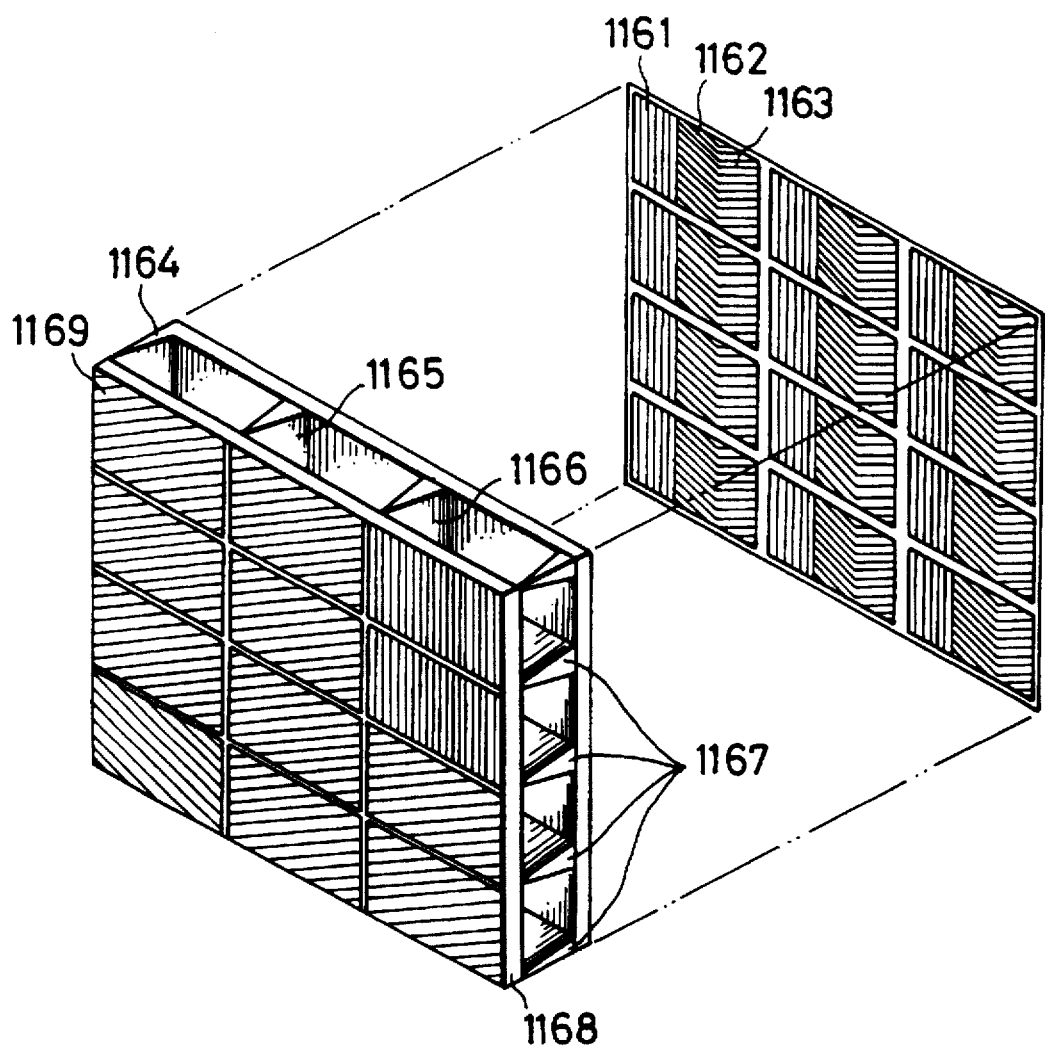
FIG. 57 is an explanatory view showing a display unit according to another related art of the present invention.
Figure 58:
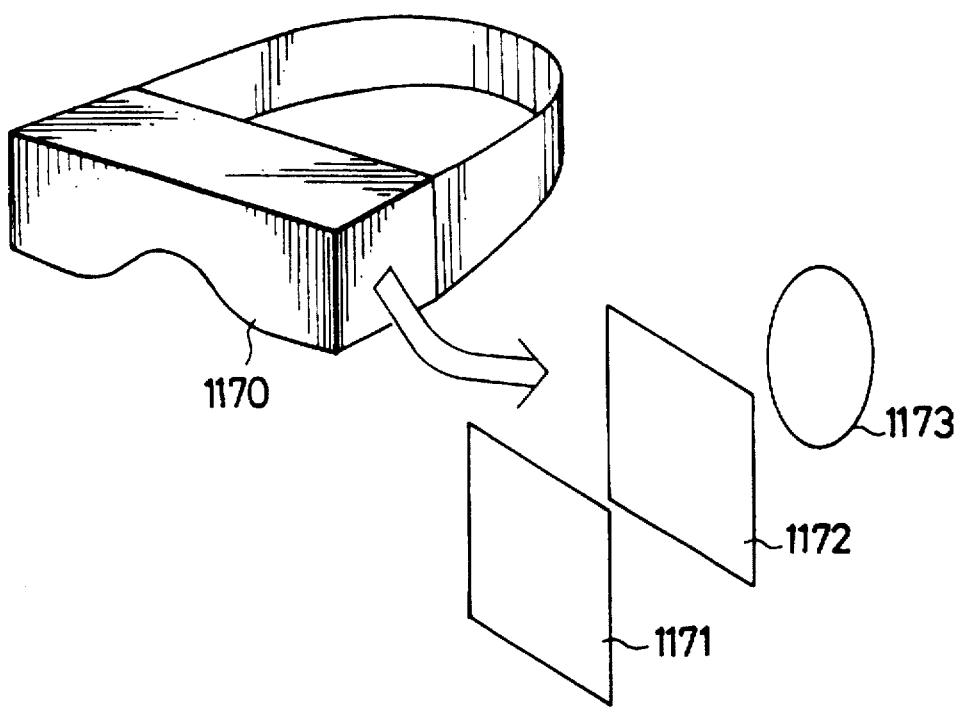
FIG. 58 is a view showing a head mounted type display (HMD) according to another related art of the present invention.
Figure 59:
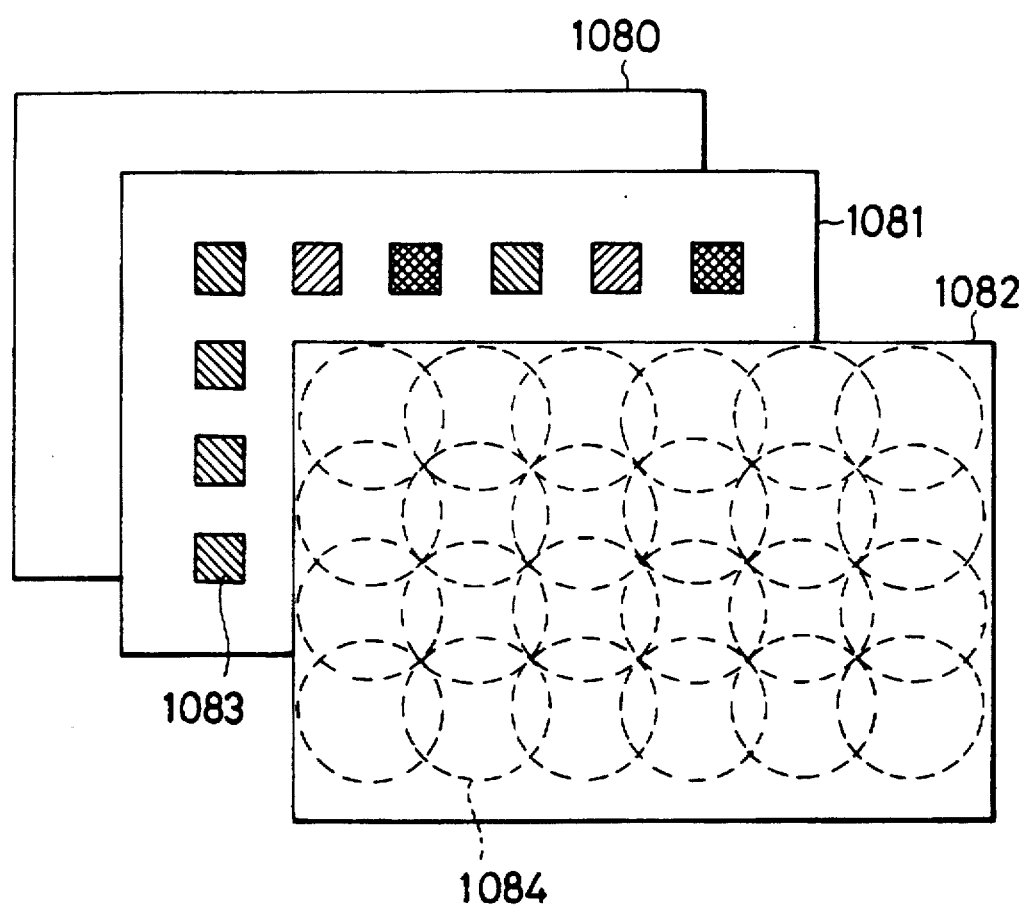
FIG. 59 is an explanatory view showing a method for mixing colors according to another related art of the present invention.

In FIG. 46, red, the green and the blue light-emitting diodes 440, 441, 442 are disposed for composing a color separating type light source. The rays emitted from the color separating type light source are refracted by the Fresnel lens 443 so that those rays may pass through the color filter 445, the light valve 446 and the glass coat 447 covering the surface of the light valve 446. Then, the rays fall incident upon the back projection type screen 448 on which an image is reproduced. As shown in FIG. 46, the horizontal red, green and blue pixel arrangement corresponds to either a delta-distribution as shown in FIG. 52, a stripe-distribution as shown in FIG. 53, or a diagonal-distribution as shown in FIG. 54.

Those color light-emitting diodes 440, 441 and 442 are located at a focal point of the lens 443. Because the two extreme diodes 440 and 442 are spatially separated from the focal point of the lens 443, for each, the direction of the parallel central rays after refraction by the lens 443 will not be parallel to the optical axis of the lens. Because the central rays for each three color pixel triplet converge towards the same point on the screen 448, the projected image of each pixel of the triplet overlaps with the others for mixing the colors in the range C on the back projection type screen 448. The color-mixing systems shown in FIGS. 42 and 45 operate by expanding colored pixels around spatially separated pixel centers. If, therefore, a fine patterned image composed of black and white lines is displayed, spurious colors may be displayed. The image display device arranged as shown in FIG. 46 operates to sample the image data of each pixel belonging to the color-mixing triplet at the same point of the original image and project the pixel colors to the same area for mixing the colors. This operation makes it possible to solve the problem of spurious color display. This point is characteristic of the display device embodiment portrayed in FIG. 46.

Figure 47:
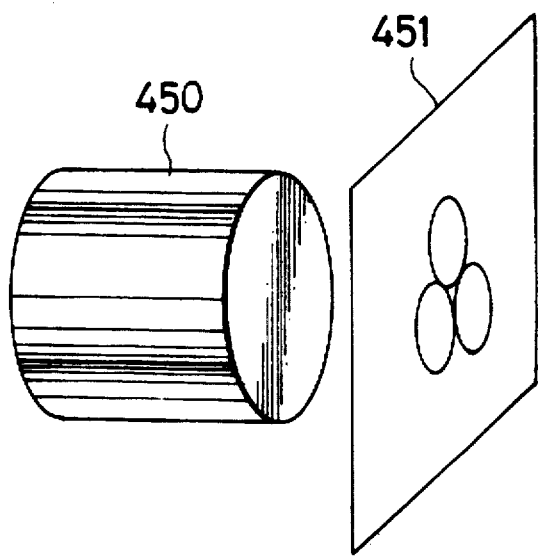
FIG. 47 is a view showing a color separation type light source.

FIG. 47 shows another example of a color separating type light source. The color separating type light source comprises an optical fiber 450 and a light source coloring unit 451 as shown in FIG. 47. The output end of the optical fiber 450, which emits diffuse light, is covered by the light source coloring unit 451 composed of distinct color filters. The resulting color separating type light source provides the three primary color light sources which may be variable in size, form and intensity distribution. FIG. 47 shows the arrangement in which red, green and blue circular filters are disposed in a triangular manner.

Figure 48:
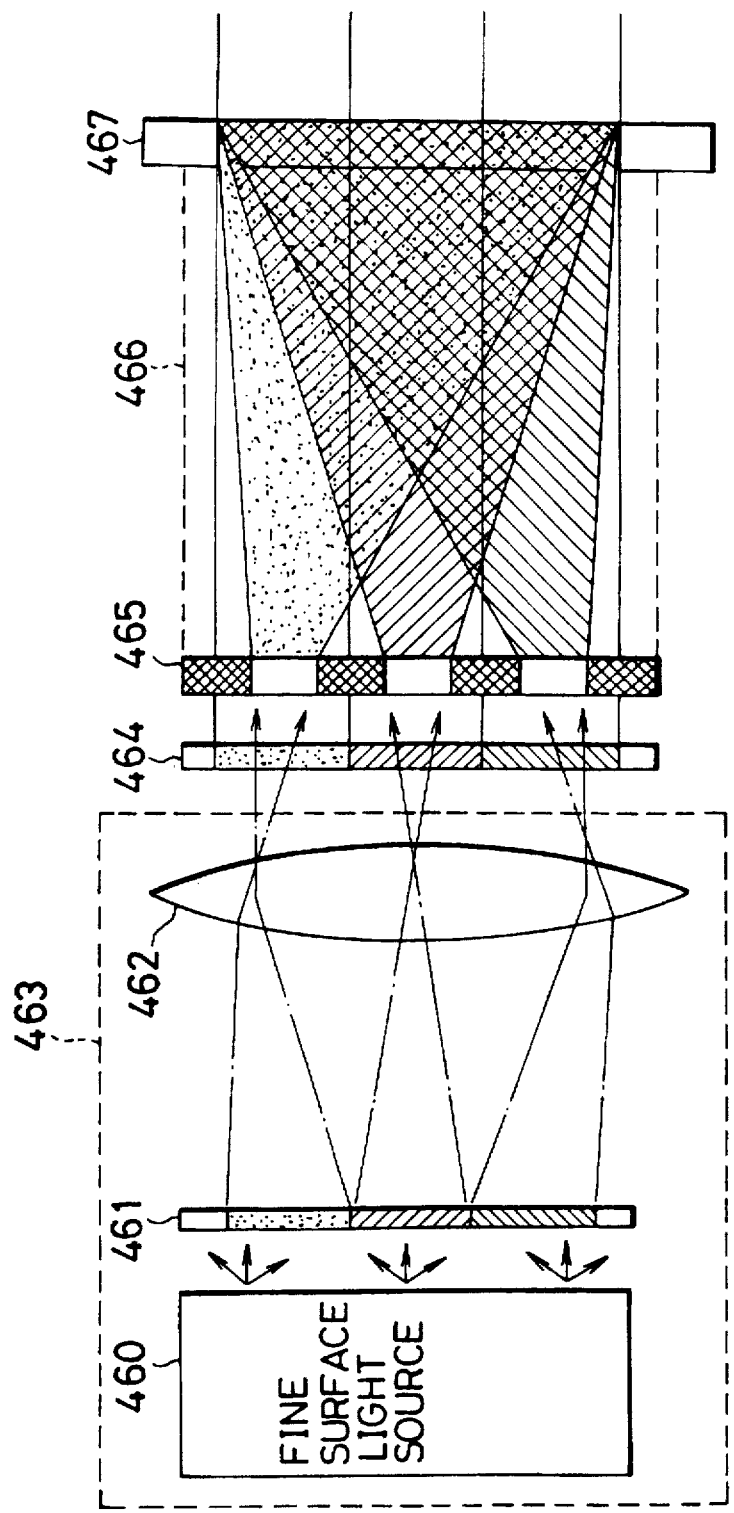
FIG. 48 is a diagram showing a color-mixing display device according to a twelfth embodiment of the present invention.

Next, the description will be oriented to a color-mixing image display device according to a twelfth embodiment of the present invention with reference to FIG. 48.

As shown in FIG. 48, a transmittance type color display 461 such as a color liquid crystal display is placed after the fine surface light source 460 so as to enable electrical manipulation of the characteristics of the color separating type light source. FIG. 48 shows an image display device arranged to use this color separating type light source. The effect of this display device is the same as that of the foregoing embodiment. However, by changing the pattern displayed on the transmittance color display 461 located after the fine surface light source 460, it is possible to control the size, the shape and a intensity distribution of the pixel image on the back projection type screen 467 in real time. Experimentation or adjustment of the color mixed image is enable. In FIG. 48, a numeral 462 denotes a Fresnel lens. A numeral 463 denotes a divergence control type lighting unit. A numeral 464 denotes a color filter. A numeral 465 denotes a light valve. A numeral 466 denotes a glass coat formed on the surface of the light valve 465.

Figure 49:
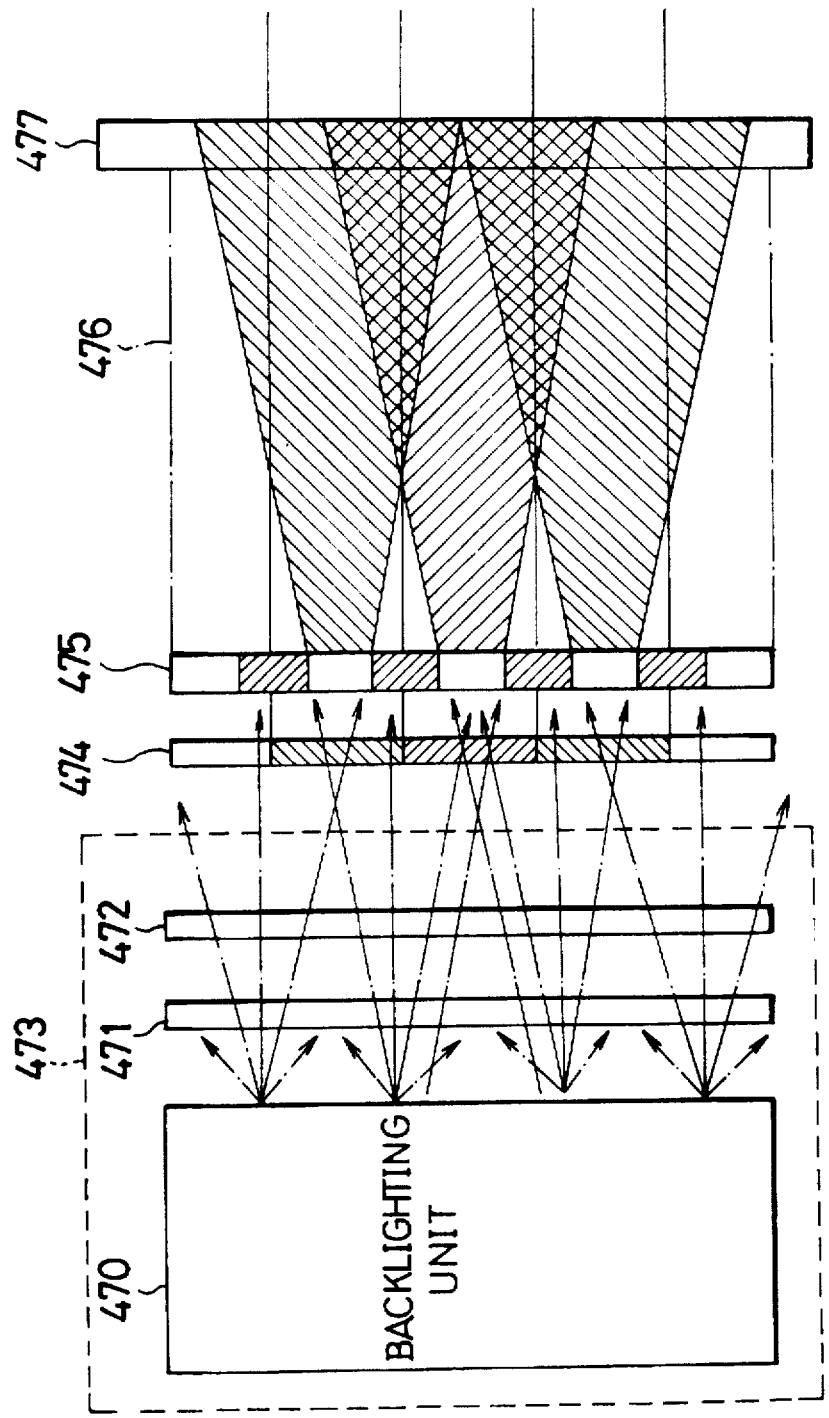
FIG. 49 is a diagram showing a color-mixing display device according to a thirteenth embodiment of the present invention.
Figure 50:
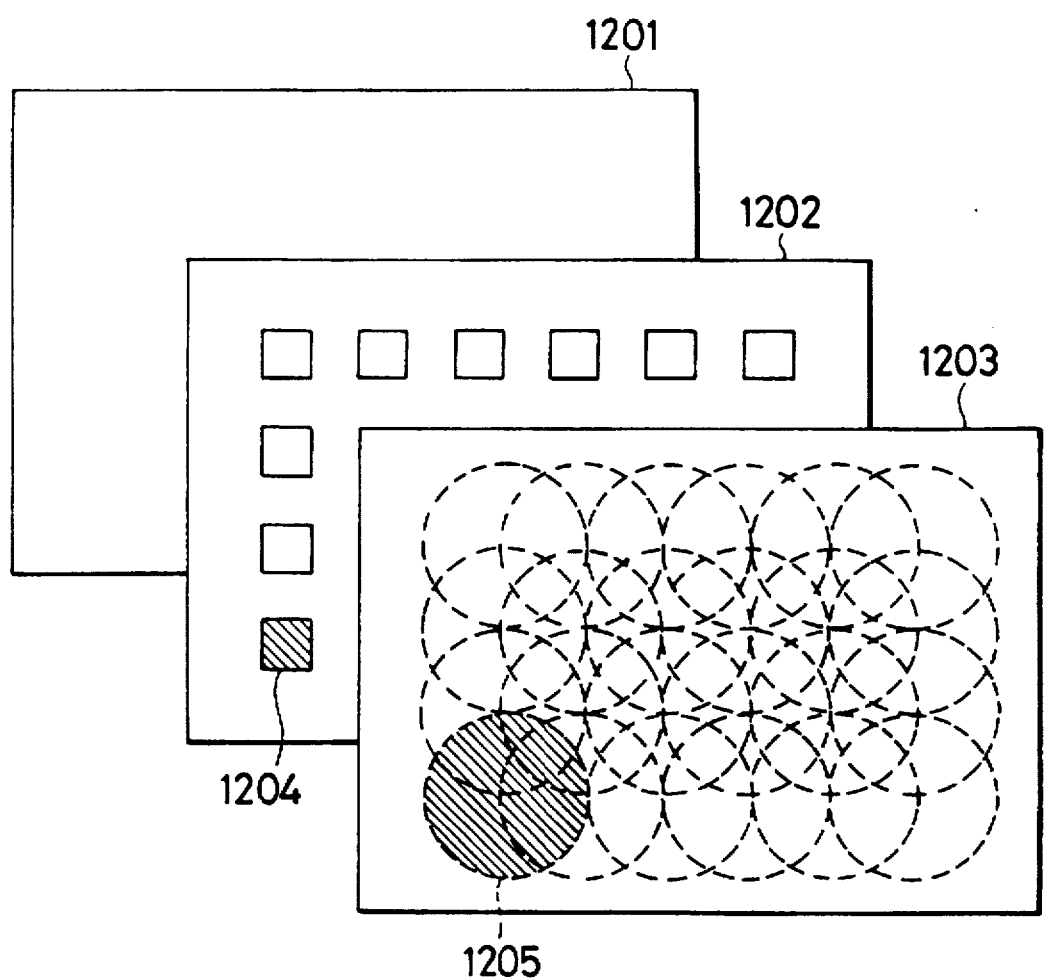
FIG. 50 is a diagram showing an image display device according to a related art of the present invention.

Lastly, the description will be oriented to a color mixing type image display device according to a thirteenth embodiment of the present invention with reference to FIG. 49.

In FIG. 49, a divergence control type lighting unit 473 comprises a backlight unit 470 for emitting diffuse light and light direction control portions 471 and 472 located before the backlight unit 470. The light direction control portions 471 and 472 can be realized, for example, by resin sheets. These sheets each serve to restrict one light direction, that is, horizontally or a vertically. Hence, as shown in FIG. 49, two sheets are arranged so that a resin sheet 471 operates to vertically restrict the light divergence, while resin sheet 472 operates to horizontally restrict it. The rays are guided to pass through a color filter 474, a light valve 475, and a glass coat 476 covering the surface of the light valve 475 in sequence. Then, the rays fall incident upon a back projection type screen 477 on which the reproduced image contains the smoothly connected color pixels. The portions located after to the color filter 474 along the light path are similar to those provided in the foregoing embodiment. The divergence control type lighting unit 473 does not use a refracting unit, so that the unit 473 may be made thinner. Further, it may advantageously use a backlight unit that provides diffuse light, which is readily and economically commercially available. However, this light unit 473 has the following limitations. As the first limitation, as the divergence is made narrower, the luminance of the light source is effectively lowered because of absorption by the light direction control portions. As the second limitation, the degree of control of the divergence angle is less than in other embodiments. This embodiment enables the overall device to be reduced in size and manufactured at low cost although the applied range of the device is quite limited.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image device comprising:
   a display unit having a plurality of pixels having first and second pitches in two dimensions; and
   a pixel multiplying means located on a surface of said display unit at the display side for visually multiplying the number of pixels displayed on said display unit, wherein the pitches in said two dimensions of the multiplied images are less than said first and second pitches.

2. An image display device according to claim 1, wherein said display unit is a liquid crystal display.

3. An image display device according to claim 1 or 2, wherein said pixel multiplying means comprises a micro lens array.

4. An image display device according to claim 3, wherein said micro lens array comprises a plurality of lenses, all of said lenses having non-equal focal distances relative to their horizontal and vertical axes.

5. An image display device according to claim 3, wherein said micro lens array comprises lenses arranged in a matrix distribution.

6. An image display device according to claim 3, wherein said micro lens array comprises lenses arranged in a delta distribution.

7. An image display device according to claims 3, wherein said micro lens array comprises rectangular lenses.

8. An image display device according to claims 3, wherein said micro lens array comprises hexagonal lenses.

9. An image display device according to claim 1 or 2, wherein said pixel multiplying means is a mixed element comprising a micro lens array and a diffuser.

10. An image display device according to claim 1 further comprising a magnifying means for magnifying said image.

11. An image display device according to claim 1, wherein said image displays are provided as a pair so that a user may observe a different display with each eye.

* * * * *